United States Patent
Jackson et al.

(10) Patent No.: US 12,219,947 B2
(45) Date of Patent: Feb. 11, 2025

(54) FAST CHANGE OF STATE OF WEED SEEDS TO HAVING REDUCED GERMINATION VIABILITY USING LOW ENERGY UNNATURAL INDIGO REGION AND MEDIUM WAVELENGTH INFRARED ILLUMINATION

(71) Applicants: Jonathan A Jackson, Dayton, OH (US); Christopher J Hoffman, Dayton, OH (US); Norman E Novotney, Mason, OH (US); Joseph M Carroll, Cedarville, OH (US); Patrick A Jackson, Dayton, OH (US); Remigio Perales, Oberlin, OH (US); Mark J Elting, Ossining, NY (US)

(72) Inventors: Jonathan A Jackson, Dayton, OH (US); Christopher J Hoffman, Dayton, OH (US); Norman E Novotney, Mason, OH (US); Joseph M Carroll, Cedarville, OH (US); Patrick A Jackson, Dayton, OH (US); Remigio Perales, Oberlin, OH (US); Mark J Elting, Ossining, NY (US)

(73) Assignee: Global Neighbor Inc., Dayton, OH (US)

( * ) Notice: Subject to any disclaimer, the term of this patent is extended or adjusted under 35 U.S.C. 154(b) by 935 days.

(21) Appl. No.: 16/923,079

(22) Filed: Jul. 7, 2020

(65) Prior Publication Data
US 2022/0008889 A1    Jan. 13, 2022

(51) Int. Cl.
*A01M 21/04*    (2006.01)
*A01D 41/12*    (2006.01)
(Continued)

(52) U.S. Cl.
CPC ............ *A01M 21/04* (2013.01); *A01D 41/12* (2013.01); *A01D 61/00* (2013.01); *A01F 17/02* (2013.01)

(58) Field of Classification Search
CPC ...... A01M 21/04; A01M 21/00; A01M 1/226; A01M 21/02; A01C 1/00; A01C 1/02;
(Continued)

(56) References Cited

U.S. PATENT DOCUMENTS

| 3,652,844 A | 3/1972 | Scott |
| 5,929,455 A | 7/1999 | Jensen |

(Continued)

FOREIGN PATENT DOCUMENTS

WO        WO 9533374 A1    12/1995

OTHER PUBLICATIONS

Author Unknown but inferred to be Kaj Jensen (initials of "KJ" are indicated on this reference); Title = OptoCleaner Early Research (This title inferred); Date= Feb. 2005; pp. 1-2; No Volume or Issue Number; Publisher = Electro Light ApS, Kaerparken 4, DK-2800 Lyngby, Denmark; Ancillary Information Listed = Tel: +45 4588 9898, SE/VAT-nr: DK12553242, Bank: Danske Bank Lyngby, Email: info@kaj.dk; Reference Was Found Online at: http://www.optocleaner.com/18-Early%20Research.pdf.

(Continued)

*Primary Examiner* — Jeffrey R Larsen
(74) *Attorney, Agent, or Firm* — Elting Patents & Technology LLC; Mark J. Elting

(57) ABSTRACT

A change of state of weed seeds to having reduced germination viability in under one minute by illuminating a seed with at least one of 2 J/cm$^2$ cumulative illumination energy, and 0.2 W/cm$^2$ irradiance, but no more than 7 W/cm$^2$ average irradiance, of at least one of an Indigo Region Illumination Distribution (IRID), and infrared radiation that (Continued)

is substantially Medium Wavelength Infrared (MWIR) radiation, preferably 2-8 microns. The MWIR radiation from heated borosilicate glass or glass powder at just under 500 C offered a peak MWIR emission of 3.75 microns was unexpectedly effective, and can be used in a radiant and transmissive weed seed accumulator transport belt. The process can be incorporated into a harvester combine to convert a tailings flow prior to discharge on an agricultural field. An illuminated harvest combine using an illuminator according to the invention allows reduction of the weed seed bank.

45 Claims, 26 Drawing Sheets

(51) Int. Cl.
*A01D 61/00* (2006.01)
*A01F 17/02* (2006.01)

(58) Field of Classification Search
CPC ........ A01C 1/025; A01D 91/00; A01D 61/00; A01D 75/00; A01D 43/00; A01D 41/12; A61L 2/10; A61L 2/08; A61L 9/18; A61L 2202/11
USPC .............................................. 47/1.3, 58.1 SE
See application file for complete search history.

(56) References Cited

U.S. PATENT DOCUMENTS 6,401,637 B1 6/2002 Haller
6,795,568 B1 * 9/2004 Christensen .......... A01M 21/04 382/110
7,774,979 B2 8/2010 Hurst
7,875,862 B1 1/2011 Hudson
8,152,610 B2 4/2012 Harrington
8,872,136 B1 10/2014 Jackson
9,648,864 B1 5/2017 Kent
10,004,176 B2 6/2018 Mayerle
10,010,067 B2 7/2018 Kent
10,624,978 B2 4/2020 Dobrinsky
2002/0090268 A1 7/2002 Haller
2008/0120736 A1 5/2008 Hurst
2015/0020447 A1 1/2015 Roure
2016/0205917 A1 7/2016 Chan
2016/0205918 A1 7/2016 Chan
2017/0034997 A1 2/2017 Mayerle
2017/0215405 A1 8/2017 Kent
2017/0290934 A1 10/2017 Dobrinsky
2018/0070534 A1 3/2018 Mayerle
2018/0271082 A1 * 9/2018 Kent .................... A01M 21/04
2018/0317392 A1 11/2018 Mayerle
2019/0059231 A1 2/2019 Mayerle
2020/0120917 A1 * 4/2020 Jackson .................. G21K 5/00
2020/0128732 A1 * 4/2020 Chaney ................ A01D 41/127

OTHER PUBLICATIONS

NatureZap Kills Weeds Using an Infrared Light, Mar. 30, 2017 (WayBack Machine Date of Apr. 2, 2017), odditymail.com, 1 webpage—http://web.archive.org/web/20170402122441/https://odditymail.com/naturezap-infrared-weed-killer (Year: 2017).

* cited by examiner

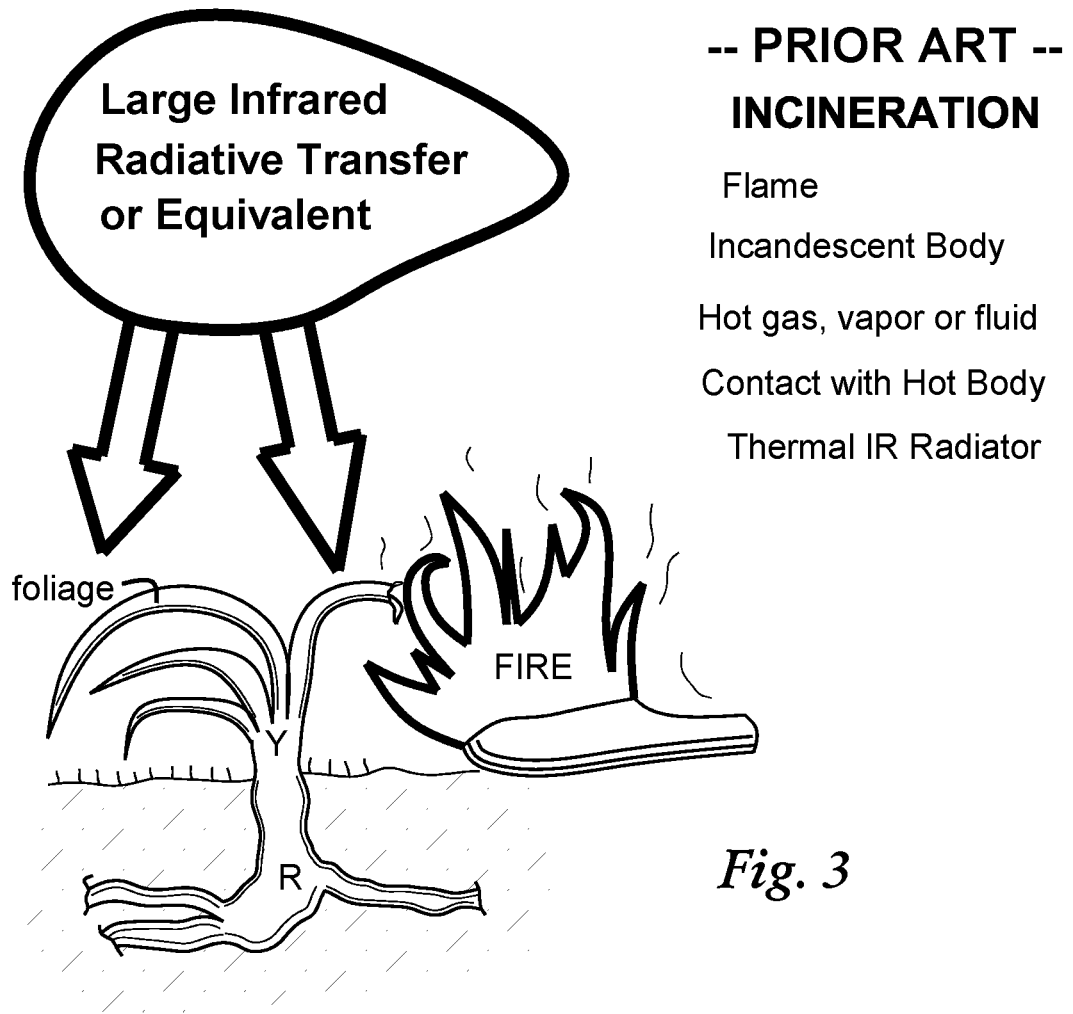
*Fig. 3*
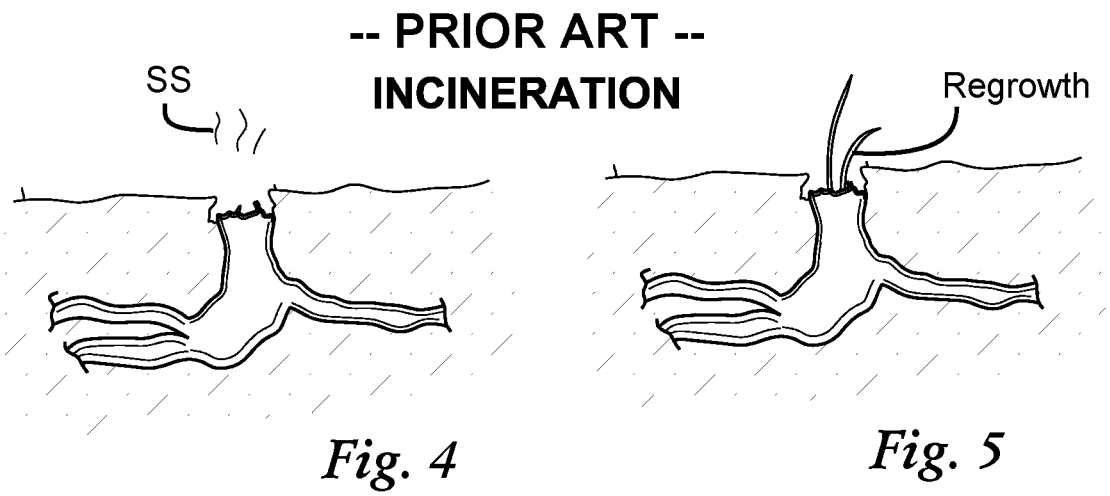
*Fig. 4*  *Fig. 5*

-- PRIOR ART --

Digitaria Sanguinalis

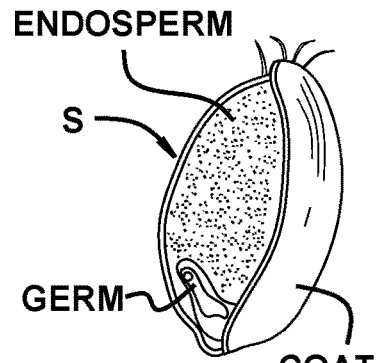
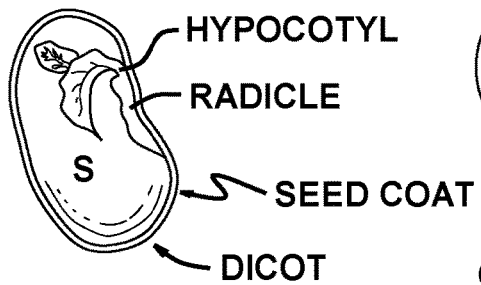
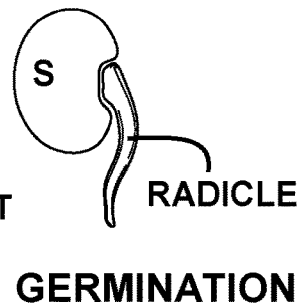
Fig. 8 -- Prior Art --   Fig. 9 -- Prior Art --   Fig. 10
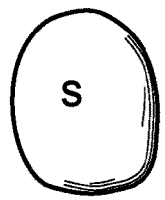
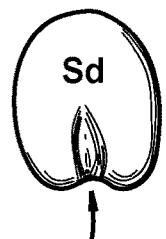
Fig. 11 -- Prior Art --   Fig. 12
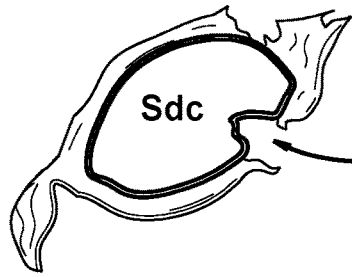
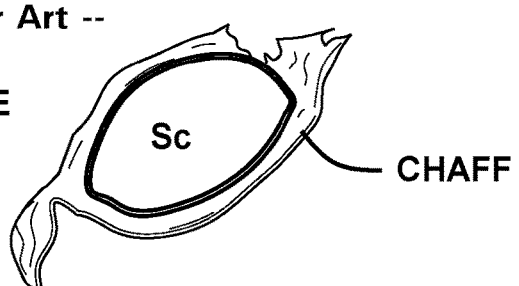
Fig. 13 -- Prior Art --   Fig. 14

PROXIMITY PASS-THROUGH CONFIGURATION ILLUMINATOR

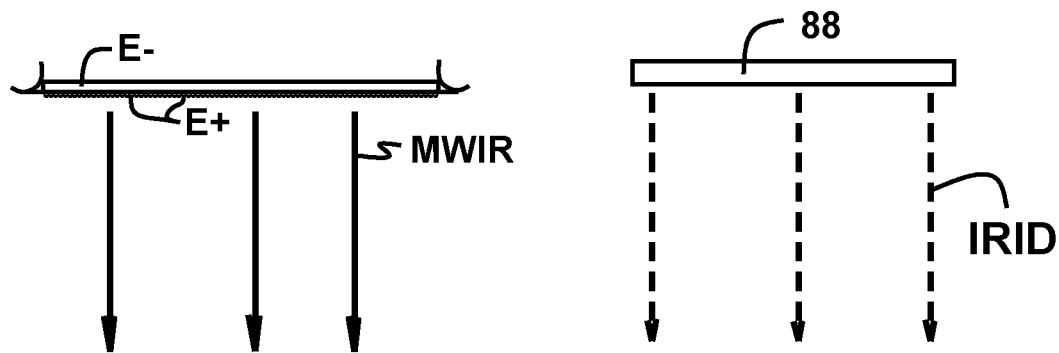
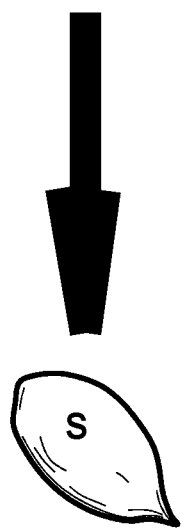
Fig. 27

Large / Dangerous Radiative Transfer

Scalding   Burning   UV "Burn"

Energy Distribution High in UV-B and UV-C   -- PRIOR ART --

Seed Cooking, Component Failure   Dehydration   Fig. 29

COMBINE HARVESTER  -- Prior Art --

COMBINE SEPARATION  -- Prior Art --

DIRECT ILLUMINATION

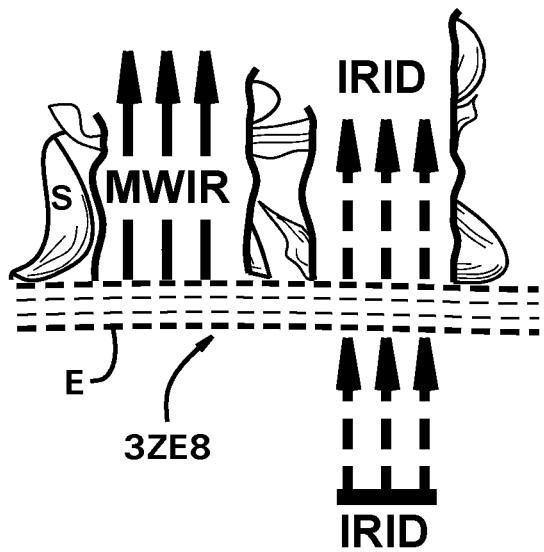
Fig. 35 RADIANT and TRANSMISSIVE WEED SEED ACCUMULATOR BELT
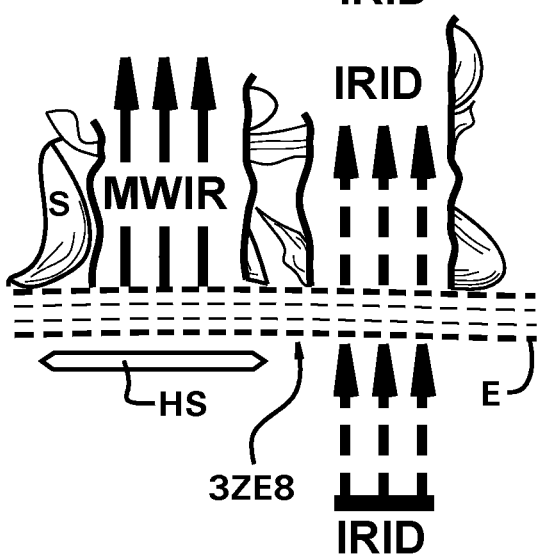
Fig. 36 RADIANT and TRANSMISSIVE WEED SEED ACCUMULATOR BELT
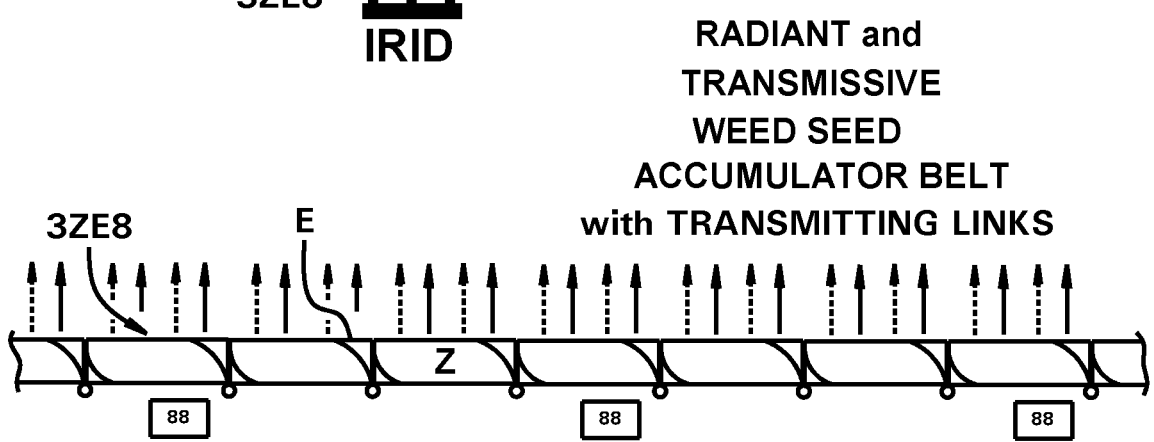
Fig. 37 RADIANT and TRANSMISSIVE WEED SEED ACCUMULATOR BELT with TRANSMITTING LINKS RADIANT and
TRANSMISSIVE
WEED SEED
ACCUMULATOR BELT
with TRANSMITTING LINKS

COMPACT ILLUMINATOR

COMPACT ILLUMINATOR

Key: IRID ············
MWIR ———

EXTERNAL WRAP RADIANT and TRANSMISSIVE WEED SEED ACCUMULATOR BELT

ILLUMINATION UNIT

COMBINE HARVESTER          INVENTION

SEED DESTRUCTION MILL
-- Prior Art --

ILLUMINATED SEED
DESTRUCTION MILL

FAST CHANGE OF STATE OF WEED SEEDS TO HAVING REDUCED GERMINATION VIABILITY USING LOW ENERGY UNNATURAL INDIGO REGION AND MEDIUM WAVELENGTH INFRARED ILLUMINATION

TECHNICAL FIELD

This invention relates to reducing germination viability of seeds, including weed seeds, using one or both of two separated general light wavelength ranges of illumination trauma. More specifically, it relates to a relatively low energy unnatural illumination protocol of duration less than one minute to induce internal stress and a change of state of a weed seed or seed to having reduced germination viability. Possible causative processes include seed component damage, hormonal changes, damage to photosynthetic apparatus, and photooxidative stress. The invention does not use mutagenic or high radiative energy transfers in any energy or wavelength, or scalding, heat shock, incineration, seed cooking or the like.

BACKGROUND OF THE INVENTION

Agriculture and food industries represent approximately $1 trillion of US GDP (Gross Domestic Product), much of it direct output from over 2 million farms on nearly 900 million acres of land. Modern farming has become a highly-intensive endeavor involving large relative amounts of financial investment and risk, use of complex and expensive equipment, skill and mastery over complex farming techniques and operations, and acutely focused attention to, and knowledge of, crop and animal biology; environments created by weather, effects of soil and decomposing biological matter, and many varied actions of competing plants, animals and microorganisms.

Weed interference with crops is a huge factor limiting crop and agricultural productivity in North America and around the world. In every farm field, weed populations can reduce crop yields, via deleterious effects on crop growth and development, and via competition for light, water, and nutrients. Herbicides are widely used to manage weed seed populations, but many weeds cannot be fully controlled and they ultimately produce seeds which form part of a soil seedbank that can survive for years and provide a ready supply of new weeds. This affects profitability of farming operations, and the weed seed bank composition can affect the sale value of agricultural land.

In particular, crop yields are most affected during early crop development, and there is a Critical Period for Weed Control (CPWC) to avoid unacceptable crop yield parasitic losses. Chemicals excreted into soil by a weed can affect growth and development of a crop species. This is so-called allelopathy, where exudation of chemical compounds by one plant has negatives on a neighboring plant. In the fight for survival, plants rely on a complex sensory system to detect the presence of neighboring plants, resulting in compensatory mechanisms like shade avoidance, which tends to cause more leaf growth, and taller stem growth, at the expense, relatively, of root development. This affects the normal course of growth and development. Farmers often rely on herbicides, tillage and the use of cover crops and organic weed control techniques to keep weed populations low to not reduce yields and overall profitability.

One goal is to reduce the size of the weed seed bank. See [REF 1: Dynamics and management of crop-weed interference, Eric R. Page, Chris J. Wllenborg, Praire Soils & Crops Journal, Volume 6, 2013, pgs 24-32]. Weed seeds include: palmer amaranth, waterhemp, common lambsquarters, giant foxtail, velvetleaf, ivyleaf morning glory, giant ragweed, common cocklebur. These and other plant seeds are storage organs for resources needed to support germination and the energy reserves are an excellent food source for animals that live in agricultural fields, such as ground beetles, crickets, and mice. Such animals consume a small portion of the weed seed bank, but typically most of the weed seed bank remains. Another weed, *Amaranthus tuberculatus* or tall waterhemp (related to amaranth) affects US agriculture, and is resistant to Roundup®, a systemic glyphosate-based heribicide. Tall waterhemp has also been reported resistant to acetolactate synthase inhibiting (ALS) herbicides and the triazines. ALS inhibitors affect seedling growth, and in older plants, can cause malformation, stunted growth and decreased seed production, and are potent at low levels. Resistance of this weed to acifluorfen and other diphenyl ether herbicides has been reported as well. Tall waterhemp produces three million small black seeds per plant, and its weed seed can persist in the weed seedbank in a dormant state for several years, even decades.

Many other herbicide-resistant weeds are prolific seed producers. Herbicide resistance was first observed over 20 years ago and one third of herbicide-resistant weeds became resistant within the last 5 years. This is a growing problem with critical implications for agriculture, the environment and US Department of Agriculture goal to encourage regenerative farming practices.

Furthermore, reducing the use of herbicides generally for weed and plant control has become an issue of national importance. Ninety-five percent of fresh water on earth is ground water. Ground water is found in natural rock formations called aquifers, and are a vital natural resource with many uses. Over 50% of the USA population relies on ground water as a source of drinking water, especially in rural areas. Use of herbicides adversely impacts the quality of ground water. Most herbicides are persistent, soluble in water, and ingestion at high toxicity levels can be carcinogenic, affecting the human nervous system and causing endocrine disruption. In the USA, concerns about the potential impacts of herbicides on human health, as well as on terrestrial and aquatic ecosystems, have led to a wide range of monitoring and management programs by state and federal agencies, such as the U.S. Environmental Protection Agency (USEPA). For example, atrazine is a toxic, white, crystalline solid organic compound widely used as an herbicide for control of broadleaf and grassy weeds, and has been detected in concentrations problematic for human and animal health.

In agricultural grain production, desirable yield known generally as cash crops or grains can include small seed grains, like alfalfa, canola, flax, grass seeds, millet, mustard, oats, rape seed, rice, rye and tricale triticale; medium-size seeds, like barley, lentils, popcorn, safflower, sorghum, and wheat; and large seeds, like chickpeas, corn, edible beans, lupins, navy beans, peas, soybeans and sunflowers.

Farmers often use cover crops, as an alternative to use of herbicides. A cover crop is intentionally planted as an intermediate step to planting the cash crop and functions to keep weeds from growing through. The cover crop is then killed, often along with the seeds of weeds. Typically, farmers use machines that roll the cover crop, folding it like a mat, in between rows of the cash crop. Cover crop dieback provides nutrients to the soil.

A prime mover for agriculture around the world for harvesting a cash crop is the harvester combine, or "combine," for short. It is so named because it generally performs three functions: [1] reaping the crop (gathering and cutting); [2] threshing the grain, to remove it from the plant that is harvested; and [3] separating the grain from chaff, tailings, and confounding materials, including cleaning and materials handling. Combines are complex, expensive and have helped produce an economic and agricultural boon around the world. Manufacturers include John Deere, Case International Harvester, New Holland, Massey Ferguson, Claas, and others.

In older combine harvester designs, a turning cylinder threshes the crop, then reciprocating straw walkers takes grain from the crop. In newer designs that are more prevalent today, a specialized rotor or twin rotors both thresh and separate the grain from the plant. In hybrid designs, a cylinder threshes the grain, then the grain is passed to two specialized rotors that separate the grain from the plant. The grain is typically loaded using augers or other transport into a tank at the top of the combine, or off-loaded.

Specifically, a unit called a header (cutting platform) divides, gathers and cuts the crop and the harvest is augered or transported to the threshing unit. The threshing unit separates the grain or cash crop from the ears, husks, stems, and straw, and the separator separates grain from chaff, which itself can contain weed seeds. In threshing, impact, rubbing action, and centrifugal forces are used to urge grains or beans from the MOG (material other than grain). Tangential threshing cylinders or units with raspbars, or rotary separation are used, with axial or tangential harvest paths. For information on combine harvesters, see [REF 2: CIGR Handbook of Agricultural Engineering, Volume III, Plant Production Engineering, Edited by CIGR (The International Commission of Agricultural Engineering), Volume Editors Bill A. Stout, Bernard Cheze, Published by the American Society of Agricultural Engineers, © 1999, hereby incorporated in this disclosure in its entirety].

Interestingly, as can be appreciated, combines operated to harvest cash crops also incidentally harvest weeds, whose weed seeds are separated from the rest of the plant and the grain. In combines, weed seeds are indeed successfully separated from the cash crop, but combines nonetheless generate huge amounts of biomass tailings which contain weed seeds. These weed seeds are discarded back into the field with chaff, and remain viable to grow into nuisance weeds in following seasons, and to contribute to the weed seed bank.

There are typically two waste paths coming out of a combine. Larger waste such as straw exits or is "walked" out of the top of the combine machine; and smaller waste is sent out the back of the combine, often tossed by a spreader, either on surface or in a trench. The combine gets nearly all seeds, including those from any cover crop, and from the cash crop. Weed seeds are also sent out back of combine with the smaller waste, often tossed by a spreader. Weed seeds are almost always smaller in size than seeds or grains of the cash crop. In a chaffer or top sieve, adjustable perforations allow grain to penetrate. The top sieve typically oscillates to convey material toward the rear of the machine. An air blast from a fan levitates the mat of material to be sorted and the air flow blows away the light chaff, and also typically, weed seeds. Underneath the top sieve is the lower sieve, which is very similar but has smaller openings. It also oscillates and uses an air blast from a fan to separate grain from chaff. Any material that passes through this lower sieve should be clean grain or cash crop. Any material that passes through the chaffer but not the sieve will go into the tailings return or out the back of the combine. This material, MOG (Material Other than Grain) is spread back on the land/field, and can include light chaff, stalks, pods, cobs, and other plant or non-plant material and notably—weed seeds.

Seed shatter figures importantly in weed seed dynamics. Seed shatter is the percentage of seeds that drop from a weed plant prior to harvest. Weed seed shatter research has shown high retention rates of weed seeds at harvest. Many weeds (such as wild mustard, foxtail, and ryegrass) retain 70% to 99% of seeds. Therefore, for many crops and weeds, a change of state for weed seeds in a harvest to lower germination viability will be effective at reducing weed seedbank levels and controlling weeds. In this sense, there is huge unmet need for reducing the weed seed bank by reducing germination viability.

For further information on combine harvesters, see [REF 3: Combine Harvesters: Theory, Modeling and Design, Petre Miu, CRC Press, Boca Raton, Florida, ©2016, hereby incorporated in this disclosure in its entirety].

Others have attempted to address weed seed control. For example, impact mills have been used to damage weed seeds. The Harrington Seed Destructor, by Raymond B Harrington of Cordering, Australia, disclosed in U.S. Pat. No. 8,152,610 to Harrington (Assignee: Grains Research and Development Corporation, Barton, ACT, AU) teaches fragmentation in a cage mill to damage and render useless weed seeds that would otherwise be discharged during harvesting onto a field. This solution is expensive, typically requires a follow-on vehicle, has high power requirements of 45 kW to ~80 kW, and suffers from operational problems such as machine sensitivity to soil, sand, and straw from the combine output causing excessive mill wear, and operationally, an increase in fine dust from the mills resulting in reduced operator visibility, as well as increased maintenance costs, and increased fire risk due to high levels of fine dust generated.

U.S. Pat. No. 6,401,637 to Haller discloses soil irradiation with microwaves. Our lab tests have shown this technique does not work. Microwaves have poor penetration into soil, and a very long time is required to heat up both the soil and any weed seeds. Also, microwaving seeds directly took longer in our lab tests, did not achieve workable and practical seed sterilization. Weed seeds in soil can quickly sink deeper into the soil after a rain.

Others have attempted to use heat to destroy weed seeds. While cooking a weed seed, to high temperatures will render it useless, wholesale heating of tailings is time-consuming and expensive and not practical given the large masses involved. In a prior art technique called solarization, sunlight and dark-shielding materials laid out on the ground are used to trap heat and elevate soil temperatures. Solarization is also time-consuming, and can take hours, working under ideal conditions, and there is the unaddressed question of substantial thermal mass of weed seeds shorn from the weed plants to treat from a typical combine process during operation. See [REF 4: Weed Science 2007 55:619-625 Time and Temperature Requirements for Weed Seed Thermal Death, Ruth M. Dahlquist, Timothy S. Prather, James J. Stapleton].

Some have attempted to use exhaust heat from a combine harvester to treat weed seeds. Such methods are time-consuming, cumbersome to effect, and ineffective. In one reference, temperatures of 75-85 C were insufficient to significantly reduce germination of seeds after three exposure durations. See [REF 5: Killing Weed Seeds with Exhaust Gas from a Combine Harvester, September 2019, Klaus Jakobsen, Jakob A. Jensen, Zahra Bitarafan, Christian Andreaen, Agronomy (received 16 Aug. 2019) DOI: 10.3390/agronomy9090544].

Oxidative signaling can influence seed germination. Reactive Oxygen Species (ROS) affect events in seed life and may play a role in regulating cellular growth. It is now known that the chemical group O2—plays a role in cell death. ROS may play a role in seed signaling, but ROS signaling transduction pathways in a seed are not fully understood. See [REF 6: Oxidative signaling in seed germination and dormancy, Hayat El-Maarouf-Bouteau and Christophe Bailly, Plant Signal Behay. 2008 March; 3(3): 175-182. doi: 10.4161/psb.3.3.5539 PMCID: PMC2634111 PMID: 19513212].

Many mechanical and thermal phenomena marshaled against undesirable plants by prior art devices, methods and teachings are not effective overall, and this is due in large part to the natural robustness of plants, due to their physiology and responses to natural trauma. The role of repair, regrowth, and even the beneficial effects of soil-borne microbes all play a role in the hardiness of plants to prior art thermal and mechanical methods for plant control.

Evaluation of effective methods for plant control using largely non-invasive phenomena is a difficult subject area to evaluate for general effectiveness because of many and varied biologic and environmental factors, including plant species, condition, type, environmental history, solar insolation, weather, and varied actions of insects, animals and microbiotica.

A key component for nearly all plants, including nuisance vegetation, is its root system, and the effects of rhizospheric soil. In this disclosure, individual access of weed seeds and seeds to the illumination protocol taught and claimed, as discussed below, figures importantly. But biological responses to unnatural illumination can be counter-intuitive and complex, and there are many unexpected phenomenological findings discovered.

Generally, seeds are special, being relatively robust, with significant water content, such as 18% water content, and they typically possess an outer protective shell. Seeds can sit 20 years in dry soil before germinating. Indeed, weed seeds are difficult to make unviable as they can stay viable even after having been in soil for decades. Some seeds have remained viable for 1600 years. Reports show a typical 40 years of viability even after residing in the soil, through temperature changes and the heaving and thawing of that soil. Seeds possess hard shells on the outside (the seed coat) that help preserve them from damage.

The following will review effects and phenomena, some counterintuitive, of the effect of visible light, ultraviolet light, and thermal radiation on plants and seeds generally.

Now referring to FIG. 1, a schematic representation of a general electromagnetic spectrum for wavelengths of radiation of significance that are potentially incident upon a plant, with wavelengths ranging from 1 mm to less than 100 nm, is shown. In the infrared portion, or heat radiation portion of the electromagnetic spectrum, there are subdivisions for Far-Infrared (FAR), mid or Medium Wavelength Infrared (MWIR) and near-infrared (NEAR) all in total ranging from 1 mm to 700 nm or 0.7 microns. Visible light (Visible Light) is commonly taken to range from 700 nm to 400 nm. Ultraviolet (Ultraviolet) radiation is generally taken to be of wavelength less than 400 nm, with near-ultraviolet further divided according to some consensus into known portions UV-A (400-320 nm), UV-B (320-280 nm) and finally, UV-C (280 nm-100 nm) which is extremely dangerous for humans and is often used as a germicidal radiation to purify water and kill bacteria, viruses, and other organisms.

There are competing standards for labeling portions of the electromagnetic spectrum, as promulgated by ISO (International Organization for Standardization); DIN (Deutsches Institut für Normung e.V). (German Institute for Standardization) and others.

It is important to note that in this disclosure and the appended claims, these and certain other subdivisions shall have particular meanings assigned here and will be defined herein in the Definitions Section.

Now referring to FIG. 2, a cartesian plot of both unfiltered solar radiation and net (ground) solar radiation is shown, with spectral radiance in watts per square meter per nanometer versus wavelength in nanometers (nm) is shown. Photosynthesis in plants makes use of visible light, especially blue and red visible light, and ultraviolet light, to varying degrees, depending on a host of factors including plant species and type, radiation exposure history, chloroplast type, internal plant signaling, light exposure history, and other factors. Note that nearly all the natural infrared radiation in sunlight is essentially in the region in or about near infrared (NIR), with wavelength shorter than 2 micrometers. This is in contrast to the unnatural illumination taught and claimed in the instant disclosure.

Approximately seven percent of the raw electromagnetic radiation emitted from the sun is in a UV range of about 200-400 nm wavelengths. As the solar radiation passes through the atmosphere, ultraviolet or UV radiation flux is reduced, allowing that UV-C ("shortwave") radiation (200-280 nm) is completely absorbed by atmospheric gases, while much of the UV-B radiation (280-320 nm) is additionally absorbed by stratospheric ozone, with a small amount transmitted to the Earth's surface. Solar UV-A radiation (320-400 nm) is essentially, for practical purposes, not absorbed by the ozone layer. As mentioned below, UV-B and UV-C radiation have been suggested to effect eradication of plants.

Plants tend to respond to UV-B irradiation and also to excessive visible light by stimulating protection mechanisms or by activating repair mechanisms to reduce injury and perform repair.

A common protective mechanism against potentially damaging irradiation is the biosynthesis of UV absorbing compounds, which include secondary metabolites, mainly phenolic compounds, flavonoids, and hydroxycinnamate esters that accumulate in the vacuoles of epidermal cells in response to UV-B irradiation. These compounds attenuate UV-B range radiation and protect the inner or deeper cell layers, with little absorptive effect on visible light.

UV-B radiation is considered highly mutagenic, with plant DNA particularly sensitive. UV-B radiation causes deleterious phototransformations and can result in production of cyclobutane pyrimidine dimers (CPDs) and pyrimidine (6-4) pyrimidinone dimers (6-4 Pps). DNA and RNA polymerases are generally not able to read through these photoproducts and the elimination of these cytotoxic compounds is essential for DNA replication and transcription and for plant survival. To cope, most plants have developed repair mechanisms including photoreactivation, excision, and recombination repair. Photoreactivation is a light-dependent enzymatic process using UV-A and blue light to monomerize pyrimidine dimers: Photolyase binds to the photoproducts and then uses light energy to initiate electron transfer to break the chemical bonds of cyclobutane rings and restore integrity of the bases.

It is now known that plant roots also are simply generally sensitive to UV-B light levels, such as via the action of the gene RUS1, and can pass this information on to other parts of a plant responsible for growth and development. Low dosages of UV-B light can provide important signals to the rest of the plant and can be beneficial to plant growth, helping young plants develop in a timely way, and helping promote seedling morphogenesis. For long term exposure of weeks' duration, too much UV-B light can be toxic to some plants. However, any resulting lethality is not suited for meeting the purposes served by the instant invention, as discussed below.

The allelopathic behavior of plants can be influenced by exposure to added (artificial) UV-B radiation [REF 7: "Allelopathic Influence of Houndstongue (*Cynoglossum officinale*) and Its Modification by UV-B Radiation," Nancy H. Furness, Barbara Adomas, Qiujie Dai, Shixin Li, and Mahesh K. Upadhyaya; Weed Technology 2008 22:101-107].

Importantly, UV-B radiation can trigger biochemical steps to activate internals processes such as wax production to provide a plant with protection against further ultraviolet radiation [REF 8: "A UV-B-specific signaling component orchestrates plant UV protection," Brown B A, Cloix C, Jiang G H, Kaiserli E, Herzyk P, Kliebenstein D J, Jenkins G I; Proc Natl Acad Sci USA. 2005 Dec. 13; 102(50):18225-30. Epub 2005 Dec. 5]. Plant epidermal flavonoids can protect the photosynthetic apparatus from UVB-mediated damage [REF 9: "Protection of the D1 photosystem II reaction center protein from degradation in ultraviolet radiation following adaptation of *Brassica napus* L. to growth in ultraviolet-B," Wilson, M. I. and B. M. Greenberg (1993) Photochem. Photobiol. 57, 556-563] [REF 10: "A flavonoid mutant of barley (*Hordeum vulgare* L.) exhibits increased sensitivity to UV-B radiation in the primary leaf," Reuber, S., J. F. Bornman and G. Weissenböck (1996) Plant Cell Environ. 19, 593-601]. Given this background information, it is very notable to examine in the discussion below, how plants generally deal with large infrared and ultraviolet/visible light exposures.

Now referring to FIG. 3, a partial schematic representation of a class of prior art plant eradication using various large infrared radiative transfers is shown. A plant Y with root R is shown receiving a large infrared radiative transfer from a forest fire, or any number of prior art infrared radiation-producing processes listed as shown, such as via a flame, an incandescent body, a hot gas, vapor (e.g., steam) or fluid, or via contact with a hot body, or via ordinary high intensity destructive exposure to known IR or infrared radiators.

Because of the their inherited ability to withstand forest fires and lightning strikes, most plants do not respond in large numbers to application of heat or thermal radiation as given in the prior art. Application of thermal contactors or applicators have not met with success. The heat thus delivered is ineffective or can be sometimes be beneficial or stimulative, with any resultant subsequent repair to a root often making the root and plant more robust to future thermal trauma.

Application of thermal energy and high doses of radiant energy have been shown in the prior art to burn, incinerate, discolor, or render useless above-ground plant components and seeds. Whether or not those same plants grew back, however, is often left unstated in prior art disclosures.

FIG. 3, which shows schematically as an example a FIRE impinging upon plant Y and/or root R, is followed by FIG. 4 showing a burned root with a burned stump as shown, such as might be found after a forest fire, with combustion byproducts, volatilized proteins or smoke SS rising from the stump as shown. Even obliterating plant Y above ground in this manner typically results in the response shown in FIG. 5, which shows Regrowth as shown.

It is not sufficient merely to damage certain components of a plant, such as causing senescence or incineration of above-surface foliage. While visible above-ground damage may be desirable or gratifying for an operator of a eradication machine, actual lethality can be short of expectations and short of what is required for a successful eradication system, particularly for agricultural applications where fast-growing species can regenerate in a matter of weeks. Notably, this same principle applies to seeds during and after a forest fire.

For example, prior art U.S. Pat. No. 5,189,832 to Hoek et al., discloses gas-fired burners which are directed at nuisance vegetation along a ground plane. This and other prior art methods which burn or heat plant parts usually fail, because plants have evolved to tolerate—and sometimes be stimulated by, forest fires and lightning strikes.

Similarly, when propane burners and heated ceramics burn off foliage, root structure and scattered seeds remain among plants, and many plants regrow, often from seed. Soil is an excellent thermal insulator both because of the presence of what are essentially refractory materials such as silica, sand, igneous rock particles, and the like—and also because of air content, moisture content, and because of its high thermal mass.

It has been found through experimentation that It takes approximately one hour for a 8000 btu/hour output propane torch to have significant thermal effects 2.5 cm into bulk soil. Common nuisance vegetation such as *Digitaris sanguinalis* in the crabgrass family, for example, is difficult to kill, regenerates easily after pulling, and is resistant to chemicals and thermal trauma.

Even at the high frequency, high energy portion of the electromagnetic spectrum, many weeds such as crabgrass are fairly transparent to UV-C and the lethality of UV-B for short term applications of low energy is small in degree and not sufficient for a commercially successfully eradication method.

Now referring to FIGS. 6 and 7, there is depicted one typical class of prior art eradication processes or occurrences whereby extreme ultraviolet light induced trauma is delivered with a large UV radiative transfer via general illumination or flash onto a naturally grown species *Digitaria sanguinalis* rooted into a soil grade as shown. The radiation shown in FIG. 6 is shown for illustrative purposes, ranging from visible light, through UV-A, UV-B and UV-C and beyond, into what is known as Far Ultraviolet, extremely virulent and dangerous forms of radiation.

First, it should be noted that with the various protection mechanisms that plants employ, added amounts of UV radiation are quite often ineffective, either wholly or in practice, for a suitable eradication process. When plants are normally in sunlight, they tend to develop a waxy layer on their leaves and other similarly exposed components. These plants tend to be resistant to UV radiation. In particular, monocots and dicots have protective cells, including a well-developed epidermis which comprises a waxy layer on top, called the cuticle. This waxy surface protects the leaves from sunburn, dessication (drying out) and reduces attacks by fungi, bacteria, virus particles and insects. This layer prevents what is called sunscald.

When moderate levels of UV radiation are used to attempt to clear nuisance vegetation, leaves can turn white in color as the radiation breaks down connections of layers, and as a result, the leaf is unable to conduct photosynthesis. Leaf components can die. However, the root structure and seeds remain, and the plant usually is able to adapt as after a forest fire, which inflicts similar radiation damage.

Evaluating the effect of artificial illumination on nuisance plants can be complex, with competing and conflicting effects and factors. Prior art techniques have not been successful, overall. In many cases, added illumination in the form of general UV rays containing UV-A, UV—B and UV-C frequencies has been found to give benefits. Inconsistencies in prior art research findings are due to differing plant biology and genetics; soil conditions; and ambient light, e.g., shady versus sunny conditions.

One of those inconsistencies is that, like grown plants, our research has found that seeds do not respond as well for the purposes of making them unviable for germination, to UV light, whether, UV-A, or UV-B.

There are many engineering considerations that figure importantly in determining the success of a weed seed control system using illumination, and they are similar to that for plants. Among the many other factors in play when using artificial illumination are:

[1] Actual operative (beneficial versus detrimental) result from illumination stress
[2] Effectiveness, such as expressed lethality in percent dead or made unviable after 30 days
[3] Total required input energy
[4] Time of Exposure and speed of operations. Increased speed is part of the subject of this disclosure.
[5] Infrared levels, visible light levels, UV-A levels, UV-B levels, and UV-C levels
[6] Lamp or light source system complexity, cost, the need for controls, ballasts, and operator safety guards
[7] Operator and bystander safety, specifically often regarding infrared and UV exposure danger. This is a significant disadvantage for prior art methods such as that disclosed in U.S. Pat. No. 5,929,455 to Jensen, which discloses an eradication method using high energy radiation, high in UV-B and especially UV-C radiation, which is dangerous and mutating. Jensen '455 uses very high applied power.
[8] Mutagenic effects from UV-B and UV-C to life forms at ground surface and into bulk soil. Although some mutagenic activity has been observed for even visible light, there is a steep exponential drop in mutagenic activity and effect for radiation over 320 nm wavelength.
[8] Ignition hazards, lamp unit operating temperatures, and cost of operation A successful weed seed control system will develop and meet high benchmarks regarding these factors. While some effectiveness has been found using prior art methods, it has only been effective for very large and dangerous radiative transfers. One reason why these dangerous and very high energy transfers have been used is because prior art low energy methods have not worked.

The method described by Kaj Jensen in U.S. Pat. No. 5,929,455 uses an extremely high energy, dangerous process, specifically using UV-B and UV-C which have very high and special, qualitatively different, lethality. Interestingly, certain species such as crabgrass are fairly transparent to it for low dosages. As stated, weed seeds also do not respond in a predictable or reliable manner to UV radiation. Jensen '455 uses no other kind of light and employs a high pressure mercury (Hg) vapor lamp with a strong 254 nm UV-C emission line and no intervening phosphor. Such emissions, including similar emissions lines from other selected arc discharge lamps are very dangerous, expensive and require extensive controls and safeguards. Jensen '455 uses dosages very far greater than 10,000 joules per square meter merely to stop or retard growth dependent on the type and size of the plant. Actual attempts at lethality for a successful eradication process for the type of radiation Jensen '455 arrays involves many tens of thousands of Joules per square meter exposure.

This type of high energy exposure of UV rays, along with very high levels of infrared and visible light, to kill life, including plant life, is known since at least the mid-20th century. During World War II and also during tests in decades after, it became known that certain high energy depositions of UV-B and UV-C radiation onto land kills vegetation and seeds, but often not completely—and it is energies in this regime, in terms of total Joules of deposited UV energy—that Jensen '455 uses.

The world's first hydrogen bomb test, conducted by the United States in the Bikini Atoll in March, 1954, had unprecedented explosive power, an equivalent explosive yield of as high as 15 Megatons of TNT (Trinitrotoluene). By contrast, the blasts at Hiroshima and Nagasaki in Japan in August, 1945 yielded an estimated 16,000 tons and 21,000 tons, respectively. Radiation effects from these blasts received very high attention and study.

According the Radiation Effects Research Foundation (RERF), a non-profit organization conducted in accord with an agreement between the governments of Japan and the United States, initial radiation effects were assessed by the Atomic Bomb Casualty Commission (ABCC) established in 1947, which was later re-organized into the RERF in 1975. This included extremely extensive and detailed epidemiological studies of health and longevity on more than 120,000 affected individuals, with research conducted for over fifty years. It also included detailed observations of effects on plants and animal life.

From the discoveries made after the bombing of Hiroshima and Nagasaki, regarding the effects on plant life from the measured emissions of electromagnetic (light) radiation, the application of a high amount of UV, including UV-A, UV-B and UV-C, to kill plants appears to be known. Generally, the energy of a typical atomic bomb is distributed roughly as 50% blast pressure, 35% as heat, and 15% as radiation (all types).

During the two atomic bomb blasts of 1945, the greatest number of radiation injuries was deemed to be due to ultraviolet rays. The origination of the ultraviolet rays comes from the extremely high temperature flash of the initial reaction in the detonated atomic bomb. These rays cause very severe flash burns and they were well known to have killed plant life. The radiation comes in two bursts: an extremely intense "flash" discharge lasting only 3 milliseconds, and a less intense one of longer duration, lasting several seconds. The second burst contains by far the larger fraction of total light energy, over ninety percent.

The first flash or discharge is especially rich in ultraviolet radiation, which is very biologically destructive. The total deposition energy of the initial flash alone is such that, with no time for heat dissipation, the temperature of a person's skin would have been raised 50 C by the flash of visible and ultraviolet rays in the first millisecond at a distance of just under 4000 meters from the blast zone.

This research was conducted by the Manhattan Atomic Bomb Investigating Group, formed on 11 Aug. 1945, two days after the bombing of Nagasaki, via a message from Major General Leslie R. Groves to Brigadier General Thomas F. Farrell. The biological effects of high amounts of UV radiation on plant life were especially obvious and pronounced by examining the aftermath of the first hydrogen bomb test on the Bikini Atoll.

Young naval officers on deck of the USS Bairoko witnessed, while in the Bikini Atoll about 50 km from the hydrogen bomb blast site, an intense flash followed by a longer radiation burst of some seconds duration, in turn followed by heavy, warm, blast-driven winds. The ultraviolet radiation from the flashes was sufficient to kill fish deep underwater, as evidenced by many varied fish floating to the surface, with bodies burned on one side or region, from incident UV rays. The ultraviolet radiation also killed plant life over a very large area. Various measurements were retained even though the blast destroyed many instruments that were set up in permanent buildings to measure it.

From the standpoint of acceptable efficacity for successful weed seed control process, all low energy previous prior art techniques that do not "cook" the seed, employ burning, scalding, etc., have fallen short and have not been acceptably effective. Speed of application and overall success rate are very important.

Generally, the delivery of natural trauma is not apparently effective as a bona fide reliable eradication method, because the plants and their seeds so treated tend to heal and regenerate, probably as a result of centuries of evolution. The delivery of illumination trauma in the low energy regime as attempted in the prior art is similarly not effective. High dosages of radiation that serve to scald, burn or incinerate a plant or weed seed can ironically result in regrowth of certain seeds, as the process resembles a forest fire, addressed by centuries of evolution among plants. Also, many prior art discoveries regarding application of artificial radiation to plants often exist ostensibly to serve another objective, such as benefitting the plant, by stimulating growth, removing pathogens or insects, etc.

U.S. Pat. No. 3,652,844 to Scott, Jr., teaches use of a 650 watt 10.6 micron $N_2CO_2$—He laser, causing immediate wilting. This is not a safe, low energy, fast, inexpensive method. The dangers of handling, and that of misguided beams that can ignite combustibles is significant. By contrast, the illuminations used in the instant invention only heat and warm up a seed modestly, such as by 2 C.

Reference is now made to U.S. Pat. No. 8,872,136, issued 28 Oct. 2014 to Jackson, et. al., application Ser. No. 13/553, 797. The entire disclosure of this prior issued patent, Jackson U.S. Pat. No. 8,872,136 is hereby incorporated herein by reference in its entirety and its subject matter arises from the same owner and obligation to assign.

Reference is also made to US Non-provisional patent application to Jackson, et al., Ser. No. 16/166,129 filed 21 Oct. 2018. The entire disclosure of this prior filed patent application Ser. No. 16/166,129, to Jackson et al. is hereby incorporated herein by reference in its entirety and its subject matter arises from the same owner and obligation to assign.

In U.S. Pat. No. 8,872,136 to Jackson et al., a substantially non-invasive low-energy low irradiance non-mutating method is taught and claimed for eradicating a plant in a time under one minute, using a Rapid Unnatural Dual Component Illumination Protocol (RUDCIP) with illumination about the plant—but a different method is given from that disclosed and claimed in the instant disclosure—different aiming, different wavelengths, and different protocols are given.

Jackson U.S. Pat. No. 8,872,136 discloses an aimed above-ground foliage and root crown damage illumination component comprising exposure using near-IR radiation directed to the foliage of the plant and/or its root crown—along with an aimed ground-penetrating UV-A illumination component, with UV-A radiation directed to the root crown of the plant and/or the soil grade immediately adjacent the root crown of the plant.

In the US non-provisional patent application to Jackson, et al., Ser. No. 16/166,129 filed 21 Oct. 2018, two different aimed radiations are applied: an Indigo Region Illumination Distribution to be directed to plant foliage and/or a plant root crown, and a Medium Wavelength Infrared distribution of light, to be directed to the ground, to a plant root crown and/or soil immediately adjacent the root crown. The research was fast moving, somewhat unpredictable, and revealed that making weed seeds unviable was fraught with counterintuitive results, and the illumination protocol taught and claimed here in the instant disclosure is a different one, superceded by new discoveries taught and claimed here. The illumination teaching of this disclosure is not aimed, uses different energies, a different protocol, and the use of an Indigo Region Illumination Distribution is, strictly speaking, not required, as can be seen in the appended claims. It is counterintuitive that a gentle process would work while more intense methods that might crack or damage a seed coat might not, which is suggested in the prior art by the practice of scarification, the weakening or opening of the coat of a seed to assist germination. The teachings and claims of the instant disclosure are drawn to a different problem, involving a different stage of plant life, and achieving a change of state to having reduced viability in a safe, low energy, practical manner, in the presence of chaff and confounding materials in a stream of agricultural tailings, as discussed in the specification below.

Seeds, in order to germinate, must rapidly create functioning chloroplasts. Reactive oxygen species may play a role in whether a seed successfully transitions to a growing plant. Again, of further interest and relevance in the instant disclosure are metabolic and signaling processes associated with photosynthesis and plant regulation, growth and self-protection. One main organelle, the chloroplast of a developed plant figures importantly.

Chloroplasts, the organelles responsible for photosynthesis, are metabolic generators, contain self-supporting genetic systems, and they can replicate. They are also highly dynamic and circulate within plant cells, and their operative metabolic behavior is strongly influenced by light color and intensity. Plant chloroplasts are large organelles (typically 5 to 10 microns ($\mu$m) in their longest dimension and comprise a double membrane chloroplast envelope, and also a third internal envelope, the thylakoid membrane. The thylakoid membrane forms a network of flattened thylakoids, which frequently are arranged in stacks.

It is well known that plants use blue and red light as primary drivers for photosynthesis, as well as to serve as signals and alarms for needed internal changes. A plant blue light response was documented as early as 1881 by Charles Darwin when he discovered what is now known as the blue light-induced phototropic response. Commercially available "grow" lamps use blue light as part of a distribution of wavelengths for maximum growth and viability. If excess light is given to a plant, stress can occur.

Generally, inside chloroplasts, abiotic stresses such as drought, high light, high temperatures, and salinity induce a reduction in CO2 takeup, and increased reactive oxygen species (ROS), which can lead to leaf senescence and yield loss. Plants have multiple mechanisms to either prevent the formation of ROS or eliminate them. However, it is important to note that leaf senescence is not same as plant senescence, dying, or eradication.

Reactive oxygen species are eliminated rapidly by internal antioxidative systems, and the chloroplast uses hydrogen peroxide levels to regulate thermal dissipation or elimination of excess light input energy, as managed by known photosynthetic electron transport mechanisms. Reactive oxygen species are also used to signal alarms inside plants, to regulate metabolism, gene expression and other factors to deal with stresses, including exposure to UV-A radiation. There are other mechanisms that employ light in plants, such as by various photoreceptors. Phytochromes are sensitive to red and infrared light and may act as temperature sensors. Phytochromes regulate the germination of seeds, synthesis of chlorophyll itself, and growth and development of seedlings, and onset of flowering. Cryptochromes are flavoproteins that are respond to blue and UV-A light, and influence circadian rhythms. Finally, phototropins are flavoproteins that mediate phototropism responses in higher plants, such as those notably observed by Charles Darwin in 1881.

Red light plays a role in many plants but regarding the instant invention, for making weed seeds unviable, our testing revealed another counter-intuitive result: red light irradiation was found not effective, and addition of red wavelengths to the protocol taught and claimed in the instant disclosure had no perceptible increase in effectiveness when compared to a control group.

OBJECTS OF THE INVENTION

Accordingly it is a broad aim of this invention to make weed seeds unviable when those weed seeds are gathered or harvested in grain production, such as in a harvester combine, surrounded by chaff and debris and confounding materials.

It is another object of this invention to allow for treatment fast enough not to substantially slow down the operation of a harvester combine, that may be generating a high mass of tailings.

It is another object of this invention that weed seeds can be made unviable under typical field operating environments, and in the presence of confounding materials also collected at harvest under high speed operation.

It is yet another object of this invention to operate below combustion temperatures so as not to start a flash fire, such as in the interior of a combine, rendering it destroyed.

It is yet a further object of this invention to make weed seeds made unviable just by themselves, as a foodstuff to prevent germination.

Other objects of this invention not given above will become clear from further reading of the specification.

SUMMARY OF THE INVENTION

A different, subtle but effective way to effect a change of state to having reduced germination viability of seeds, and weed seeds in particular has been discovered, using optical and thermal/optical trauma with unexpectedly low input energy and short exposure times using safe radiation. The invention allows reduction of viability for germination prior to discharging weed seeds back onto an agricultural field, reducing the weed seed bank and it uses a combination of irradiances not taught or suggested by the prior art in dealing with seeds, which are robust and can ordinarily otherwise retain viability for years or decades.

The instant invention appears remarkably effective and uses a dual available component, low energy, unnatural set of irradiances, in a tight, fast and safe protocol of under one minute duration with an Indigo Region Illumination Distribution of light and a specific Medium Wavelength Infrared radiation possible in any combination, with minimal energy needed and with no cooking or burning of weed seeds.

The invention can be used as a tool to combat herbicide-resistant weeds, and it can be used to equip multi-class combines to reduce weed seed viability during harvest operations, within a tight harvest window or time range of as little as a few seconds.

The invention comprises a high speed, substantially non-invasive, low-irradiance method to induce a change of state of a seed(S) to having reduced germination viability in a time under one minute, the method comprising illuminating the seed to achieve a minimum of 2 $J/cm^2$ cumulative illumination energy, and 0.2 $W/cm^2$ irradiance, but no more than 7 $W/cm^2$ average irradiance, of a light wavelength distribution comprising at least one of an Indigo Region Illumination Distribution (IRID) and infrared radiation that is substantially Medium Wavelength Infrared (MWIR)) radiation.

One part of the discovery made was that in providing the Medium Wavelength Infrared radiation, particular types of heated glass, especially heated borosilicate glass (Pyrex) in particular, were more effective than other sources for making seeds unviable for germination. The borosilicate glass was held at just under 500 C (773 K), with a Wiens Displacement Law peak emission of just under (2898/773=3.75 microns).

The invention can also include exposure options:

The invention can use Medium Wavelength Infrared radiation from 2-20 microns wavelength but more preferably includes substantially wavelengths ranging from 2 to 8 microns. Photoreceptors in the human eye have low sensitivity to this type of infrared radiation, and it is present in sunlight with very low spectral intensity.

The invention can also use a Indigo Region Illumination Distribution that includes substantially wavelengths ranging from 400 to 500 nanometers.

The method can employ a relative distribution where the light wavelength distribution is proportioned to be between 6 and 30 percent Indigo Region Illumination Distribution.

The invention can comprise illuminating the seed to achieve a minimum of 2 $J/cm^2$ cumulative illumination energy, and 0.2 $W/cm^2$ irradiance wherein said light wavelength distribution comprises both said Indigo Region Illumination Distribution and said infrared radiation that is substantially Medium Wavelength Infrared radiation.

The invention can also comprise a method wherein the Medium Wavelength Infrared radiation originates at least in part from any of from borosilicate glass, Pyrex® Glass Code 7740, soda lime glass, and aluminum oxide ceramic. The Medium Wavelength Infrared radiation can originate at least in part from an MWIR emitter (E+), wherein the MWIR emitter comprises a powder coat, and that powder coat can comprise any of borosilicate glass, Pyrex® Glass Code 7740, soda lime glass, and also aluminum oxide ceramic.

The invention also includes a high speed, substantially non-invasive, low-irradiance method with similar exposure options to treat a seed(S) in a processing theater (4) that receives at least part of a tailing flow in a harvesting process, so as to induce a change of state of the seed to having reduced germination viability in a time under one minute, with the method comprising transporting the seed to and from the processing theater; and illuminating the seed while in the processing theater to achieve a minimum of 2 $J/cm^2$ cumulative illumination energy, and 0.2 $W/cm^2$ irradiance, but no more than 7 $W/cm^2$ average irradiance, of a light wavelength distribution comprising at least one of an Indigo Region Illumination Distribution (IRID) and infrared radiation that is substantially Medium Wavelength Infrared (MWIR)) radiation.

The method can also include the following material handling options and be such that transporting the seed to and from the processing theater comprises transporting the seed to and from a weed seed accumulator (3), or alternatively, to and from a moving weed seed accumulator belt 3Z, 3ZE, 3Z8, 3ZE8); or alternatively, transporting the seed to and from a transmissive weed seed accumulator belt (3Z8), and wherein at least a portion of the illuminating the seed comprises passing at least some of the Indigo Region Illumination Distribution of the light wavelength distribution through the transmissive weed seed accumulator belt; or alternatively still, transporting the seed to and from a radiant weed seed accumulator belt (3ZE), and wherein at least a portion of the illuminating the seed comprises generating at least some of the Medium Wavelength Infrared radiation of the light wavelength distribution from heating of, and thermal emission from, the radiant weed seed accumulator belt itself.

The method can also be such that transporting the seed to and from the processing theater comprises transporting the seed to and from a radiant and transmissive weed seed accumulator belt (3Z8E), and wherein illuminating the seed comprises passing at least some of the Indigo Region Illumination Distribution of the light wavelength distribution through the radiant and transmissive weed seed accumulator belt, and wherein illuminating the seed also comprises generating at least some of the Medium Wavelength Infrared radiation of the light wavelength distribution from heating of, and thermal emission from, the radiant and transmissive weed seed accumulator belt itself.

The method can also include air assist and be such that transporting the seed to and from the processing theater comprises transporting the seed to and from a weed seed accumulator belt (3Z), and further comprises harvest handling by assembly and retention of the seed on a first portion of the weed seed accumulator belt, and expulsion of the seed from a second portion of the weed seed accumulator belt, by driving at least one of air flow and fluid flow through the belt, with the at least one of air flow and fluid flow so positioned to create a vacuum to assist in the assembly and retention at the first portion, and a positive pressure to assist in the expulsion at the second portion.

The invention can also include an illuminated harvester combine process with similar exposure and material handling options and comprising any of reaping (REAPER), threshing (THRESHER), and separating (SEPARATOR) a harvest to form tailings flow (TAILINGS); and further comprising illuminating the tailings flow, the illuminating comprising a high speed, substantially non-invasive, low-irradiance method to treat a seed(S) in a processing theater (4) that receives at least part of the tailing flow so as to induce a change of state of the seed to having reduced germination viability in a time under one minute, the method comprising transporting the seed to and from the processing theater; and illuminating the seed while in the processing theater to achieve a minimum of 2 J/cm$^2$ cumulative illumination energy, and 0.2 W/cm$^2$ irradiance, but no more than 7 W/cm$^2$ average irradiance, of a light wavelength distribution comprising at least one of an Indigo Region Illumination Distribution (IRID) and infrared radiation that is substantially Medium Wavelength Infrared (MWIR)) radiation. This process can also be such that the processing theater that receives at least part of the tailing flow comprises an auger elevator.

The invention also includes a radiant weed seed accumulator belt (3ZE, 3ZE8) for illuminating a seed to induce a state of reduced germination viability in a time under one minute, the radiant weed seed accumulator belt so constructed and so formed to comprise an MWIR emitter (E), in turn so formed, composed and positioned to emit Medium Wavelength Infrared radiation by heating of, and thermal emission from, at least a portion of the radiant weed seed accumulator belt itself. That MWIR emitter also can be so composed to enable the above exposure options.

The radiant weed seed accumulator belt can also be so constructed and formed to allow a light wavelength distribution comprising an Indigo Region Illumination Distribution IRID to pass through the radiant weed seed accumulator belt to allow transmission of the Indigo Region Illumination Distribution to the seed, and thus becoming a radiant and transmissive weed seed accumulator belt (3ZE8).

The radiant weed seed accumulator belt can also comprise a plurality of links so formed, linked, positioned and optically composed to allow the Indigo Region Illumination Distribution to be transmitted link-to-link and also to be emitted from the plurality of links to impinge upon the seed.

The invention can include an illuminated harvester combine comprising any of a reaper (REAPER), a thresher (THRESHER), and a separator stage (SEPARATOR), so formed to produce a tailings flow (TAILINGS); and further comprising an illumination unit (ILLUMINATOR/IE8/IE4) to illuminate the tailings flow, the illumination unit so formed to allow treating a seed(S) in a processing theater (4) that receives at least part of the tailing flow so as to induce a change of state of the seed to having reduced germination viability in a time under one minute, and the illumination unit comprising at least one of a MWIR emitter E and a IRID emitter 88, and further so formed, positioned and energized to allow illuminating the seed while in the processing theater to achieve a minimum of 2 J/cm$^2$ cumulative illumination energy, and 0.2 W/cm$^2$ irradiance, but no more than 7 W/cm$^2$ average irradiance, of a light wavelength distribution comprising at least one of an Indigo Region Illumination Distribution (IRID) and infrared radiation that is substantially Medium Wavelength Infrared (MWIR)) radiation. This illuminated harvester can include the above exposure options and material handling options, and can also be such that the processing theater that receives at least part of the tailing flow comprises an auger elevator.

The invention also includes a compact configuration agricultural illumination unit (ILLUMINATOR/IE8/IE4), the illumination unit so formed to allow treating a seed(S) in a processing theater (4) that receives at least part of a tailing flow (TAILINGS) so as to induce a change of state of the seed to having reduced germination viability in a time under one minute, and the illumination unit comprising at least one of a MWIR emitter E and a IRID emitter 88, and further so formed, positioned and energized to allow illuminating the seed while in the processing theater to achieve a minimum of 2 J/cm$^2$ cumulative illumination energy, and 0.2 W/cm$^2$ irradiance, but no more than 7 W/cm$^2$ average irradiance, of a light wavelength distribution comprising at least one of an Indigo Region Illumination Distribution (IRID) and infrared radiation that is substantially Medium Wavelength Infrared (MWIR)) radiation, with the MWIR emitter E and IRID emitter 88 so further sized, positioned, formed and assembled to allow that a substantial portion of the Indigo Region Illumination Distribution passes through the MWIR emitter E itself to be directed at the seed. This can include the above exposure options and material handling options, as applicable.

The invention also includes a harvest (Q), such as food, having undergone an illumination-induced change of state to having reduced germination viability in a time under one minute, comprising at least one seed(S), after being subjected to illumination to achieve a minimum of 2 J/cm$^2$ cumulative illumination energy, and 0.2 W/cm$^2$ irradiance, but no more than 7 W/cm$^2$ average irradiance, of a light wavelength distribution comprising at least one of an Indigo Region Illumination Distribution (IRID) and infrared radiation that is substantially Medium Wavelength Infrared (MWIR)) radiation. Treatment of the harvest can include the above exposure and material handling options as applicable.

The invention can also include an illuminated seed destruction mill to damage a seed(S) in a damage process, the illuminated seed destruction mill comprising a seed destruction mill (SEED DESTRUCTION MILL) so formed, sized, and operated for at least one of fragmentation and damage to a seed; an illumination unit (ILLUMINATOR/ IE8/IE4) so sized, positioned, operated, deployed, and energized to illuminate the seed proximate to the damage process, in a processing theater (4) proximate the damage process; with the illumination unit comprising at least one of a MWIR emitter (E) and a IRID emitter (88), and further so formed, positioned and energized to allow illuminating the seed while in the processing theater to achieve a minimum of ⅔ J/cm$^2$ cumulative illumination energy, and 0.06 W/cm$^2$ irradiance, but no more than 7 W/cm$^2$ average irradiance, of a light wavelength distribution comprising at least one of an Indigo Region Illumination Distribution (IRID) and infrared radiation that is substantially Medium Wavelength Infrared (MWIR)) radiation. This can also include the above exposure options as applicable.

BRIEF DESCRIPTION OF THE DRAWINGS

FIG. 3 shows a partial schematic representation of a class of prior art plant eradication using incineration via various large infrared radiative transfers;

FIGS. 4 and 5 show partial cross sectional, partial surface views of a plant in soil, with a root structure in soil, with regrowth after a typical large infrared radiative transfer as depicted in FIG. 3;

FIG. 8 shows a part surface view, part oblique cutout view of major components of an illustrative agricultural seed;

FIG. 9 shows a cross-sectional view of certain illustrative components of a dicot;

FIG. 10 shows a basic view of a seed after germination and emergence of a radicle;

FIG. 11 shows a basic illustrative surface view of an intact weed seed;

FIG. 12 shows a basic illustrative surface view of a damaged weed seed;

FIG. 13 shows a basic illustrative surface view of an damaged weed seed with accompanying chaff;

FIG. 14 shows a basic illustrative surface view of an intact weed seed with accompanying chaff;

FIG. 18 shows an illustrative weed seed accumulator belt that comprises pores or the like;

FIG. 27 shows a schematic depicting separate MWIR and IRID sources to irradiate a seed according to the invention;

FIG. 29 shows a listing of operative attributes for a class of prior art large radiative and large UV radiative transfers as depicted in FIGS. 6 and 7;

FIG. 35 shows a cross-sectional schematic similar to that shown in FIG. 34, but depicting a radiant and transmissive weed seed accumulator belt;

FIG. 36 shows the cross-sectional schematic of FIG. 35, additionally comprising a heat source to heat the radiant and transmissive weed seed accumulator belt;

FIG. 37 shows a cross sectional depiction of a radiant and transmissive weed seed accumulator belt with transmitting links;

DEFINITIONS

Figure 1:
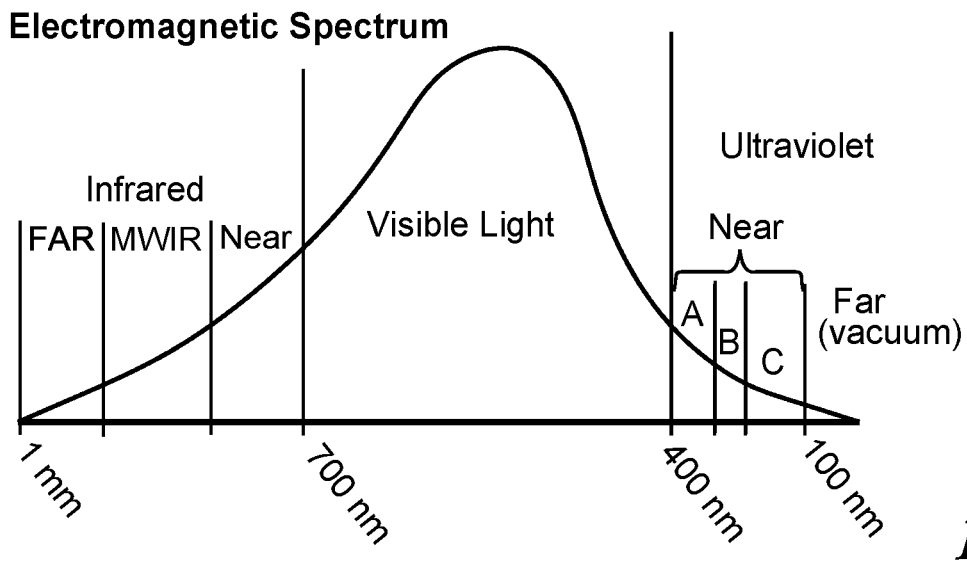
FIG. 1 shows a schematic representation of a general electromagnetic spectrum for wavelengths potentially incident from the sun, with wavelengths ranging from 1 mm to less than 100 nm.
Figure 2:
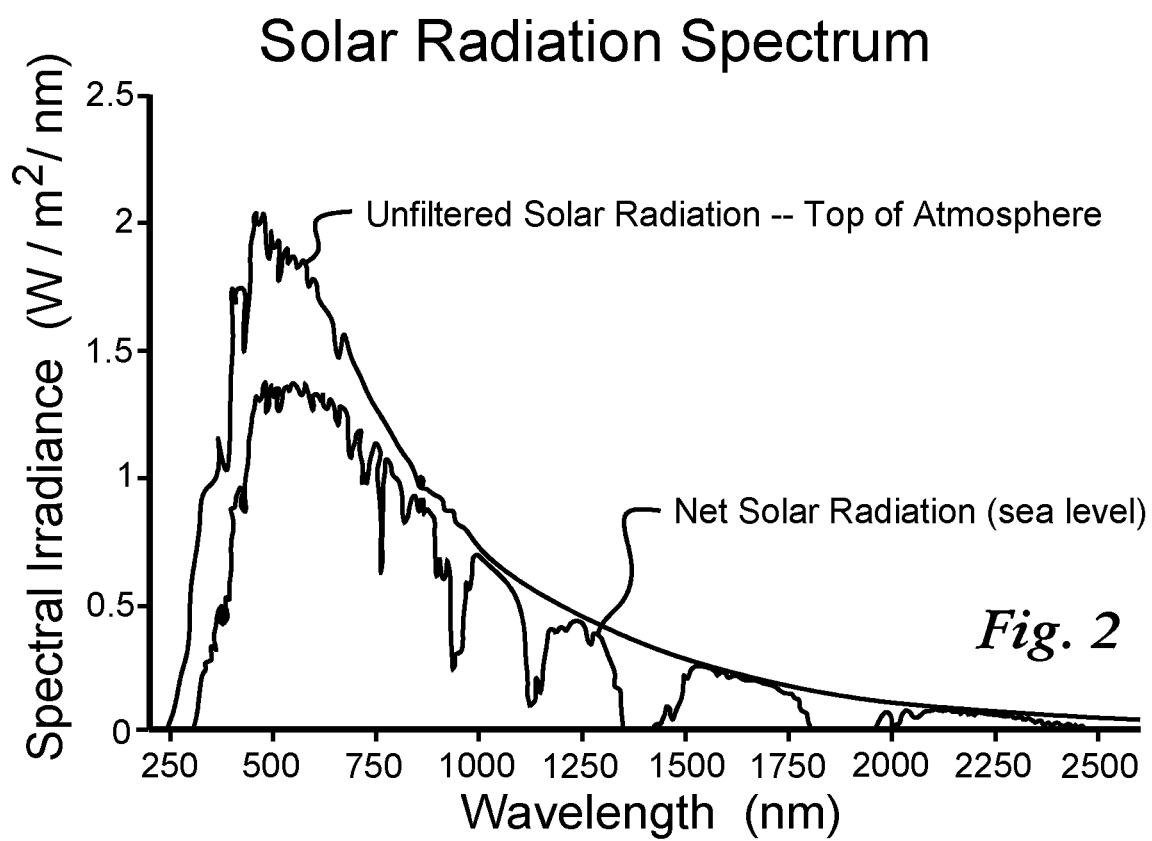
FIG. 2 shows a typical natural filtered and unfiltered solar radiation spectrum using a cartesian plot of spectral radiance versus wavelength.

The following definitions shall be used throughout:

Auger—shall include any helical component that effects movement of material, and any component that accomplishes the same function. A spiral-shaped component is not necessary and nor is a spiral path.

Belt—shall include any structure or material body that can serve as a web, conveyor, or transporter to facilitate illumination according to the invention. A belt that forms a processing theater can serve as a weed seed accumulator as defined here, and can itself also act as a radiator or transmitter of electromagnetic radiation as taught and claimed in the instant disclosure.

Chaff—shall include any of dry, scaly, or protective casings or coverings of seeds, such as parchment or endocarp-like coverings, husks or bracts; scaly parts of flowers; straw or finely chopped straw, and husks, stems, other debris connected to a plant, crop, foodstuff or harvest as defined here; and can also include stems, grass, leaves, sticks, heads of plants such as wheat head; attached soil, and field debris.

Change of state to having reduced germination viability—shall connote primarily a statistical attribute, namely, a decrease in the percentage of seeds capable of later producing growing plants for a given set of environmental conditions.

Coat/seed coat—shall denote casings, or other plant material surrounding a seed

Combine—shall be any machine that reaps, threshes and separates a harvest, as defined herein.

Damaged—as in damaged seed coat, shall refer to any material damage or degradation of a seed coat or a portion thereof, including punctures, dents, deep scratches, deformations, or significant abrasions.

Directed, directing—shall denote any net transmission of electromagnetic radiation as taught and claimed here, whether by direct illumination or via reflection or indirect transmission, such as via use of mirrors, light guides, via refraction, or incidental reflection or absorption and re-transmission through any material body, or through a chaff under treatment, or a seed adjacent to a seed under treatment, such as light passing between or through one or more seeds to another seed.

Field—shall include any agricultural surface, whether outside or inside a greenhouse or growing facility, and also any surface or place upon which the instant invention is practiced.

Germination viability—in this disclosure shall can be expressed as, and shall denote, unless otherwise stated, the percentage of seeds capable of later producing growing plants for a given set of environmental conditions.

Harvest—shall denote any agricultural product or biological material treated using the teachings of the invention, such as a harvest on a field or any reaping of live plants, whether considered a foodstuff or not; and also any biological product or material arrayed for treatment according to the instant invention. Harvest, as defined here, shall also include any agricultural product or crops or plants that have been reaped, cut, rolled, burned, tamped, shredded, or otherwise manipulated or treated by means other than by use of the instant invention.

Heater/Heating—shall include all thermal production and transfer, from any heat source, via contact or conduction; convection; or radiation.

Illumination—shall be interpreted broadly and shall include all manner of radiative processes as defined by the appended claims, and shall not be limited to lamp outputs, but rather shall encompass any and all radiation afforded by physical processes such as incandescence or any light emission process such as from a light emitting diode (LED); flames; or incandescence from hot masses, such as gases, fluids, steam, metal knives or hot infrared emitters—and can encompass multiple sources. Lamps shown illustratively in this disclosure shall not be considered limiting, in view of the appended claims.

Illuminator—shall denote light sources as taught herein for practicing the instant invention.

IRID/Indigo Region Illumination Distribution—shall denote a preferred range of frequencies, such as emitted by commercially available blue LED (light emitting diode) light sources with emission peaks named "royal blue" that denote a possible range of wavelengths that serve the instant invention. This definition shall include an Indigo Region Illumination Distribution to be defined to be any of the following wavelength ranges:
[1] A preferred range: 420-450 nm; [2] a larger preferred range of 420-480 nm; [3] a larger preferred range of 400-500 nm; [4] a yet larger preferred range of 400-550 nm; [5] and a broad range of 300-550 nm. This "indigo band" does not have to include indigo or blue or any particular "color" and does not have to include wavelengths in the preferred range of—wavelengths of 420-450 nm that are commonly assigned to indigo or near indigo as human perceptions. The addition of light for any reason, including for a trademark or appearance effect, e.g., aquamarine, shall not affect this definition. An Indigo Region Illumination Distribution IRID can include monochromatic, multichromatic frequency/wavelength lines or bands, continuous or non-continuous distributions, and distributions that comprise one of more emission lines, or distributions that are absent the general wavelength or frequency for which it is named, i.e., a distribution that is absent wavelengths generally given for indigo, that is, absent approximately 420-450 nm. Metamerism and the response of the human visual system to identify or form color perceptions shall not narrow this definition.

IRID Emitter (88)—shall denote any light producing device that has the requisite electromagnetic output properties to help produce an Indigo Region Illumination Distribution IRID that allows service to the instant invention as described in the appended claims, and can be an LED array IRID emitter 88, a laser, or an excited material body. An IRID emitter and a MWIR emitter can be combined into one body or component, or device.

Medium Wavelength Infrared—MWIR—has been variously defined by different international organizational bodies, sometimes using different terms. For example In the CIE division scheme (International Commission on Illumination), CIE recommended the division of infrared radiation into the following three bands using letter abbreviations: IR-A, from 700 nm-1400 nm (0.7 µm-1.4 µm); IR-B, from 1400 nm-3000 nm (1.4 µm-3 µm); and IR—C from 3000 nm-1 mm (3 µm-1000 µm). ISO (International Organization for Standardization) established a standard, ISO20473 that defines the term mid-IR to mean radiation with wavelengths from 3-50 microns. In common literature infrared generally has been divided into near infrared (0.7 to 1.4 microns IRA, IR-A DIN), short wavelength infrared (SWIR or 1.4-3.0 microns IR-B DIN), mid-wavelength (or medium wavelength) infrared at 3-8 microns (MWIR or mid IR 3-8 microns IR-C DIN) to long wavelength infrared (LWIR, IR-C DIN) 8-15 microns to far infrared 15-1000 microns. In this disclosure, throughout the specification, drawings and in the appended claims, MWIR in particular shall have a meaning assigned, and the wavelengths for MWIR shall span from 2-20 microns, and with preferred embodiments in a range of 2-8 microns and sometimes more preferably in a range of 3-5 microns. Source emissions can include emissions from an MWIR emitter E that is formed from materials with known emissivity functions useful in service of the invention, such as known borosilicate glass.

Mill/milling—shall include comminution or damage by grinding, pressing, crushing, cutting or splitting, and shall include percussive or impact processes, and any processing that pulverizes, reduces to powders, fractures, or otherwise comminutes or damages.

MWIR Emitter (E)—shall denote any glass or material body that has the requisite optical properties or electromagnetic emissivity properties that allow service to the instant invention as described in the appended claims. This can include glass known under the trade name Pyrex® such as borosilicate glass, which is preferred, or Pyrex Glass Code 7740, as well as Pyrex soda lime glass or other materials, such as aluminum oxide ceramic. Any material body which serves the invention with useful emissivity as an MWIR emitter when stimulated, excited, or heated shall meet this definition. An IRID emitter and a MWIR emitter can be combined into one body or component.

Minute of total operation/time under one minute—shall denote a process of illumination that shall include stepwise, piecemeal, segmented, separated, sequential, variable, or modulated exposures that when totaled, have a summed duration or the equivalent of under one minute, such as four 10-second exposures/flashes over a three minute time, or four ¼ second flashes in one hour.

Motion/in motion—shall include all generally moving states of a harvest, including [1] continuous motion; [2] stepwise motion that can include pauses, starts and stops, or even has reversals—in any combination; and motion induced by vibratory elements or supports that cause a harvest to generally progress, but not always progress, in space Non-invasive—shall include the attributes of not requiring stabbing, cutting, striking or significant mechanical stressing, except for contact with hot bodies or hot fluids such as hot gases or steam when used as a thermal equivalent of Medium Wavelength Infrared radiation as taught here.

Powder coat—shall include any and all coverings, coatings, surface treatments, appliques, and depositions to a surface, including using materials as disclosed, such as borosilicate glass, Pyrex® Glass Code 7740, soda lime glass, aluminum oxide ceramic.

Process—such as referred to in the instant disclosure and appended claims, including referring to a processing theater, can be a process as taught herein that is continuous in time, or non-continuous, including piecewise, piecemeal, stepped, interrupted or delayed application of the methods of the instant invention, and shall also refer to any process for which at least portion of which occurs in real time.

Processing theater—shall comprise any physical area, surface, belt, auger, conveyor, panel, web, screen, mesh, volume or space which facilitates, provides for, or allows illumination according to the instant invention and as described in the specification and appended claims, including any wind tunneling region, auger passage, sorting area, staging area, table, accumulator or harvest flow manifold used for processing of a harvest. In this sense, a processing theater can, but does not have to, include a mechanical or physical belt. It can instead comprise an transport area, region, structure, or material body where sorting, collecting, threshing, reaping, parking, consolidating, separating, resting, or landing of a harvest or processing product treatable by the instant invention occurs. The processing theater can also be situated upon, or proximate to, any field as defined in this disclosure.

Reaper/reaping—shall include any cutting or gathering process taking place on a field to input, gather, pull, or remove biological matter for treatment according to the instant invention.

Seed—shall include any embryonic plants, or encased plant embryos; agricultural products; and any other biological material such as microbiota, animals, fungi, and bacteria that are susceptible to, or treatable using the instant invention in the manner disclosed in the specification and appended claims. This definition shall apply even with assistance from natural processes that weaken seed coats or can otherwise assist with germination, such as sunlight exposure, heat of a fire, moisture exposure or water immersion, history of passing through an animal's digestive tract, or extreme and seasonal swings in ambient natural temperature or natural light levels.

Seed coat—shall include any protective outer coat of a seed, whether continuously covering the seed, or not; and whether it is hard or soft, pliable or hard, peelable or not easily peelable, and whether of uniform thickness, or having thickness bumps or gaps or thin spots. Seed destruction mill—shall refer to any process or device which damages seeds, including comminution or damage by grinding, pressing, crushing, cutting or splitting, percussive or impact processes, and any processing that pulverizes, reduces to powders, fractures, or otherwise comminutes or damages.

Tailing/tailings—shall include MOG (Material Other than Grain) and chaff as defined here, and other material that remains after attempted separation of a cash crop or desired grain or seed, from other materials, including undesirable weed seeds and volunteer seeds. Tailings can also include any harvest as defined here, and can be subject to processing according to the instant invention, including any material in an elevator or auger.

Viability/viable—can refer to the capability of a seed of germination under any of suitable, optimum, and sub-optimum conditions. Germination is marked by the development of a plant embryo, and subsequent growth. Viability in this disclosure can be expressed as the percentage of seeds capable of producing plants for a given set of conditions.

Weed seed—shall include any seed (as defined in this section), or portion thereof, treated according to the instant invention, including volunteer crop seeds, cash crops, and cover crops, and shall include any internal structures like the embryo, endosperm, and seed coat of such seeds.

Weed seed accumulator—shall include any belt, structure, material body or space that can serve to mechanically retain, support, or transport seeds, that forms a processing theater as defined in this section and throughout this disclosure illustratively. Weed seeds can be in motion across, upon or through a weed seed accumulator and can be retained by same in continuous, intermittent, paused or varied motion. A weed seed accumulator can also accommodate, retain or support chaff without departing from this definition. It is contemplated that an air pressure differential or an air flow can help weed seeds be retained or supported by, and later expelled by, a weed seed accumulator.

DETAILED DESCRIPTION

Referring now to FIG. 8, a part surface view, part oblique cutout view of major components of an illustrative agricultural seed are shown. Seed S is shown comprising an endosperm (ENDOSPERM), a food store for a later developing plant embryo; a germ (GERM) or embryo of the seed; and an outer coat (COAT) which figures importantly in the exposures taught and claimed in this disclosure. Typical sizes for seed S range from 0.025 inch (0.6 mm) to 0.25 inches (6.4 mm).

Referring now to FIG. 9, a cross-sectional view of some illustrative components of a dicot (dicotyledon) are shown. A dicot is shown illustratively, possessing a radicle (RADICLE), which is typically the first part of the seed that emerges upon germination. As the embryonic root of the plant, it supports the hypocotyl (HYPOCOTYL) as shown, which essentially acts as an embryonic stem of the seed S that would emerge upon germination. Attached to this embryonic stem are two leaves as shown.

This disclosure relates to seeds of all types, among them monocotyldons and dicotyledons. Monocotyledons (associated with one seed leaf, not shown) and dicotlydons (associated with two seed leaves, shown attached to the radicle) differ in early seedling development. In monocotyledons, a primary root is protected by a coating, a coleorhiza, which ejects itself to yield to allow seedling leaves to appear, which are in turn protected by another coating, a coleoptile. With dicotyledons a primary root radicle grows, anchoring the seedling to the ground, and further growth of leaves occurs. Either way, germination is marked by the growth and development of the radicle, and allowing the full development of a healthy plant.

Referring now to FIG. 10, a basic view of a seed after germination and emergence of a radicle is shown. This is an elongation, as shown, of the embryonic axis from seed allowing subsequent seedling emergence.

The teachings of the instant invention include specific protocols recommended from the findings of new research that tailor the protocol to seeds of various status types.

Referring now to FIG. 11, a basic illustrative surface view of an intact weed seed S is shown. As can be seen, the seed is essentially in original, undamaged condition. There is no significant material damage or degradation of the seed coat or any portion, including punctures, dents, deep scratches, deformations, or significant abrasions.

Now referring to FIG. 12, a basic illustrative surface view of an damaged weed seed Sd is shown. As can be seen in the Figure, damage (DAMAGE) is evident, as a deep dent and associated deformation, when compared to the seed S of FIG. 11. This can be the result of use of a seed destruction mill or other process, including any process that involves comminution or damage by grinding, pressing, crushing, cutting or splitting, or percussive or impact processes, and any processing that pulverizes, reduces to powders, fractures, or otherwise comminutes or damages.

Now referring to FIGS. 13 and 14, basic illustrative surface views of an damaged weed seed with accompanying chaff Sdc, and an undamaged Seed with accompanying chaff Sc, respectively, are shown. Dent/deformation damage (DAMAGE) is again shown for FIG. 13, along with a wisp-like structural chaff (CHAFF, shown later in this disclosure as KK). This chaff can be dry, scaly, or protective casings or coverings of seeds, such as parchment or endocarp-like coverings. The definition for chaff above is more broad and covers other confounding materials.

Figure 15:
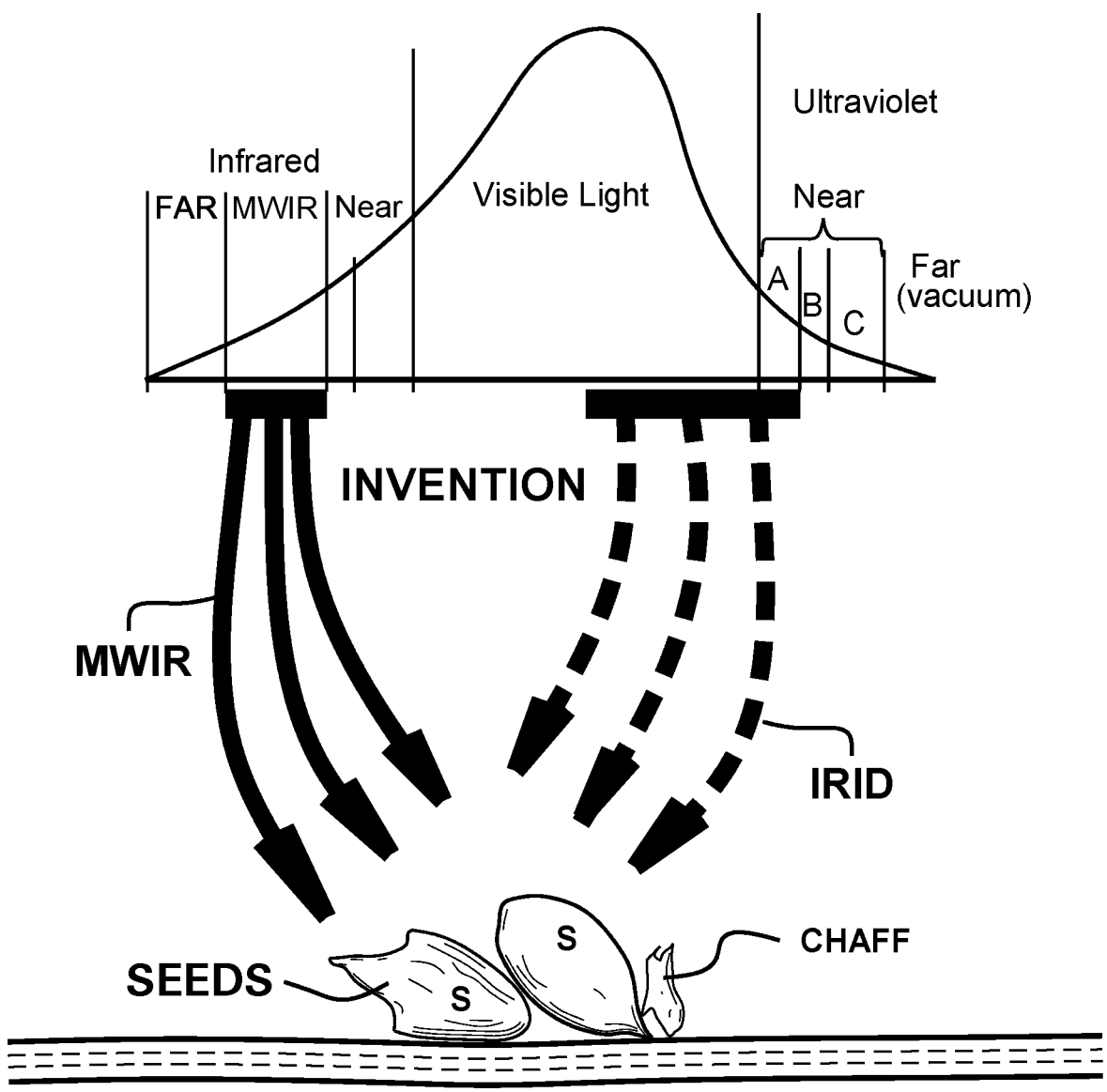
FIG. 15 shows a schematic representation of a process according to the invention to induce a change of state of seeds or weed seeds to having reduced germination viability using a dual component illumination protocol shown schematically for two portions of the electromagnetic spectrum as shown in FIG. 1 being directed upon seeds resting upon any surface.

Now referring to FIG. 15, a schematic representation of a process according to the invention is shown using a dual component illumination protocol shown schematically for two portions of the electromagnetic spectrum (as shown in FIG. 1) being directed upon seeds and chaff resting upon any surface, to induce a change of state of those seeds to having reduced germination viability in the statistical sense. The illumination load is shown illustratively as a harvest comprising chaff and other materials together resting upon a belt shown, but the materials can rest upon any surface, such as a ground/earth plane or soil, a stainless steel pan or reflector bed, etc. In this protocol, this high speed, substantially non-invasive, low-irradiance method for changing the state of a seed is accomplished in a time under one minute.

Described very briefly and qualitatively, the method comprises:

[1] illuminating a seed to achieve a minimum of at least one of ⅔ J/cm$^2$ cumulative illumination energy, and 0.06 W/cm$^2$ irradiance, of a light wavelength distribution comprising at least one of an Indigo Region Illumination Distribution (IRID) and Medium Wavelength Infrared (MWIR)) radiation. As will be discussed below, the protocol calls for an Indigo Region Illumination Distribution containing substantially wavelengths ranging from 300 to 550 nm, preferably 400 to 500 nm; and a Medium Wavelength Infrared radiation substantially composed of 2 to 20 micron wavelength radiation, preferably 2 to 8 microns. A preferred energy threshold and irradiance threshold that has been demonstrated to work comprises illuminating the seed to achieve a minimum of 2 J/cm$^2$ cumulative illumination energy, and 0.2 W/cm$^2$ irradiance.

Figure 16:
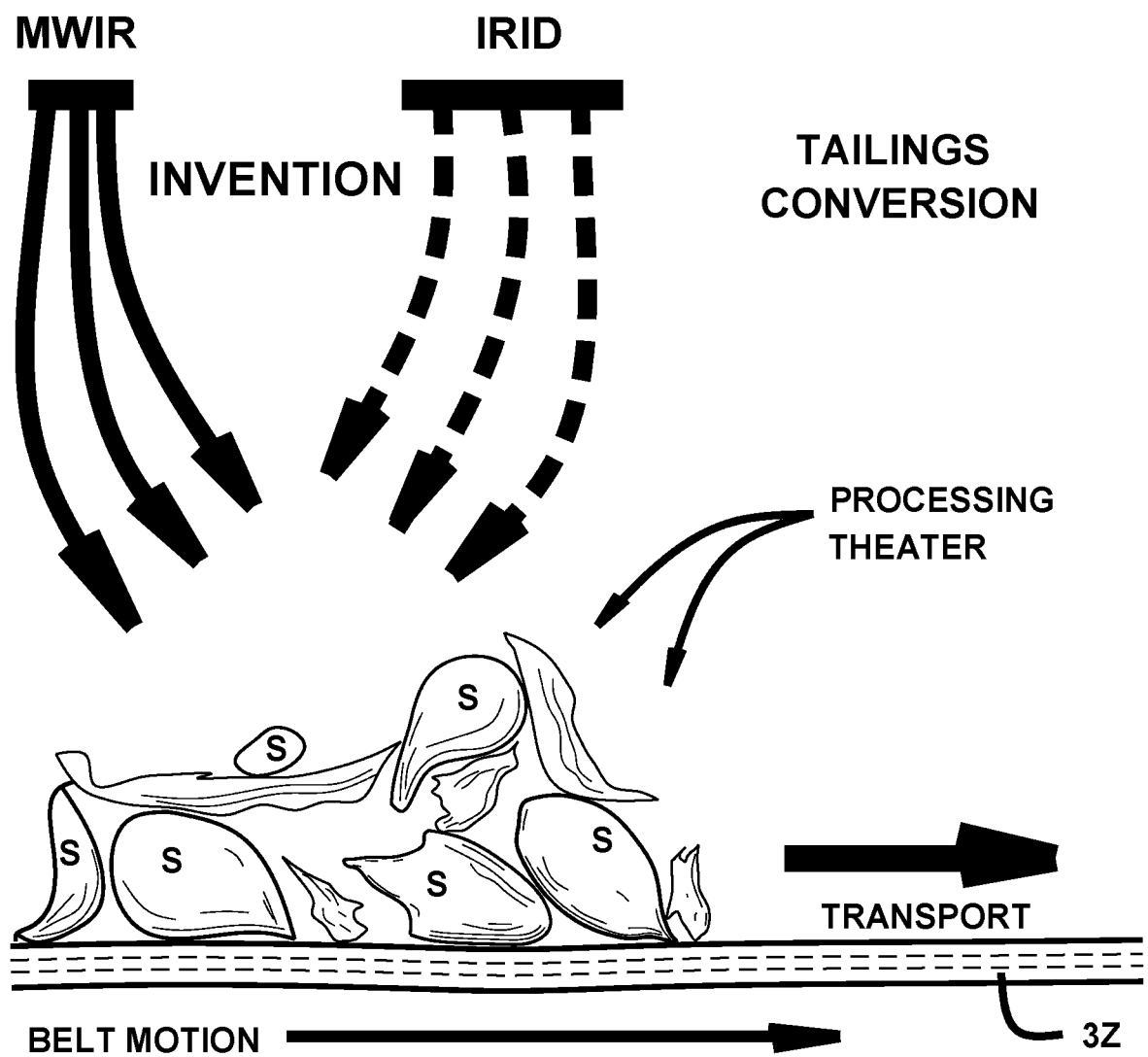
FIG. 16 shows a close-up view of the bottom portion of FIG. 15, showing incident rays for an Indigo Region Illumination Distribution and a Medium Wavelength Infrared illumination distribution aimed at a seeds under transport by a moving belt in a processing theater.

Now referring to FIG. 16, a close-up view of the bottom portion of FIG. 15 is shown, depicting incident rays for an Indigo Region Illumination Distribution and a Medium Wavelength Infrared illumination distribution aimed at the seeds under transport by a moving belt or weed seed accumulator belt 3Z, in a processing theater. This type of illumination protocol is further developed below with specific light source information and represents a departure from the prior art. The method discovered helps provide a wholesale change, quickly, in the number of seed post-process that successfully germinate and grow, an unanticipated finding.

As seen in the Figure, belt motion (BELT MOTION) effects illustratively a transport of what amount to tailings to the right in the Figure (shown, TRANSPORT) and this process makes it practical for the first time for use in automated equipment such as combines to convert the state of agricultural tailings generally.

Figure 17:
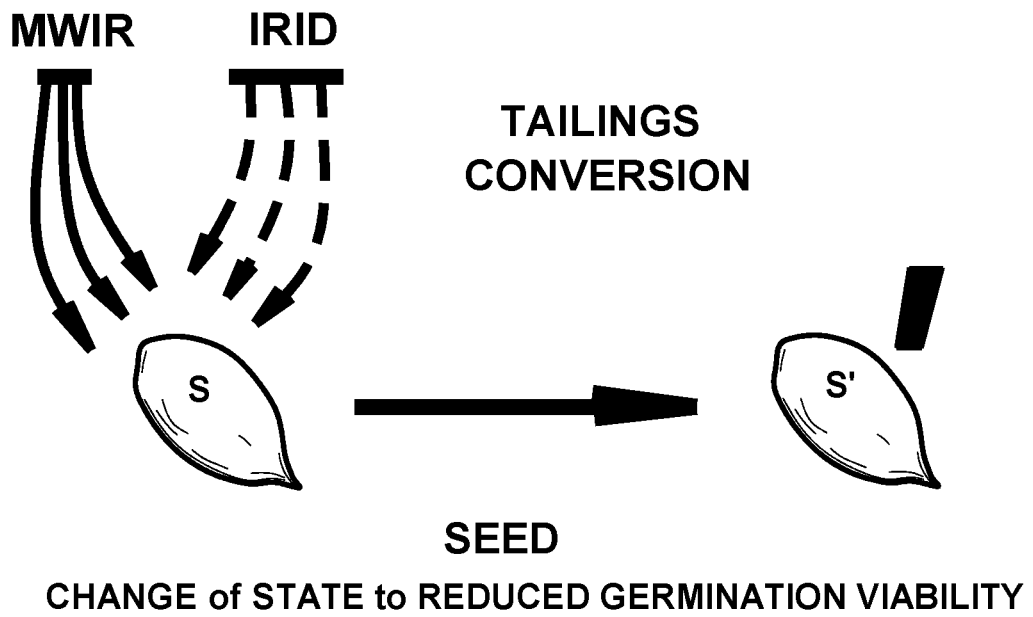
FIG. 17 shows a schematic of a tailings conversion process according to the invention, whereby either or both of Medium Wavelength Infrared and light from an Indigo Region Illumination Distribution are used to induce a change of state to reduced germination viability.

Referring now to FIG. 17, depicted is a schematic of the tailings conversion process according to the invention, as shown in FIGS. 15 and 16, whereby either or both of Medium Wavelength Infrared and light from an Indigo Region Illumination Distribution are used to induce a change of state to reduced germination viability to one or more seeds directly. In the Figure, a seed S is shown undergoing after illumination a change of state to having reduced germination viability, represented by S', a "new" seed that statistically, is less likely to germinate when considered among a statistical ensemble of seeds, such as found in the tailings of an agricultural process, or in a grain silo or other container holding seeds. In this sense, the invention as taught and claimed here can be used as a supplemental treatment for foodstuffs prior to packaging, containment, distribution, or further food processing.

Figure 18:
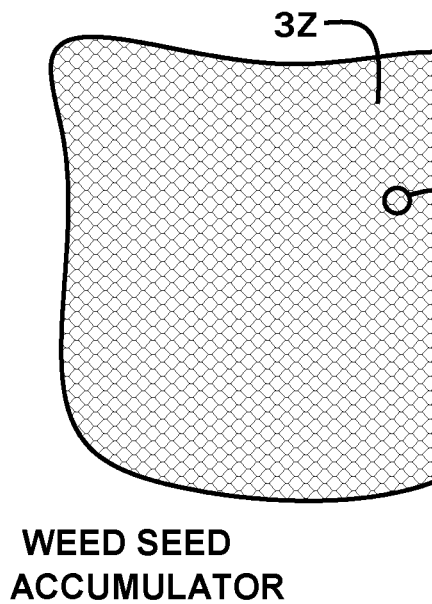

Now referring to FIG. 18, an illustrative weed seed accumulator belt 3Z or mat that comprises pores or the like is shown. To establish a processing theater to practice the invention—and for materials and tailings handling, generally—such belts have proven useful. A plurality of pores (pore) as shown can act to retain seeds for illumination, and the weed seed accumulator belt 3Z can allow passage of light and air. Ideal mat or belt thickness can be 3-6 mm (⅛" to ¼"), and for reasons given below, the belt itself can be formed from fiberglass, what amounts to Pyrex® glass to great advantage in increased efficacity for the invention itself. The fiberglass belt can be an important part of an illumination unit as described below (see description for FIG. 34) to effect a change of state of seeds to having reduced germination viability.

Figure 19:
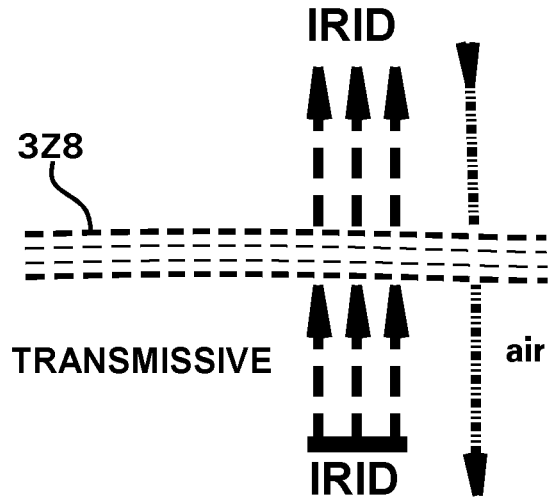
FIG. 19 shows a transmissive weed seed accumulator belt for use in a processing theater according to the invention.

Now referring to FIG. 19, a transmissive weed seed accumulator belt 3Z8 for use as a processing theater according to the invention is shown. The Pyrex® or fiberglass belt of FIG. 18 can be illuminated at the underside, allowing Indigo Region Illumination Distribution (IRID) light to pass through it and illuminate a load placed on top, as can be seen in Figures below. Air can also be passed through, for tailing materials handling purposes, such as to attract and later expel a mat of tailings being treated.

Figure 20:
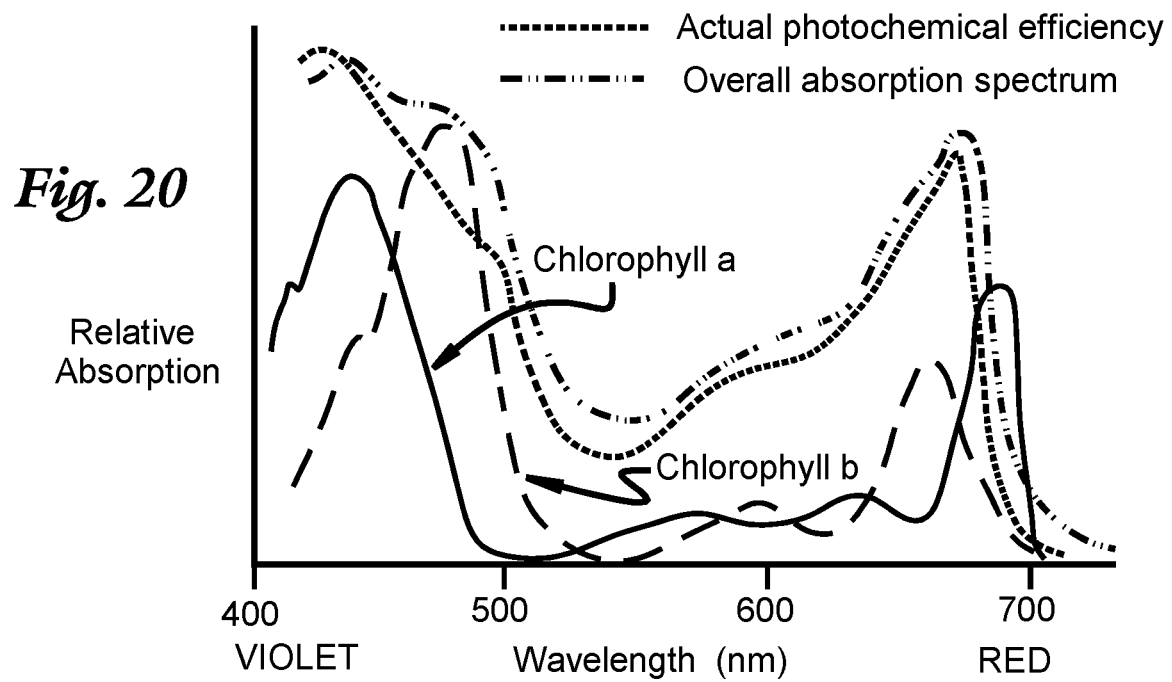
FIG. 20 shows a cartesian plot of relative optical absorption and photochemical efficiency for a plant as a function of wavelength from 400 to 700 nm, and showing absorption for Chlorophyl a and Chlorophyl b.

Now referring to FIG. 20, a cartesian plot of known relative optical absorption and photochemical efficiency for a typical plant is shown as a function of wavelength from 400 to 700 nm. The plot shows relative absorption for Chlorophyl a and Chlorophyl b, and also actual photochemical (photosynthetic conversion) for a typical plant, as well as the overall (optical) absorption spectrum of the plant overall. As can be seen there are two relative peaks centered about blue/violet and red light and this is the regime operation for the bulk of the excitation that fuel photosynthesis and internal regulation in plants, generally.

Figure 21:
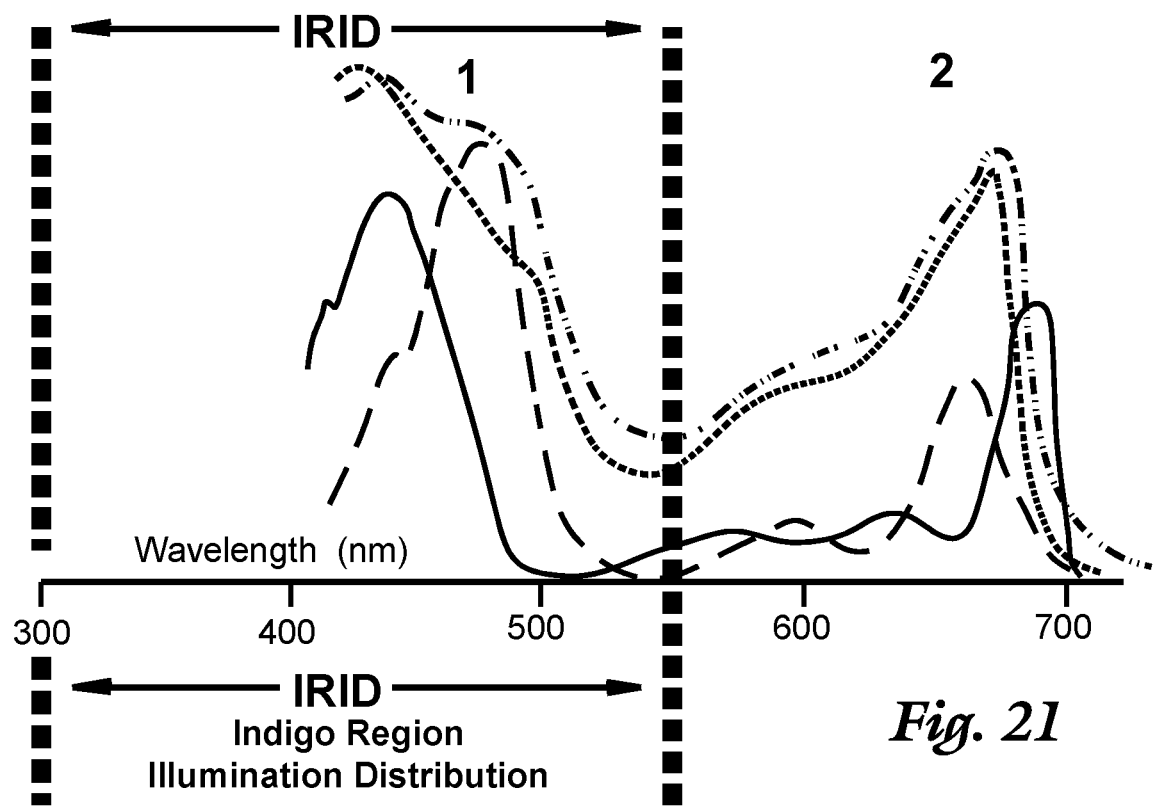
FIG. 21 shows the cartesian plot of FIG. 20, with a superimposed span of an Indigo Region Illumination Distribution shown.

Referring now to FIG. 21, the cartesian plot of FIG. 20 is shown, with the span of an Indigo Region Illumination Distribution IRID in service to the instant invention shown. As can be seen, the Indigo Region Illumination Distribution IRID can extend from 300 nm to a relative low between the two absorption peaks for a typical plant that are due to photochemical action of Chlorophyl a and Chlorophyl b. Specifically, the wavelength regime 1 shown in the Figure to the left of the vertical dotted line depicting 550 nm is that for use as the Indigo Region Illumination Distribution IRID according to the invention. The wavelength regime 2 shown to the right of the 550 nm line that includes yellow, orange and red was found from research and experimentation using controls to be not effective for treating seeds. Addition of this type of light from regime 2 is optional and may serve aesthetic or other purposes, but was discovered to be operationally ineffective for weed seed control. For example, it is notable that known red 650 nm peak LEDs (light emitting diodes) at the same power level as those used to form a Indigo Region Illumination Distribution to meet the protocol of the invention had no measurable effectiveness. However the actual spectral or wavelength distribution of light used to construct a Indigo Region Illumination Distribution IRID can vary.

Figure 22:
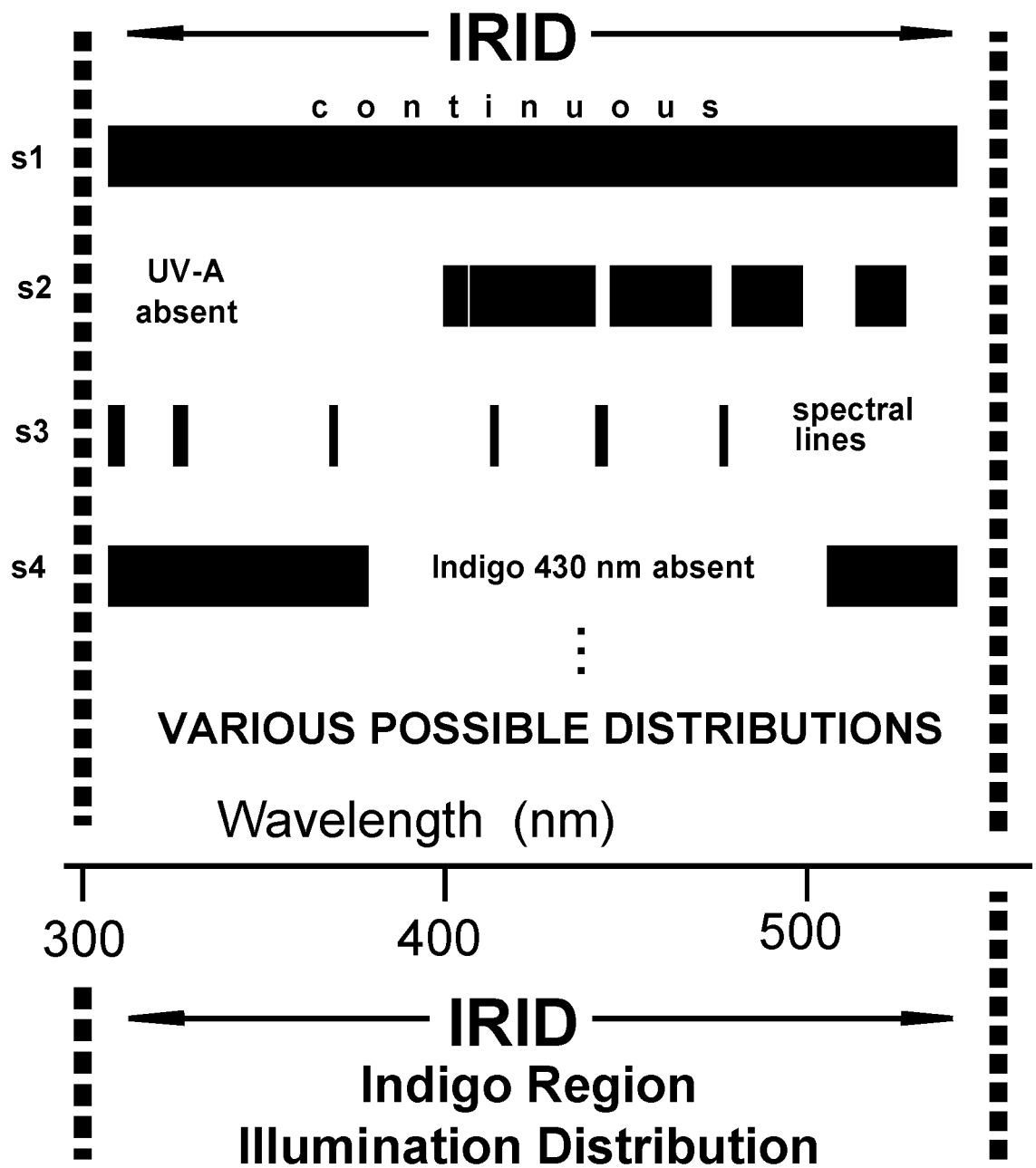
FIG. 22 shows a schematic representation across the range of 300 nm to 550 nm for an Indigo Region Illumination Distribution, with various illustrative possible distribution patterns.

Now referring to FIG. 22, a schematic representation across this range of 300 nm to 550 nm for an Indigo Region Illumination Distribution is shown with various illustrative possible distribution patterns that are possible. This Figure does not show spectral intensity, or spectral irradiance, that is, $W/cm^2$ per unit wavelength—which can vary. The Figure shows only the presence of radiation in particular wavelength, without intensity information.

The first distribution depicted, s1, shows a near full span of the range between 300 and 550 nm, continuous and solid. The second distribution s2 shows another possible distribution from 400 to 550 nn, not continuous and absent UV-A radiation. A third distribution s3 shows various spectral lines of output, with the highest energy radiation at about 480 nm, and consisting of only six emission lines as shown. This can arise from various light sources, such as lasers, and especially ion discharge lamps with no intervening phosphor, etc. A fourth distribution s4 is continuous in part like distribution s1, but is absent mid-wavelengths, and notably is absent wavelengths associated with indigo, for which the Indigo Region Illumination Distribution IRID is named. All these, and other similar distributions are possible in service of the instant invention. However from testing and experimentation, radiation at and around 430 nm appears to be the best for biological effectiveness in weed seed control.

Appearance of the Indigo Region Illumination Distribution IRID to the human eye shall not be indicative of suitability, A Indigo Region Illumination Distribution may not appear "blue" or 'indigo" to the human eye because of the effect of constituent wavelength components—and response of the human eye to light distributions, including known effects of metamerism, shall not limit or narrow the scope of the appended claims, nor narrow the instant teachings.

As stated above, a Indigo Region Illumination Distribution IRID contains wavelengths of light substantially coincident with a short wavelength absorption relative peak (generally of wavelength less than 550 nm) of a grown plant. In the protocol taught and claimed in the instant disclosure, the preferred range of wavelengths for the Indigo Region Illumination Distribution is 400-500 nm, with a distribution centered at about 430-450 nm.

Known commercially available high output "blue" LEDs (light emitting diodes) can be used to provide necessary light for Indigo Region Illumination Distribution IRID, providing light generally in a wavelength range from 400 to 550 nm. For example, known SiC (silicon carbide) based LEDs with output from 430-505 nm (appearance blue) are available and have a Forward Voltage of 3.6 volts; GaN (Gallium Nitride) and InGaN (Indium Gallium Nitride) based diodes are also available. Mixture of GaN with In (InGaN) or Al (AlGaN) with a band gap dependent on alloy ratios allows manufacture of light-emitting diodes (LEDs) with varied output peaks. Some LED devices using Aluminium Gallium Nitride (AlGaN) produce ultraviolet (UV-A) light also suitable for a Indigo Region Illumination Distribution, and known phosphors can be used to extend spectral range or to serve another objective such as making a trademark color splash without departing from the scope of the invention and appended claims.

To construct a Indigo Region Illumination Distribution IRID source, commercially available high power UV/violet LED chips are thus available in varied peak distribution wavelengths such as 365 nm, 370 nm, 375 nm, 385 nm, 390 nm 395 nm, 400 nm, 405 nm, and 425 nm with input power ranging from 3 to 100 watts, such as available from Shenzhen Chanzon Technology Co., Ltd., ShenZhen, Guangdong, China. The embodiments shown in Figures which follow employ a 100 watt array, 450 nm peak output. Larger arrays can be built up from constituent chips to serve the requirements of the instant invention for larger scale applications.

Figure 23:
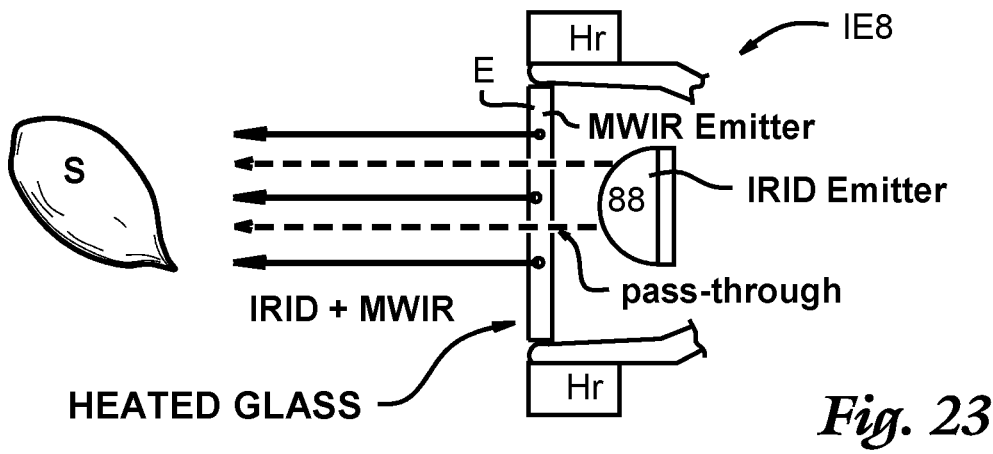
FIGS. 23 and 24 show cross-sectional representations of an illustrative proximity pass-through configuration illuminator according to the invention.
Figure 24:
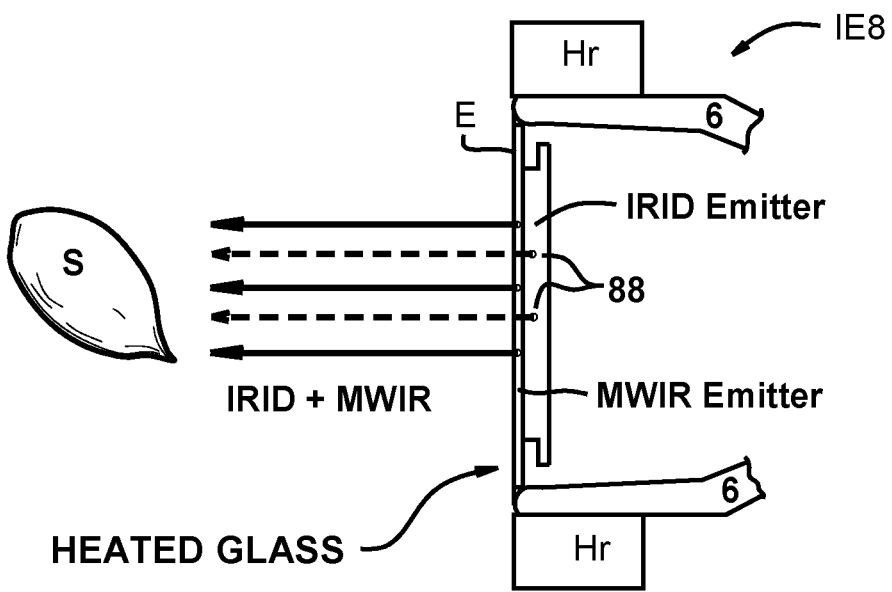

Now referring to FIGS. 23 and 24, simple schematic cross-sectional representations of an illuminator IE8, specifically a advantageous, compact proximity pass-through configuration illuminator (PROXIMITY PASS-THROUGH CONFIGURATION ILLUMINATOR) according to the invention, are shown. Inside a housing 6, are a IRID emitter 88 and a MWIR emitter E. As can be seen, the IRID emitter and the MWIR emitter are sized, positioned and oriented to allow light output from each of said IRID emitter and MWIR emitter to be substantially superposed for directing to seed S. with rays of type shown in FIGS. 15 and 16 being directed to the seed Sat the left of the Figure. Light generated as shown emerging from IRID emitter 88 passes through the physical MWIR emitter E. MWIR emitter E can comprise glass in various forms, such as plate glass, and be can be any of borosilicate glass, Pyrex Glass Code 7740, soda lime glass, and other materials like aluminum oxide ceramic, and any such as that having high thermal emissivity in the range of Medium Wavelength Infrared wavelengths as defined herein. This can include materials having coatings or surface treatments that have favorable MWIR emission characteristics. The use of Pyrex® or other borosilicate glass was the best mode, by far, in providing Medium Wavelength Infrared radiation that was unexpectedly effective at effecting a change of state to having reduced germination viability for seeds.

MWIR emitter E is heated using a heater assisted by a heating ring Hr as shown, in thermal communication with illustrative glass (e.g., borosilicate glass) of MWIR emitter E. Borosilicate glass and other similar materials conduct heat across themselves, and this heated glass allows efficient coupling into MWIR wavelengths and allows a pass-through of Indigo Region Illumination Distribution IRID light as shown.

Figure 25:
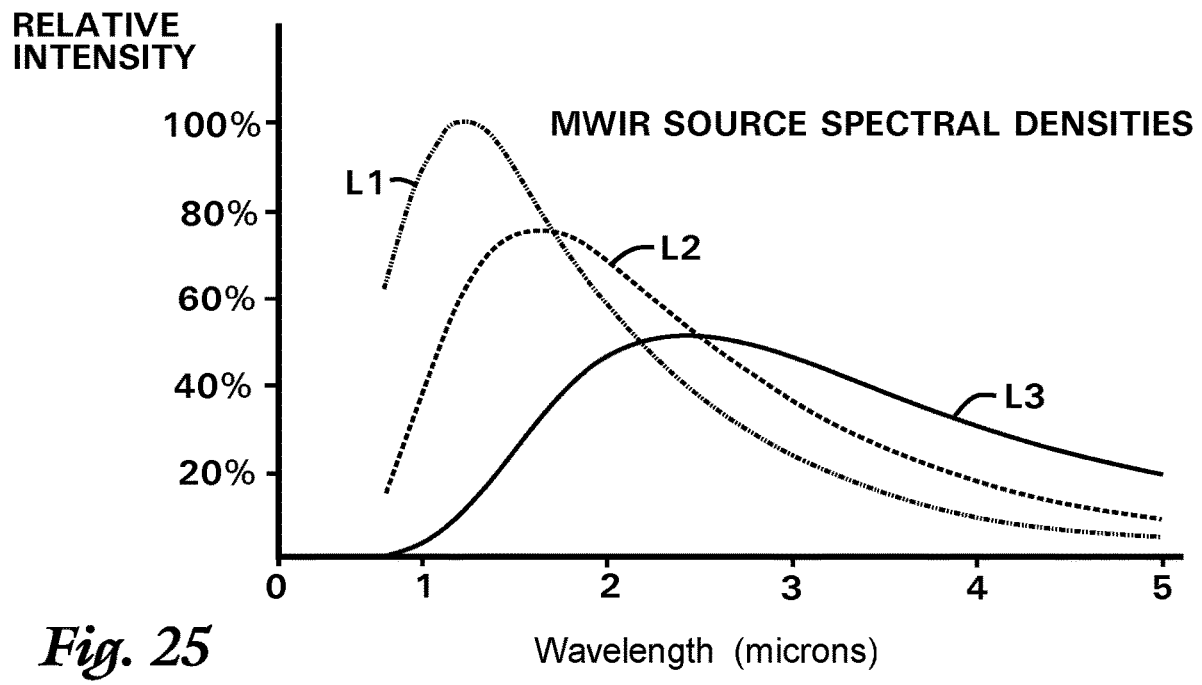
FIG. 25 shows three illustrative cartesian plots of spectral density versus wavelength for three possible Medium Wavelength Infrared light sources for use by the instant invention.

An alternative to heating a preferred borosilicate glass MWIR emitter E using a heating ring Hr is the use of heat sources in the form of commercially available known tubular lamps, and illustrative spectral densities for these are given in FIG. 25.

Now referring to FIG. 25, three illustrative cartesian plots of spectral density versus wavelength for three possible Medium Wavelength Infrared light sources for use by the instant invention are shown. In the instant teachings, the wavelength of the MWIR emitter E figures importantly, with 2-8 microns preferred, including 3-5 microns.

Figure 45:
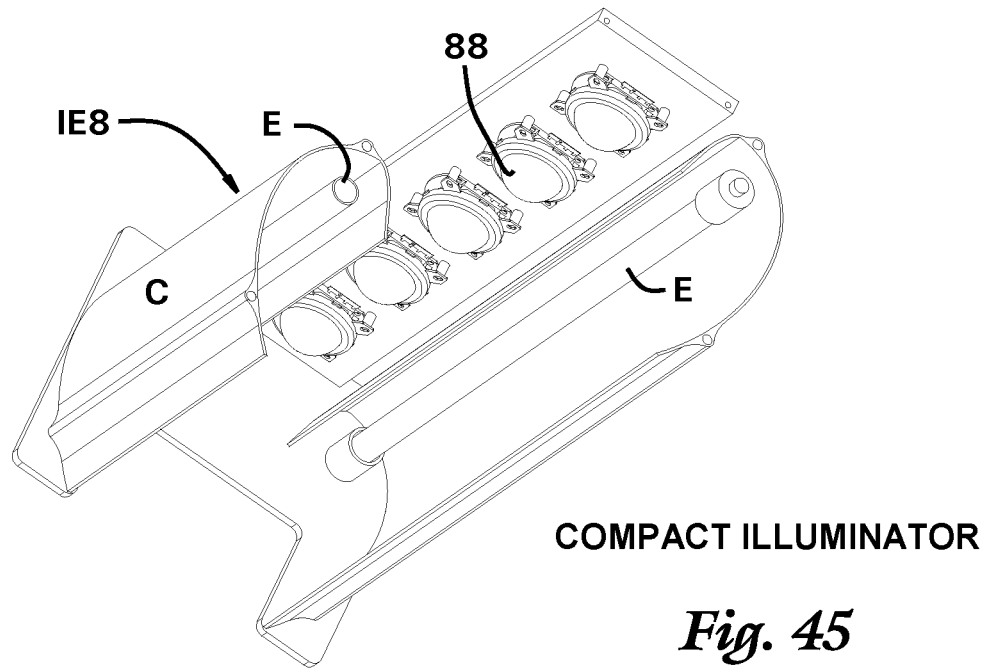
FIGS. 45 and 46 show oblique surface views of the compact illuminator depicted in FIG. 44.
Figure 46:
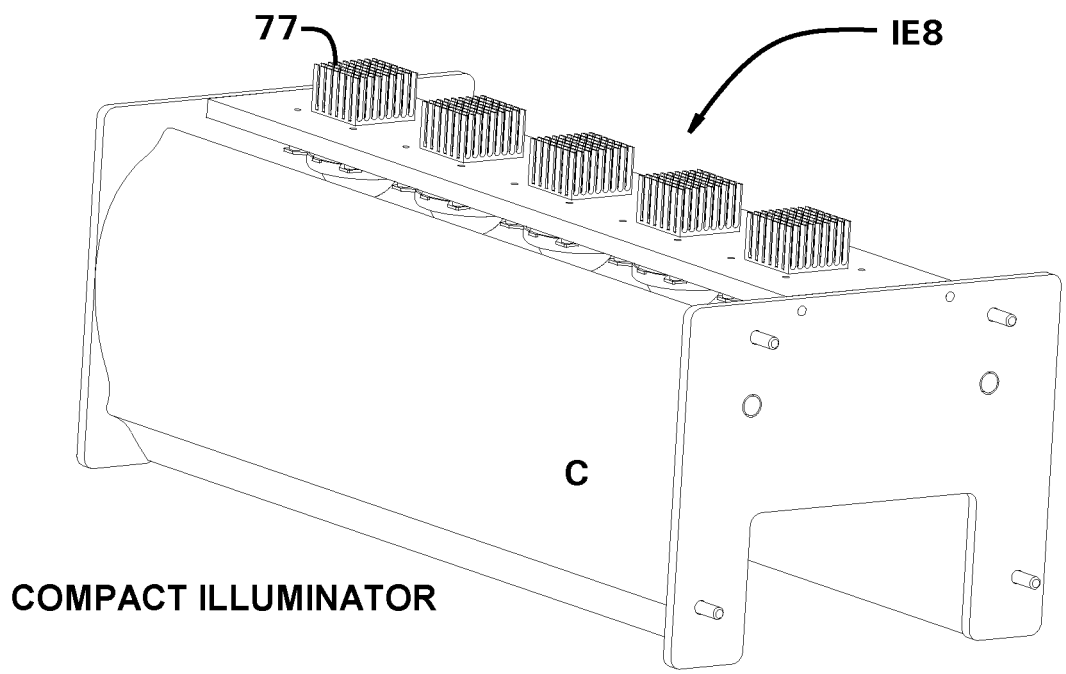

Such tubular lamps provide radiation in service of the instant invention, or provide thermal excitation to produce such radiation, as discussed below (see FIGS. 44-46, and other Figures). They tend to follow closely Wen's displacement law, which states that the black-body radiation curve for different temperatures of the black body will peak at different wavelengths that are inversely proportional to the temperature, a consequence of the Planck radiation law giving the spectral intensity as a function of wavelength for a given temperature. Wen's displacement law states $$\lambda_{peak} = b/T \qquad \text{Eqn 1}$$

where $\lambda_{peak}$ is the peak wavelength (microns); b is Wien's displacement constant, 2898 micron-K; and T is the absolute temperature in Kelvin.

The three spectral plots represent three different tubular lamps:
- L1 depicts a spectral density for a clear halogen lamp with a pyrex outer jacket, operating temperature 2400K, with a peak output wavelength of 1.3 microns. This lamp is preferred to obtain high radiation output because of its high operating temperature, and the output can be used to excite borosilicate glass in proximity, as known by those of ordinary skill in the art of lamp design and heat sources.
- L2 depicts a ruby/gold-plated halogen lamp spectral density for a clear halogen lamp with a pyrex outer jacket, operating temperature 1800 K, with a peak output wavelength of 1.6 microns.
- L3 depicts a spectral density for a clear halogen lamp with a carbon fiber filament and a quartz outer jacket, operating temperature 1200 K, with a peak output wavelength of 2.5 microns. This lamp is preferred when using as a direct light source to practice the instant invention, because the substantial share of the radiation output is at the preferred range of 2-8 microns.

These above lamps (not shown) are standard configurations and available from Lianyungang O-Yate Lighting Electrical Co., Ltd, Lianyungang City, Jiangsu Province, China.

Figure 26:
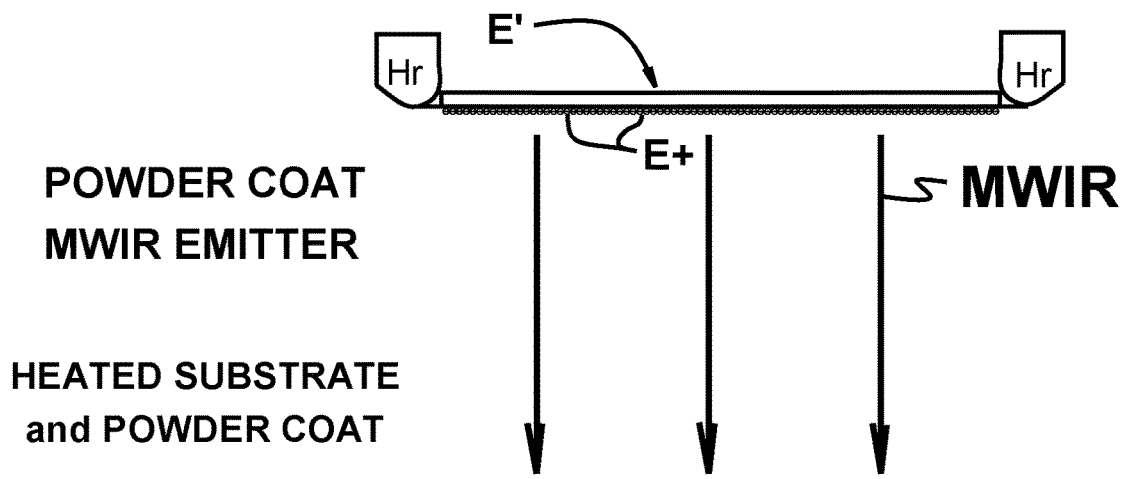
FIG. 26 shows a cross-sectional schematic view of a Medium Wavelength Infrared (MWIR) emitter that employs an emissive powder coat for enhanced emission.

FIG. 26 shows a cross-sectional schematic view of a Medium Wavelength Infrared (MWIR) emitter that comprises an emissive powder coat for enhanced emission. A powder coat MWIR emitter, e.g., ground or powdered borosilicate glass, can be put onto a surface which is heated for operation according to the invention. Specifically, as shown, powder coat MWIR emitter E+ is affixed or coated upon a heated substrate E', which can derive heat from heat ring Hr or the above tubular lamps alluded to above in the description for FIG. 25. Rays from any Indigo Region Illumination Distribution IRID passing though powder coat MWIR emitter E+ are not shown for clarity. This embodiment can reduce costs and weight, and can allow for optimization of output. This allows the powder coat to be illuminated independently to provide heating. This excitation can include optical radiation (in a variety of possible wavelengths) such as from lamps; glowing filaments or other bodies, microwave radiation, laser light, and flood and spot lamps, such as high intensity halogen enhance filament lamps, or LED lamps, using known reflector or other optics. Arrays can be used that are proximate the powder coat MWIR emitter E+ along a length, or a spot beam can be used. In this illustrative example, a simple substrate which is not an Medium Wavelength Infrared emitter, can be used.

One can use known powdered, sintered, or particulate materials, comprising borosilicate glass or other glasses or MWIR emissive materials, to provide the main radiation source that establishes the specific Medium Wavelength Infrared MWIR called for in service of the invention as taught and claimed. If desired, underlying heated substrate E' can itself be a MWIR emitter E as well. In addition, MWIR emitter E+ can be externally optically energized from a distance—or heated with an external lamp or source (not shown) as those of ordinary skill in the art can appreciate.

It should be noted that based on experimental tests, we concluded that borosilicate glass provides more effective results than anything else tested, including heated quartz. The success of the borosilicate helps to confirm MWIR wavelengths are a key component of borosilicate emissions that destroy the weed seeds, and that UV (ultraviolet light) is not needed.

Now referring to FIG. 27, a schematic arrangement is shown using separate MWIR and IRID sources used to irradiate a seed S. Illustratively shown powder coat MWIR emitter E+ and LED array IRID emitter 88 are separately housed and light output is not undergoing superposition as in the previous FIGS. 23 and 24. Guide optics can be provided using known reflectors, transmitters, light guides, refractors, etc. to direct Medium Wavelength Infrared MWIR and Indigo Region Illumination Distribution IRID as taught and claimed. The guide optics can include moveable parts such as reflector flaps that respond yieldingly to a harvester combine separation stage conditions. Possible alternative Medium Wavelength Infrared MWIR sources can include known $CO^2$ (carbon dioxide) lasers, and infrared LEDs (Light Emitting Diodes).

Exposures

In various experiments, testing on soybean tailings (weed seeds and chaff), as well as tumbleweed seeds, and giant ragweed seeds, output from the protocol was planted in pots and grown in greenhouse conditions. We discovered that certain energies and irradiances worked to produce unanticipated results. As noted below, the remarkable effectiveness of using borosilicate glass (and to a lesser extent, certain other glasses) to act as a MWIR emitter E was also unexpected, and represents an unnatural exposure, because sunlight contains very little Medium Wavelength Infrared in the range of 2-8 or 2-20 microns. The addition of Indigo Region Illumination Distribution radiation helped increase efficacity further, especially with certain seeds.

From experimentation on various seeds, in various physical conditions, such as with and without damage, and with and without associated dry or scaly chaff, a number of effective operating regimes or exposures for the instant invention were discovered to work statistically, as follows, with the following as minimums:
- For weed seeds with damaged coats (Sd), illuminating a seed to achieve a minimum of at least one of ⅔ $J/cm^2$ cumulative illumination energy, and 0.06 $W/cm^2$ irradiance; and
- for weed seeds with damaged coats and chaff (Sdc), illuminating a seed to achieve a minimum of at least one of ⅔ $J/cm^2$ cumulative illumination energy, and 0.06 $W/cm^2$ irradiance.

The Medium Wavelength Infrared radiation preferably includes a narrower range of wavelengths, namely, including substantially wavelengths ranging from 2 to 8 microns.

The Indigo Region Illumination Distribution preferably includes a narrow range of wavelengths, namely including substantially wavelengths ranging from 400 to 500 nanometers.

The apportionment between Medium Wavelength Infrared and Indigo Region Illumination Distribution in the illumination can be wholly one or the other or any apportionment in between, such as 90% Medium Wavelength Infrared and 10% Indigo Region Illumination Distribution, and the light wavelength distribution can be proportioned to be between 6 and 30 percent Indigo Region Illumination Distribution.

Generally, the minimum protocol in a time under one minute, is illuminating a seed to achieve a minimum of at least one of ⅔ J/cm$^2$ cumulative illumination energy, and 0.06 W/cm$^2$ irradiance, of a light wavelength distribution comprising at least one of an Indigo Region Illumination Distribution (IRID) and Medium Wavelength Infrared (MWIR)) radiation. However, higher illumination energy and/or irradiances are highly recommended, with a preferred actual working protocol that provides results comprising illuminating a seed to achieve a minimum of 2 J/cm$^2$ cumulative illumination energy, and 0.2 W/cm$^2$ irradiance.

The most preferred, by far, of protocols was a strange discovery. Much better results were obtained using Medium Wavelength Infrared radiation that originates at least in part from any of borosilicate glass, Pyrex Glass Code 7740, soda lime glass, aluminum oxide ceramic, and a powder coat. This is an unnatural exposure. Sunlight has very little spectral irradiance in the Medium Wavelength Infrared range, about 0.005 W/cm$^2$. Based on newer tests that plant tailings into pots after treatment, samples treated using Medium Wavelength Infrared radiation specifically emanating from borosilicate glass (Pyrex®) got better results than anything else tested, included quartz and various tubular lamps as discussed above. The success of the borosilicate emissions helps to confirm MWIR wavelengths are a key component for success in changing the state of weed seeds to having reduced germination viability. Ultraviolet was found to be not needed, and the preference for the Indigo Region Illumination Distribution radiation to be substantially 400-500 nm increases efficacity and efficiency for the process.

Statistical success relied upon a thorough attempt to illuminate weed seeds as part of a tailings mass, and reflected light from a reflector was very advantageous to insure that many weed seeds got exposure on two sides, even if those two sides were not 180 degrees apart.

Regarding the use of the Indigo Region Illumination Distribution, we discovered that it allows getting performance of the invention from a broader group of seeds. Seeds with a greenish color like foxtail, barley, or wheat seeds with feather out top did very well in testing with a significant portion of the illumination from a Indigo Region Illumination Distribution. Because a seed bank contains a variety of seeds, it is recommended that the Indigo Region Illumination Distribution be part of the protocol. The proportion of blue light that falls in the Indigo Region Illumination Distribution wavelength ranges is about 0.02 W/cm$^2$.

In practicing the invention, one can use intermittent sources, a flash or flashes, without departing from the scope of the appended claims, but overall, irradiances should be kept to less than 7 W/cm$^2$ average to avoid ignition of combustibles in the tailings mix.

Actual wattages (power consumption) will be higher than given above in the protocol, because the protocol specifies cumulative energies and irradiances associated only with the illumination wavelengths taught and claimed. Additional energy in other wavelengths can be directed toward tailings and seeds without departing from the scope of the invention.

As will be discussed below, multiple sources of Medium Wavelength Infrared are provided to great advantage, using direct illumination and indirect illumination from more specialized versions of weed seed accumulator belt 3Z.

Figure 6:
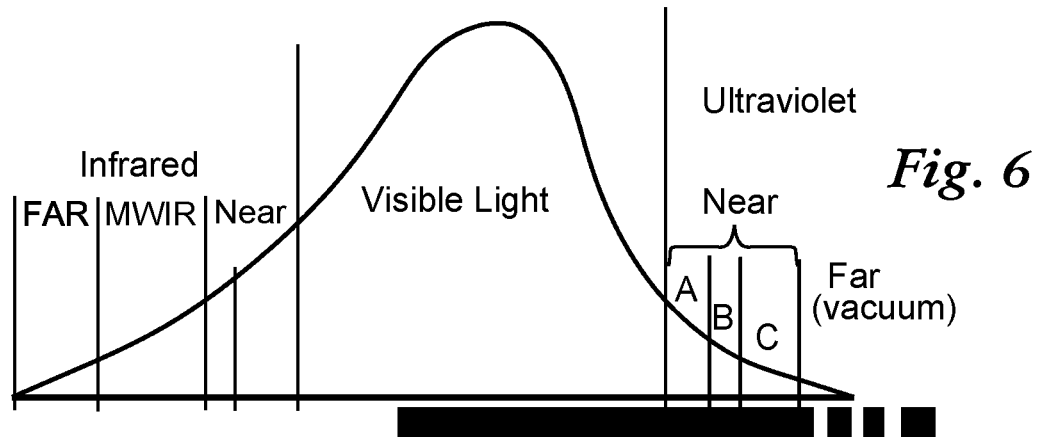
FIGS. 6 and 7 show together one typical class of prior art eradication processes or occurrences whereby extreme ultraviolet light induced trauma is delivered with a large energy UV radiative transfer via general illumination or flash onto a naturally grown species *Digitaria sanguinalis* rooted into a soil grade.
Figure 7:
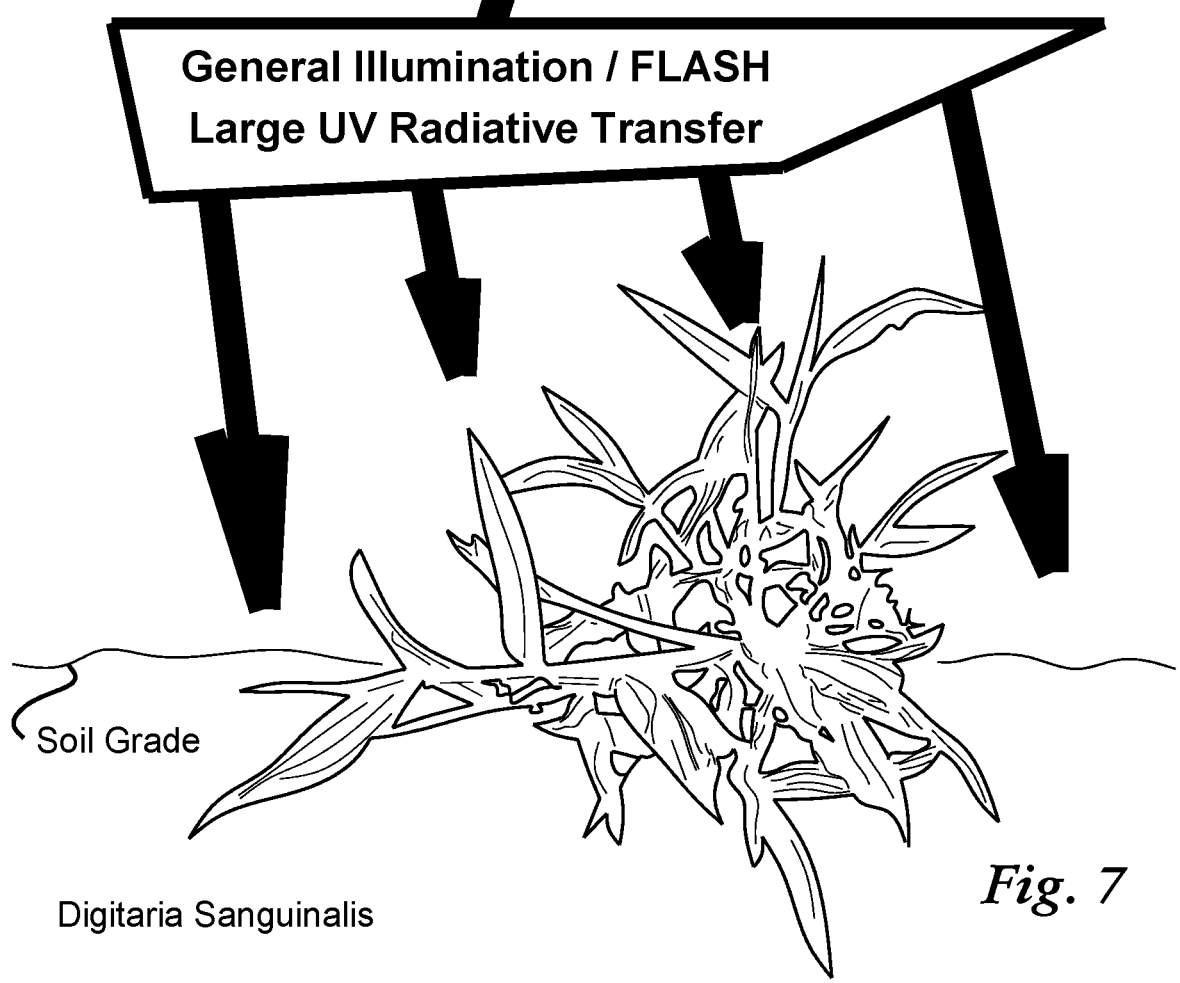
Figure 28:
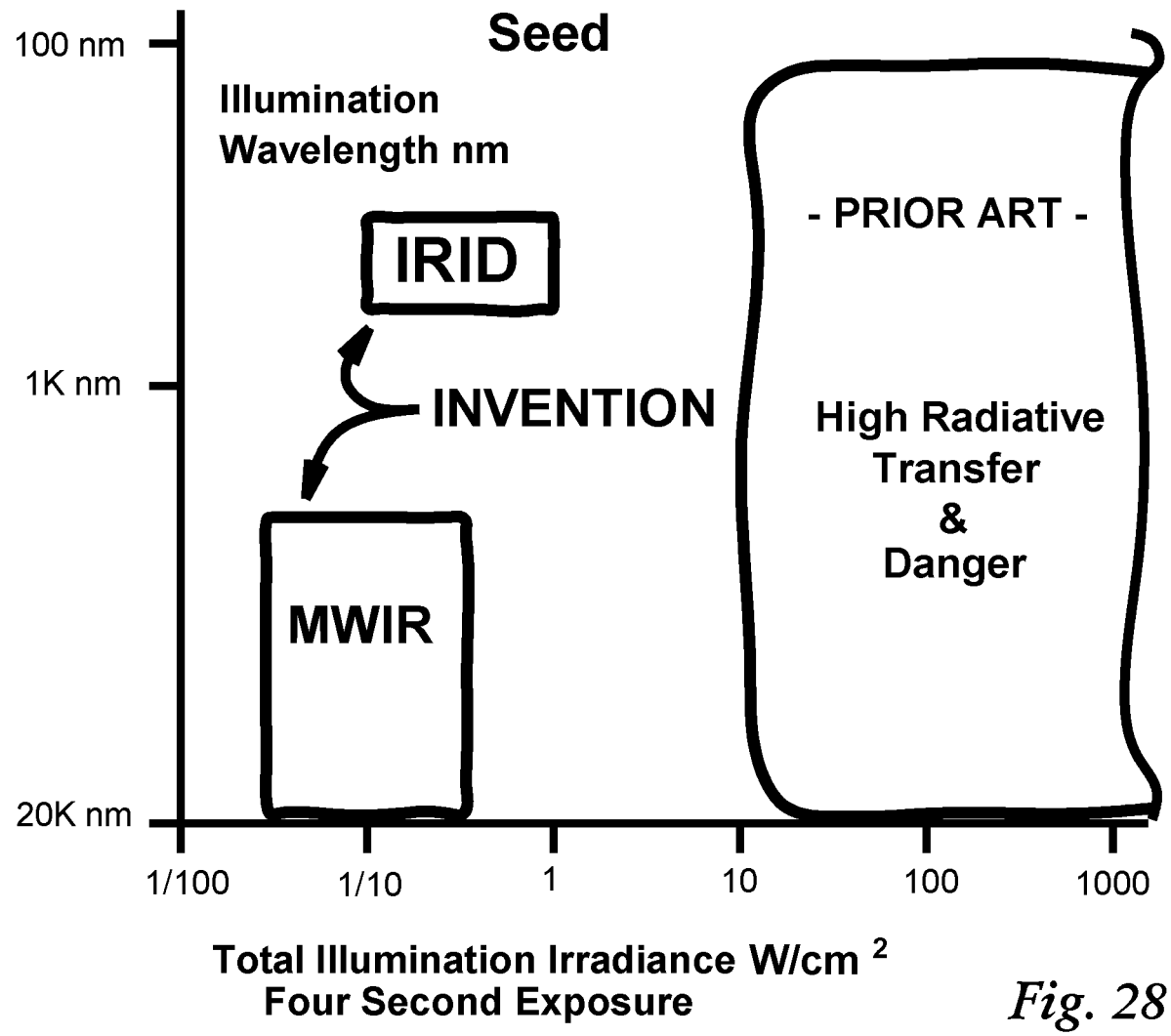
FIG. 28 shows a logarithmic cartesian plot representation of Illumination Wavelength versus Total Illumination Irradiance indicated by closed figure for a typical illustrative approximate regime of operation for the instant invention applied to a weed seed, using an Indigo Region Illumination Distribution and a Medium Wavelength Infrared illumination distribution, with contrast shown to the prior art high radiative transfer depicted in FIGS. 6 and 7, shown on this plot in closed figure.

Now referring to FIG. 28, a logarithmic cartesian plot representation of Illumination Wavelength versus Total Illumination Irradiance is shown indicated by closed figure fora typical illustrative approximate regime of operation for the instant invention applied to a weed seed, using an Indigo Region Illumination Distribution and a Medium Wavelength Infrared illumination distribution, with contrast shown to the prior art high radiative transfer depicted in FIGS. 6 and 7, shown on this plot in closed figure. As shown, the instant invention applied to seeds is in a different regime. Average irradiances for Indigo Region Illumination Distribution IRID radiation and Medium Wavelength Infrared MWIR radiation for seeds and seedlings are again on the order of single digit or fractional W/cm$^2$, while the high radiative transfer of the prior art is higher by orders of magnitude. Use of the invention does not lead to ignition of biomass or burning of plant components. This cartesian plot representation of illumination is illustrative only and follows a sample exposure, and shall not be considered limiting to the breadth of the manner in which the invention can be practiced as described, or to the appended claims.

Now referring to FIG. 29, a listing of operative attributes is shown for a class of prior art large radiative and large UV radiative transfers as depicted in FIGS. 6 and 7. Specifically, the use of energy distributions such as those high in UV-B and UV-C radiation—have effects on plant life, such as scalding, burning, an ultraviolet burn similar to extreme sun burn in humans called UV burn, leaf and plant component failure, cooking of seeds, and dehydration. Ironically, it is evident that the more destructive the radiative transfer, the more plants appear to be equipped to regrow, likely so because of evolution dealing with fire, flood, windstorms, trampling by animals, disease, pestilence, drought, landslides, etc. The effects of low energy radiation of the instant invention were unanticipated.

Figure 30:
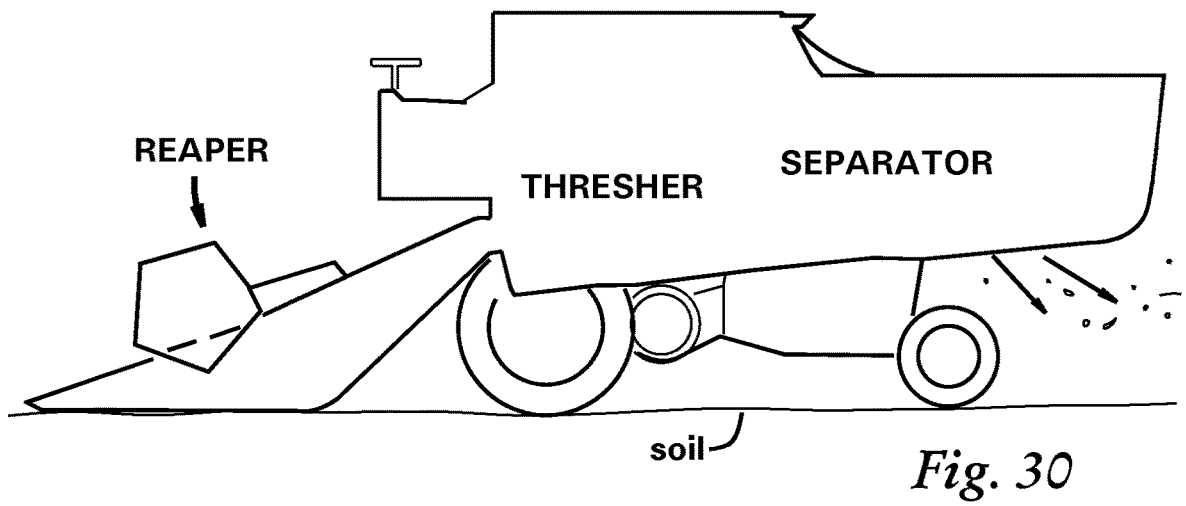
FIG. 30 shows an illustrative schematic silhouette of a prior art combine harvester with three functions, reaper, thresher and separator shown as functional blocks.

Now referring to FIG. 30, an illustrative schematic silhouette of a prior art combine harvester is shown. Shown simply as functional blocks on this schematic are three functions: reaper, thresher and separator, as discussed above and alluded to in the references incorporated into this specification.

Figure 31:
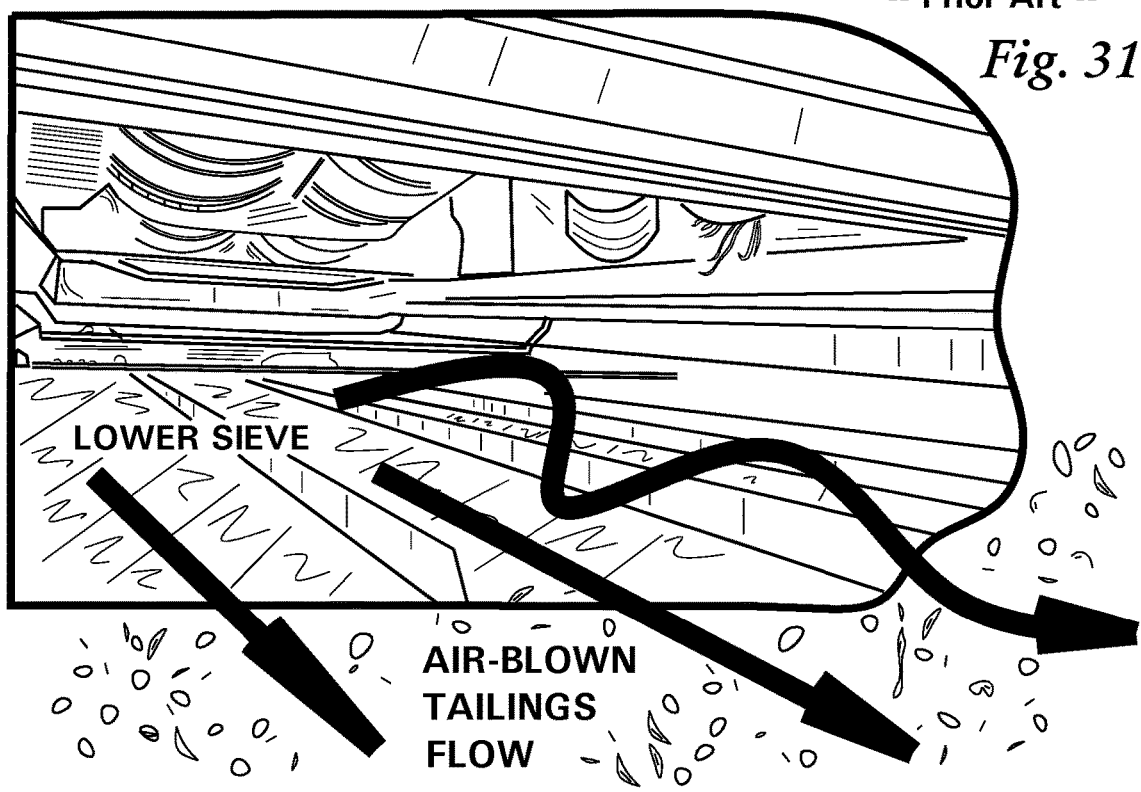
FIG. 31 shows partial internal rough surface view of separation stage of a prior art combine harvester, with air-blown tailings flow emerging above a lower sieve.

Now referring to FIG. 31, a partial internal rough surface view of separation stage of a prior art combine harvester is shown. As discussed above, larger waste such as straw typically exits or is "walked" out of the top of the combine machine (not shown). In the Figure, an air-blown tailings flow (AIR-BLOWN TAILINGS FLOW) is shown flowing, above a lower sieve (LOWER SIEVE). In the space above the lower sieve, the air blast from a fan (not shown) works to separate grain from chaff. Grain typically falls into and down through the lower sieve. It is the tailings flow that contains weed seeds. Very importantly, the weed seeds are among a large biomass of material, often called MOG (Material Other than Grain). This is the flow that can be treated using the invention. The use of specialized belts as disclosed and claimed here has been found to help with material handling and also actively participate in enhancing, and prolonging needed exposure according to the protocol for the invention, as described below in the description for FIGS. 32-53 and 55-58.

Figure 32:
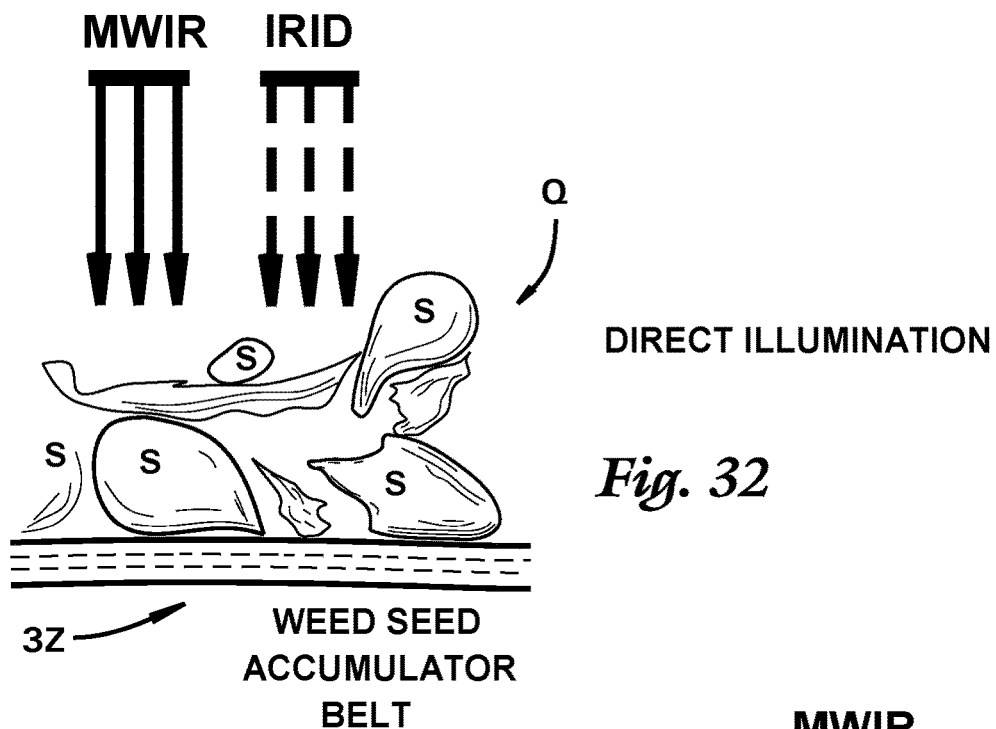
FIG. 32 shows a cross-sectional schematic of a harvest of seeds and chaff under direct illumination atop a weed seed accumulator belt according to the invention.

Now referring to FIG. 32, shows a cross-sectional schematic of a harvest Q of seeds and chaff is shown under direct illumination atop a weed seed accumulator belt 3Z according to the invention. This Figure is similar to FIGS. 15 and 16, and shows direct illumination with Medium Wavelength Infrared MWIR and Indigo Region Illumination Distribution IRID. The thickness of the material on the mat (not shown to scale on this and other figures) is 3 mm to 6 mm preferred.

Figure 33:
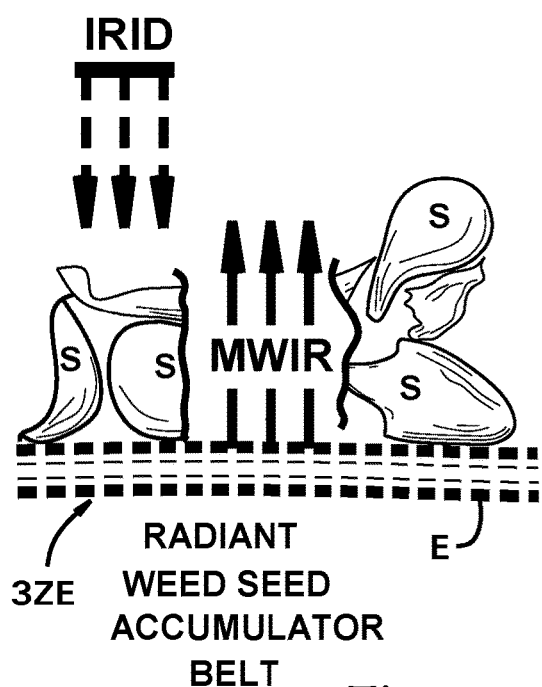
FIG. 33 shows a cross-sectional schematic similar to that shown in FIG. 32, but using a radiant weed seed accumulator belt.

Now referring to FIG. 33, a cross-sectional schematic similar to that shown in FIG. 32 is shown, but depicting a radiant weed seed accumulator belt 3ZE. In this embodiment of the invention that concerns material handling and exposures, the radiant weed seed accumulator belt 3ZE is itself also a MWIR emitter E. As alluded to in the description associated with FIG. 18, best results for statistical success changing the state of weed seeds to having reduced germination viability were obtained from the use of borosilicate glass (Pyrex®), and similar glass like Pyrex® Glass Code 7740, and soda lime glass, and also aluminum oxide ceramic, deployed at least in part as the primary MWIR emitter E. The radiant weed seed accumulator belt 3ZE is so constructed and formed to comprise an MWIR emitter (E), which itself is so formed, composed and positioned to emit Medium Wavelength Infrared radiation by heating of, and thermal emission from, at least a portion of the radiant weed seed accumulator belt itself.

The radiant weed seed accumulator belt 3ZE is heated using heat sources (not shown) or using waste heat from other light sources (such as either Medium Wavelength Infrared or Indigo Region Illumination Distribution sources)—and the radiation from the radiant weed seed accumulator belt 3ZE itself, shown as Medium Wavelength Infrared MWIR (upward point arrows in the Figure) helps illuminate the tailings to be treated, enhancing exposure probability using radiation of a wavelength that was discovered to be uniquely effective and not present in sunlight in large amounts. The preferred wavelength range for MWIR emitter E ranges from 2 to 8 microns. The MWIR emitter E in radiant weed seed accumulator belt 3ZE can be composed using known techniques to comprise a powder coat, and that powder coat can, like the MWIR emitter E itself, comprise a glass selected from borosilicate glass, Pyrex® Glass Code 7740, and soda lime glass, or alternatively aluminum oxide ceramic.

Figure 34:
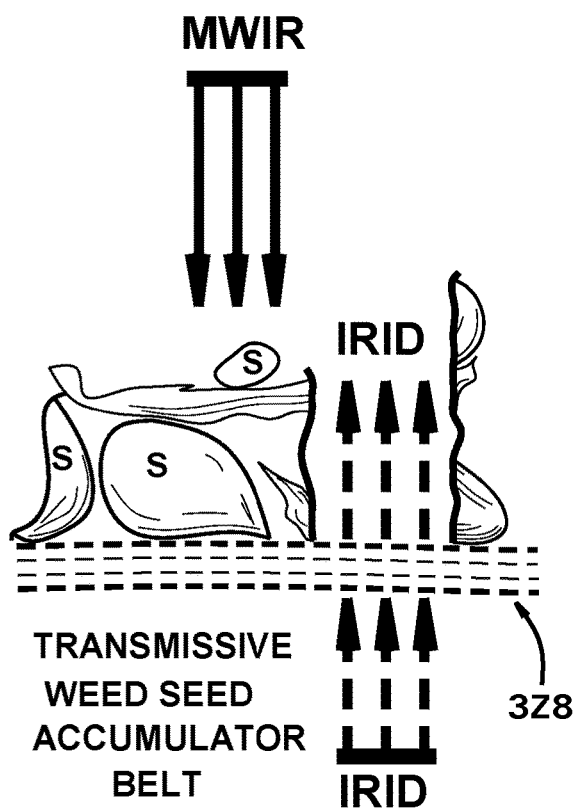
FIG. 34 shows a cross-sectional schematic similar to that shown in FIG. 33, but using a transmissive weed seed accumulator belt.

Now referring to FIG. 34, a cross-sectional schematic similar to that shown in FIG. 33 is shown, but using a transmissive weed seed accumulator belt 3Z8. The transmissive weed seed accumulator belt 3Z8 is so constructed and formed to allow a light wavelength distribution comprising an Indigo Region Illumination Distribution IRID (source IRID emitter 88 not shown for clarity) to pass through the radiant weed seed accumulator belt to allow transmission of the Indigo Region Illumination Distribution to a seed. As can be seen from the Figure, an Indigo Region Illumination Distribution IRID is applied to the underside of the belt, and passes through the belt itself to allow illumination of a seed. The transmissive weed seed accumulator belt 3Z8 can operate by use of apertures or slits or pores or holes; or alternatively by transparency or by translucence, in any combination. Fiberglass or fibrous fabrics made at least in part from glass, can fit this purpose, as known in the glass arts.

Now referring to FIG. 35, a cross-sectional schematic similar to that shown in FIG. 34 is given, but depicting a radiant and transmissive weed seed accumulator belt 3ZE8, which combines the attributes of the belts shown in FIGS. 33 and 34.

Radiant and transmissive weed seed accumulator belt 3ZE8, [1] is also constructed and formed to comprise an MWIR emitter (E), which itself is so formed, composed and positioned to emit Medium Wavelength Infrared radiation by heating of, and thermal emission from, at least a portion of the radiant weed seed accumulator belt itself; and [2] like as shown in FIG. 34, is also so constructed and formed to allow a light wavelength distribution comprising an Indigo Region Illumination Distribution IRID (source IRID emitter 88 not shown for clarity) to pass through the radiant weed seed accumulator belt to allow transmission of the Indigo Region Illumination Distribution to a seed.

Medium Wavelength Infrared MWIR emerges upward in the Figure as shown, while Indigo Region Illumination Distribution IRID passes from the underside of the belt in the Figure, passing through to illuminate the tailings load shown. Those skilled in the optical arts can add diffusers, concentrators, and reflectors to radiant and transmissive weed seed accumulator belt 3ZE8. Direct sources of Medium Wavelength Infrared radiation and Indigo Region Illumination Distribution can be added without departing from the scope of the invention and claims.

Now referring to FIG. 36, the cross-sectional schematic of the radiant and transmissive weed seed accumulator belt 3ZE8 of FIG. 35, is shown additionally comprising a known heat source HS (such as a tubular lamp) heating the underside of the belt to heat the radiant and transmissive weed seed accumulator belt.

Now referring to FIG. 37, a cross sectional depiction of a radiant and transmissive weed seed accumulator belt of FIGS. 35 and 36 is shown comprising individual chain-like transmitting links. Radiant and transmissive weed seed accumulator belt 3ZE8 is now shown in another embodiment of the invention comprising a plurality of belt links Z as shown, illuminated from the underside on the Figure using a plurality of IRID emitters 88, with underside rays omitted for clarity. The emission of Medium Wavelength Infrared MWIR is omitted for clarity. Further function is shown in the next Figures. The radiant weed seed accumulator belt 3ZE8 comprises a plurality of links so formed, linked, positioned and optically composed in a manner known those skilled in the optical arts to allow the Indigo Region Illumination Distribution to be transmitted link-to-link and also to be emitted from the plurality of links upward in the Figure to impinge upon the seed or tailings.

Figure 38:
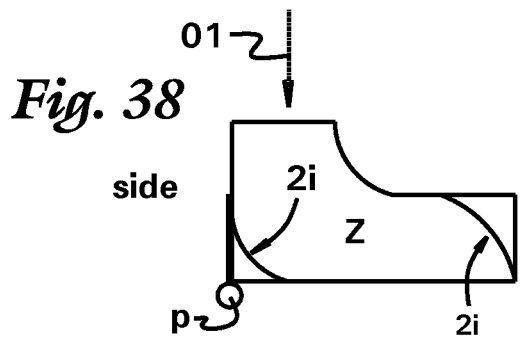
FIGS. 38 and 39 show side and top cross sectional views, respectively, of one link of the radiant and transmissive weed seed accumulator belt depicted in FIG. 37, with partial width input/output light reflectors shown.
Figure 39:
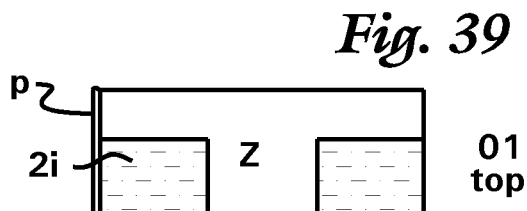

Now referring to FIGS. 38 and 39 shows side and top cross sectional views, respectively, are shown of one belt link Z of the radiant and transmissive weed seed accumulator belt 3ZE8 depicted in FIG. 37, with partial width input/output light reflectors shown. In FIG. 38, a side view (side) is shown showing a link or hinge pin p and two partial width input/output light reflectors 2i. A top view 01 of the belt link Z is shown in FIG. 39, showing link pin p at the left and partial width input/output light reflectors 2i from the top. Partial width input/output light reflectors 2i assist with light distribution as shown in the next Figure.

Figure 40:
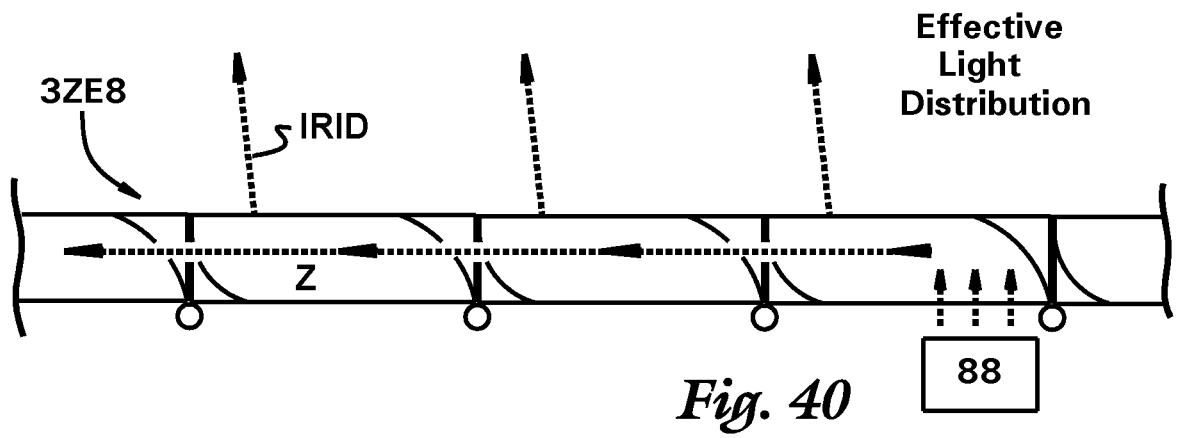
FIG. 40 shows the radiant and transmissive weed seed accumulator belt of FIG. 37, showing an illustrative effective light distribution from a IRID emitter.

Now referring to FIG. 40 the radiant and transmissive weed seed accumulator belt 3ZE8 of FIG. 37 is shown, and showing an illustrative effective light distribution from IRID emitter 88. Partial width input/output light reflectors 2i (not labeled for clarity in this Figure) can be made from aluminum, stainless steel, or metal foil, and laid in during manufacture of the belt links Z, preferably to take the form of borosilicate glass blocks in a manner known to those skilled in the glass and ceramic arts. In the Figure, as illustratively shown, light from IRID emitter 88 travels upward in the Figure, hits a partial width input/output light reflector 2i (full illustrative rays not shown) and is substantially reflected and now passing to the left in the Figure as shown by the chain of arrows. As this Indigo Region Illumination Distribution light passes leftward, it encounters periodically in the chain additional partial width input/output light reflectors 2i as it is transmitted from link to link traveling to the left. Each time it encounters a partial width input/output light reflector 2i formed for upward deflection of light, some of the Indigo Region Illumination Distribution light is reflected upward in the Figure, so as to illuminate a harvest Q as shown in FIG. 32.

This arrangement in the radiant and transmissive weed seed accumulator belt 3ZE8 allows for emission of Medium Wavelength Infrared radiation, as well as Indigo Region Illumination Distribution light, and allow for longer illumination dwell times for the harvest, tailings, or seed to be treated. Because of its chance nature, the statistical attribute associated with trying to get two sided illumination on seeds to increase effectiveness is improved using a continuously glowing belt. This can be supplemented with other direct sources MWIR emitters E and IRID emitters 88, and with reflectors, as well, to increase the number and directions of light impinging upon a seed. This improves the statistics for a change of state of seeds to having reduced germination viability, particularly if there is confounding material in the tailings.

Figure 41:
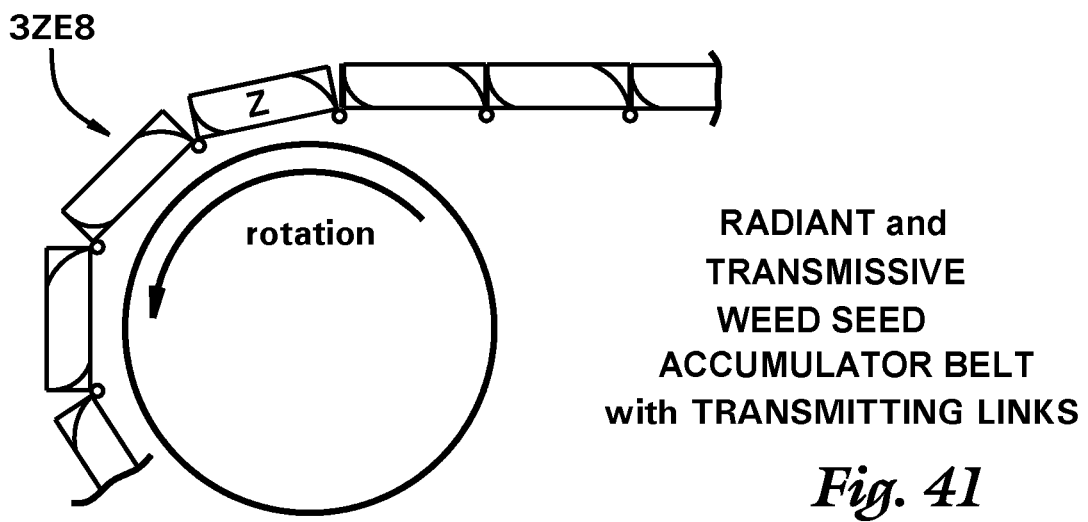
FIG. 41 shows the radiant and transmissive weed seed accumulator belt of FIG. 37, showing illustrative links opening upon rounding a curve.

Now referring to FIG. 41, the radiant and transmissive weed seed accumulator belt 3ZE8 of FIG. 37 is shown, with illustrative belt links Z opening upon rounding a curve, as shown with a rotating pulley shown rotating counter-clockwise in the figure. When the belt links Z open up upon going around a curve as shown, the chain of light transmission from link to link is broken somewhat (not shown) as the links no longer butt squarely, link-to-link. Belt links Z can still have provisions for pores that allow air to pass through them, as depicted in FIG. 19.

Figure 42:
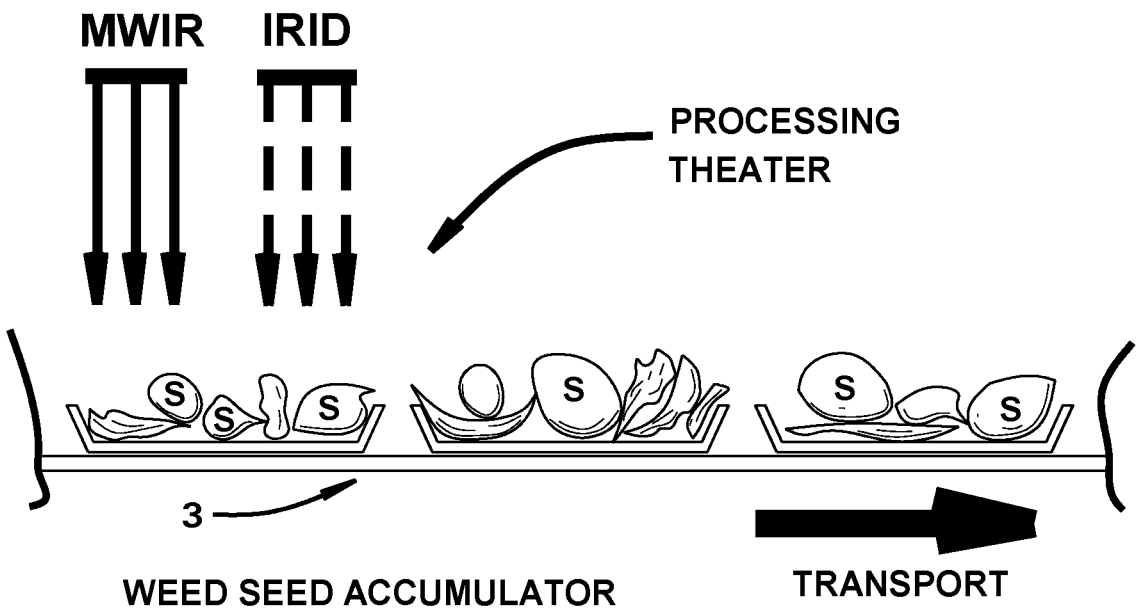
FIG. 42 shows a simple weed seed accumulator providing transport in a processing theater according to one embodiment of the invention.

Now referring to FIG. 42, a simple weed seed accumulator 3 is shown providing transport in a processing theater according to one embodiment of the invention. Individual trays or pockets can be used to transport (TRANSPORT) to the right in the Figure the tailings inside the processing theater (PROCESSING THEATER) that include seeds S.

Figure 43:
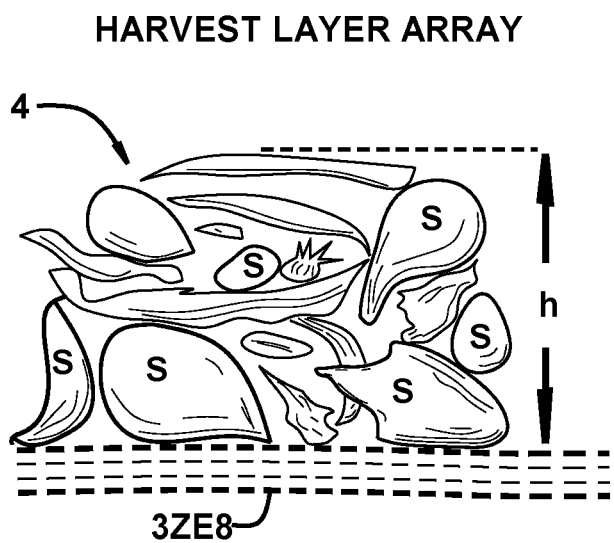
FIG. 43 shows a harvest layer array of harvest to be treated according to the instant invention upon a radiant and transmissive weed seed accumulator belt.

Now referring to FIG. 43, a harvest layer array of harvest is shown in a processing theater 4 to be treated according to the instant invention upon a radiant and transmissive weed seed accumulator belt 3ZE8. Good results have been obtained using a layer height h as shown that includes seed 2-3 monolayers high. There is sufficient scatter of light to allow efficient processing to proceed according to the invention. Illuminator IE8 comprising a MWIR emitter E and/or a IRID emitter 88 is not shown for clarity.

Figure 44:
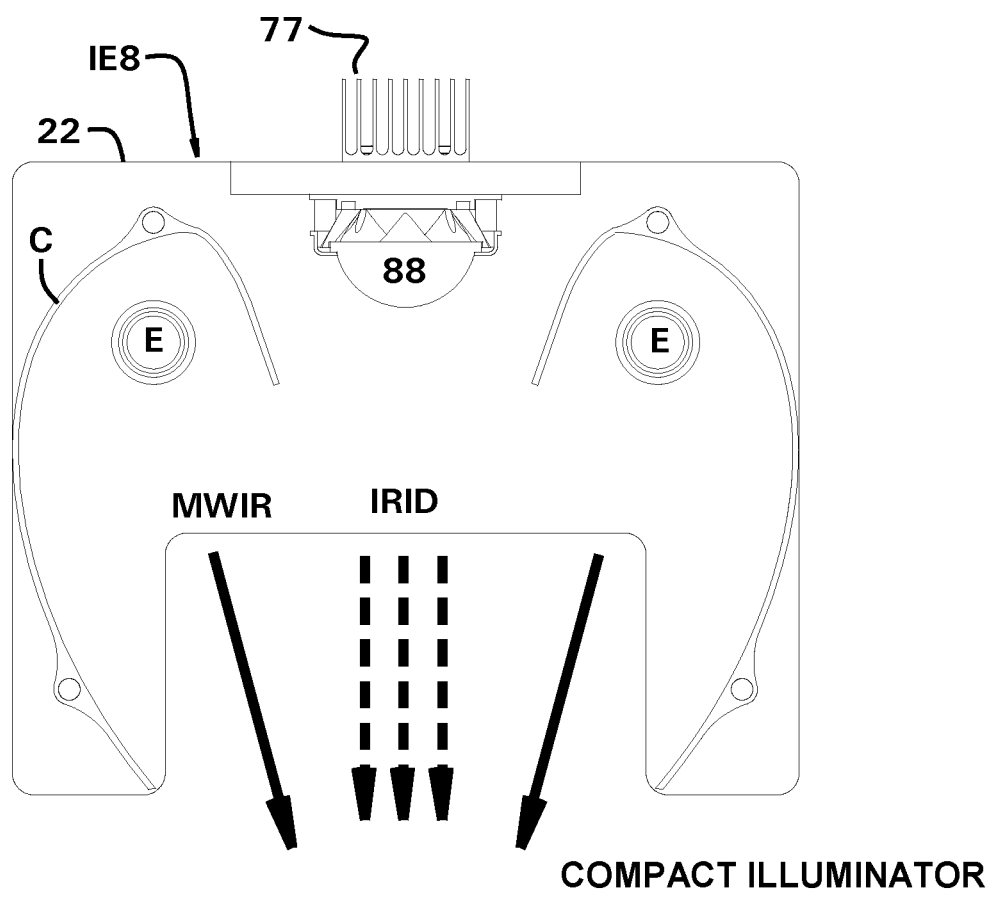
FIG. 44 shows a cross-sectional view of a possible compact illuminator according to the invention.

Now referring to FIG. 44, a cross-sectional view of a possible compact illuminator (COMPACT ILLUMINATOR, IE8) according to one embodiment of the invention is shown. Referring also to FIGS. 45 and 46, oblique surface views of the compact illuminator depicted in FIG. 44 are shown. In this illuminator IE8, a housing 22 retains a curved reflector C that surrounds two pipe-like MWIR emitters E as shown, oriented upon an axis (not shown) in the longest direction of the illuminator IE8 as depicted in FIG. 45. Light from pipe-like MWIR emitters E passes downward as in the Figure shown by the rays for Medium Wavelength Infrared MWIR, with assistance of the curved reflector C, as known in the optical arts. A central assembly (not labeled) houses a plurality of IRID emitters 88 that are positioned in between pipe-like MWIR emitters E, and this light, Indigo Region Illumination Distribution IRID, is shown also projected downward in the Figure. IRID emitters 88 are serviced by heat sinks 77 as shown, and can be 100 watt array, 450 nm peak output LED arrays with peak output at 430 nm, true indigo in appearance and with continuous distributions. This compact illuminator can be used to illuminate, either directly or from the underside, any of the weed seed accumulator belt 3Z, 3ZE, 3Z8, or 3ZE8 previously described. It is suitable for inclusion inside a harvester combine.

The interiors (not explicitly shown) of MWIR emitters E can comprise heaters; or tubular lamps as previously described, such as a clear halogen heat lamp, which essentially acts as a cartridge heater with a glass or quartz exterior. Alternatively, a preferred embodiment can comprise the tubular MWIR emitters E as shown with an emissive coating, such as a known aluminum oxide ceramic, or MWIR emitters E can comprise copper pipes sprayed with glass, or with aluminum oxide thermal spray. Any high emissivity coating on a thermally heated tube could offer advantages so long as the emissions are as called for in the protocol for the invention, preferably Medium Wavelength Infrared in the range of 2 to 8 micron wavelengths.

Figure 47:
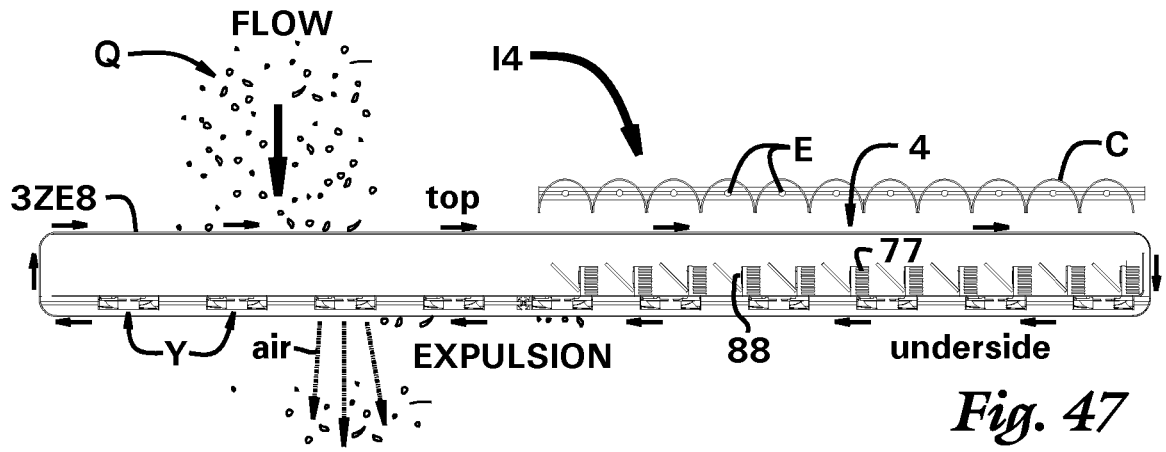
FIG. 47 shows a cross-sectional view of an illuminated external wrap radiant and transmissive weed seed accumulator belt forming an illumination unit according to the invention, and featuring air suction through the belt to attract a harvest to be treated, and air expulsion through the belt to expel treated harvest.
Figure 48:
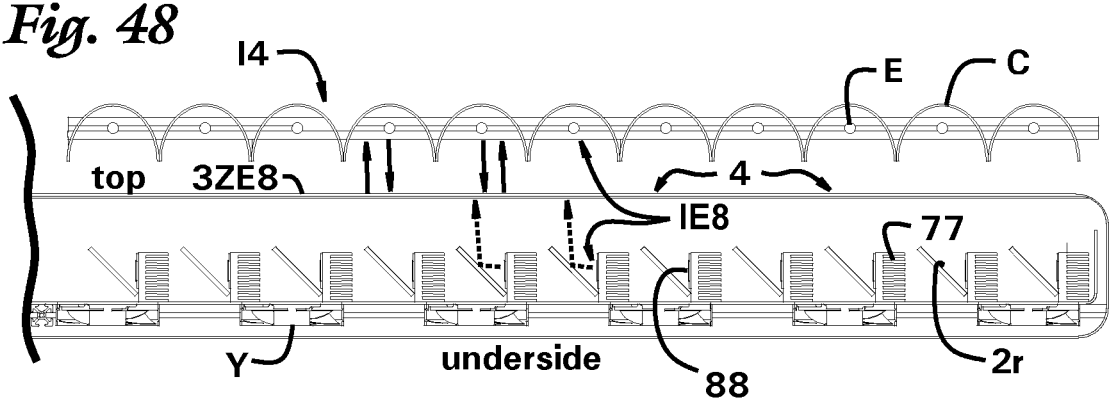
FIG. 48 shows the cross-sectional view of an illuminated external wrap radiant and transmissive weed seed accumulator belt forming an illumination unit according to the invention of FIG. 47, in a partial close-up view.
Figure 49:
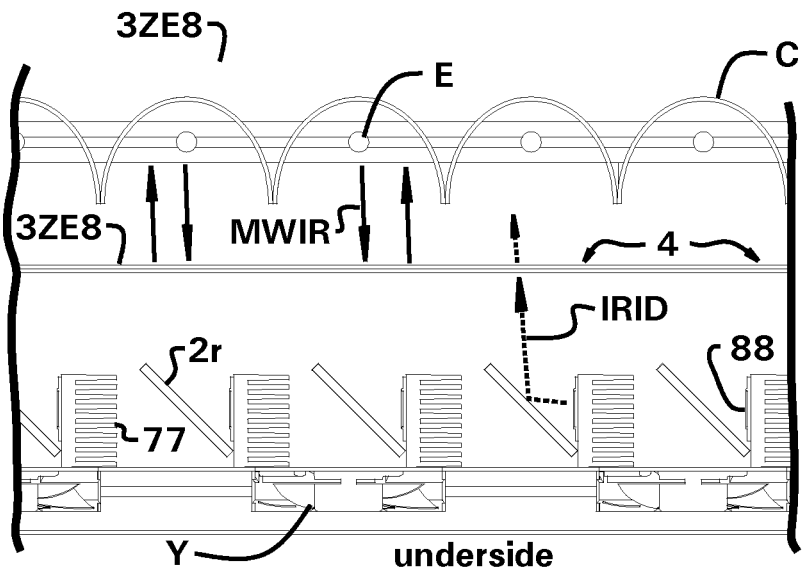
FIG. 49 shows the cross-sectional view of an illuminated external wrap radiant and transmissive weed seed accumulator belt forming an illumination unit according to the invention of FIG. 48, in a further magnified close-up view.

Now referring to FIG. 47, a cross-sectional view of an illuminated external wrap radiant and transmissive weed seed accumulator belt forming an illumination unit 14 according to the invention, and featuring air suction through the belt itself to attract a harvest to be treated, and air expulsion through the belt to expel treated harvest. Referring also to FIG. 48, the cross-sectional view of an illuminated external wrap radiant and transmissive weed seed accumulator belt forming an illumination unit according to the invention of FIG. 47, is shown in a partial close-up view. Referring also to FIG. 49, the cross-sectional view of an illuminated external wrap radiant and transmissive weed seed accumulator belt forming an illumination unit according to the invention of FIG. 48, is shown in a further magnified close-up view.

These FIGS. 47, 48, and 49 depict an illumination unit 14 which comprises a plurality of illuminators IE8 which illuminate a processing theater 4 populated with a harvest Q according to the invention. The illumination unit 14 is formed as shown on the surface of an external wrap radiant and transmissive weed seed accumulator belt 3ZE8, which forms a rectangular wrap as shown in FIG. 47. The radiant and transmissive weed seed accumulator belt 3ZE8 is shown moving in a rectangular track on the Figure page, rotating clockwise on the page of FIG. 47, as shown by the transport or motion arrows which point to the right on the belt top (shown, top); downward on the Figure right side; leftward on the belt underside (underside), and upward on the Figure left side. In the interior of the external wrap of the radiant and transmissive weed seed accumulator belt 3ZE8 are a plurality of IRID emitters 88 mounted therein, with associated heat sinks 77 and a series of reflectors 2r which redirect light as shown in FIG. 49. FIG. 49 shows Indigo Region Illumination Distribution IRID light emitted initially to the left in the Figure, then redirected by reflector 2r to become an upward ray as shown. This upward IRID ray passes through the radiant and transmissive weed seed accumulator belt 3ZE8 to emerge for the purpose of illuminating tailings or a weed seed at processing theater 4.

The plurality of MWIR emitters E and associated curved reflectors C shown perform two functions: they illuminate directly the processing theater 4 and associated tailings, chaff or seeds, shown by the downward Medium Wavelength Infrared MWIR rays; and they heat up the radiant and transmissive weed seed accumulator belt 3ZE8 so it becomes a MWIR emitter itself, and this is shown by the upward Medium Wavelength Infrared MWIR rays. This allows higher total deposited thermal energy of the wavelengths of the protocol and provides for longer thermal radiation dwell times for the tailings to undergo conversion at processing theater 4.

Because the radiant and transmissive weed seed accumulator belt 3ZE8 is porous to air, and because the external wrap formed by the belt is somewhat hermetically sealed (provisions known to those skilled in the mechanical arts, but not shown), a plurality of expulsion fans Y (of known construction) at the belt underside (a second portion of the belt) as shown allow for a negative pressure or vacuum to be created within the interior of radiant and transmissive weed seed accumulator belt 3ZE8. This allows for material handling and transporting the seed to and from the processing theater, specifically radiant and transmissive weed seed accumulator belt 3ZE8. As shown in FIG. 47, a flow (FLOW) of harvest Q descends under vacuum action upon radiant and transmissive weed seed accumulator belt 3ZE8 at a first portion of the belt, with the tailings attracted to, and retained by the belt as it moves rightward on top (chaff and seed material not shown on the belt for clarity). The tailings cling to the belt through processing theater 4, travel downward, and then to the left on the belt underside, where due to gravity and due to the expulsion of air afforded by expulsion fans Y, the tailings are expelled (EXPULSION) downward in the Figure as shown. Because of the illumination provided on the top (top) of the radiant and transmissive weed seed accumulator belt 3ZE8 at processing theater 4, a change of state of the tailings to having reduced germination viability has occurred prior to expulsion. This assembly can be put anywhere there is a tailings flow in a harvester combine, such as in the rear at the exit end behind the lower sieve, where tailings are usually blown out the back of the combine, or sent to a spreader for distribution on the ground.

Figure 50:
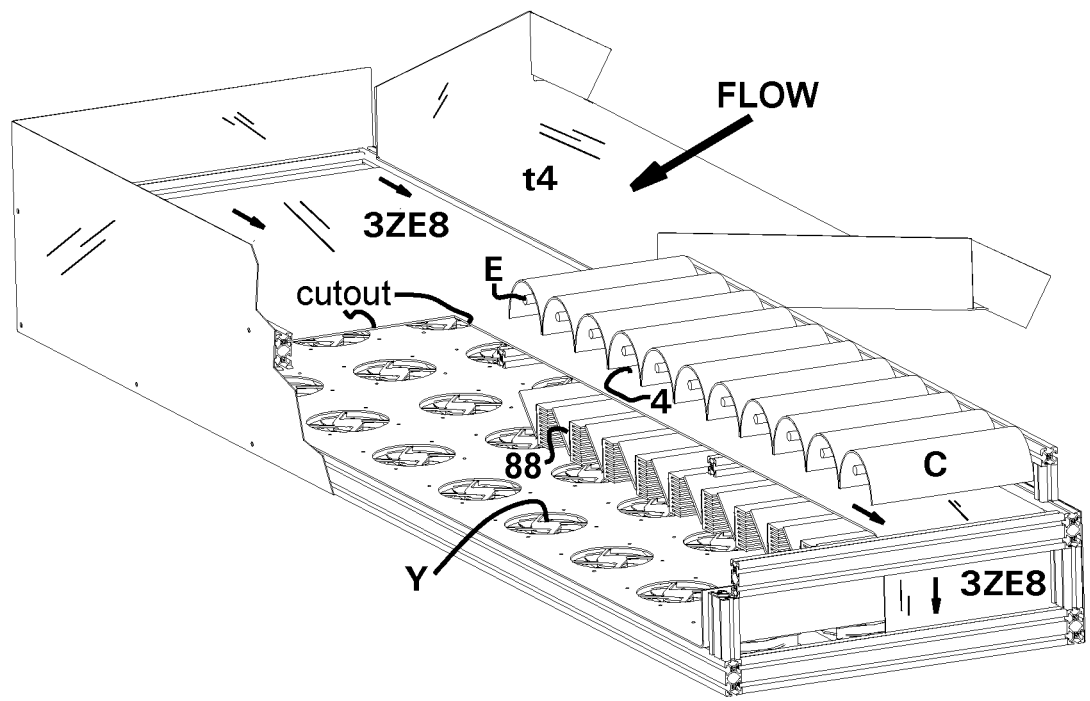
FIGS. 50 and 51 show oblique surface views of the illumination unit of FIGS. 47-49, with FIG. 50 featuring a drawing figure cutout to show interior components normally hidden.
Figure 51:
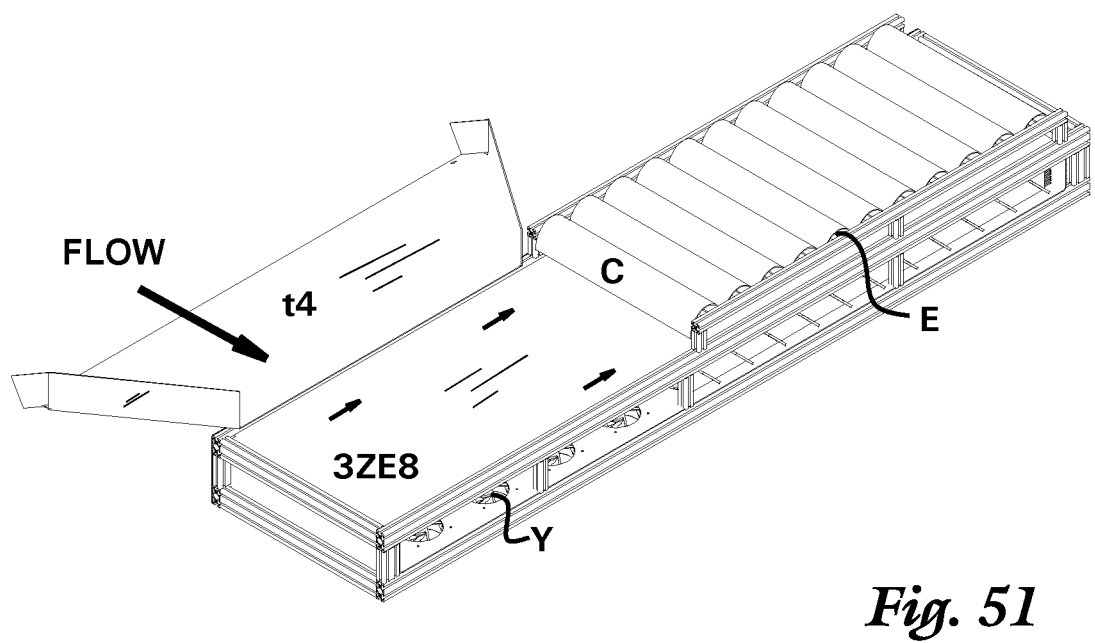

Now referring to FIGS. 50 and 51, oblique surface views of the illumination unit of FIGS. 47-49, are shown, with FIG. 50 featuring a drawing figure cutout to show interior components normally hidden. As depicted, a tailings flow (FLOW) enters a trough or tray t4 and interacts with radiant and transmissive weed seed accumulator belt 3ZE8 which is in motion, driven by a motor and pulley (not shown). The tailings move across the Figure generally to the right, enter processing theater 4, and once there, are exposed to Medium Wavelength Infrared radiation emitted from MWIR emitters E with aid of curved reflectors C, as well as by the thermal emissions of the belt itself, while IRID emitters 88 illuminate the belt underside. The IRID emitters 88 and expulsion fans Y can be seen through a cutout (cutout).

The conveyor represented by radiant and transmissive weed seed accumulator belt 3ZE8 can be of dimensions 47 inches (119 cm) by 89 inches (225 cm). This apparatus can be attached to a harvester combine, such as a Class 6 New Holland CR940 combine with a 30 ft cutting head. Using this configuration and operating at 5 mph (8 km/hr), a typical speed for harvesting wheat, such a combine harvests approximately 18 acres/hour. To calculate the volume of chaff per second (Liters/Sec) to be treated, we use and assume:

1. Chaff/Bushel of Wheat=20 lbs./Bushel
2. Wheat Bushels/Acre=47.7 Bushels/Acre
3. Wheat chaff/Acre=47.7 bushels/acre*20 lbs./bushel=954 lbs of chaff/acre
4. Chaff/hour=18 acres/hour*954 lbs./acre=17,345 lbs./hour, or 4.8 lbs./sec (2.18 kg/sec) From chaff measurements, chaff has an inverse density of 2.54 liters/kg and the chaff volume is therefore 5.5 liters/sec. The system shown must treat approximately 5.5 liters of tailings per second, and can be placed at or near the output between upper and lower sieves of a harvest combine. With the radiant and transmissive weed seed accumulator belt 3ZE8 moving at a speed of 45 inches per second (1.14 m/sec) the illumination unit 14 receives the outgoing chaff volume (approximately 5.5 liters/sec) and spreads it to an approximate thickness of 3 mm (⅛") over the belt. Any clumping or massing of the tailings can be evened out by a screed bar or the like (not shown). The radiant and transmissive weed seed accumulator belt 3ZE8 can be a fiberglass belt of known construction, and borosilicate glass/Pyrex® is preferred.

Figure 52:
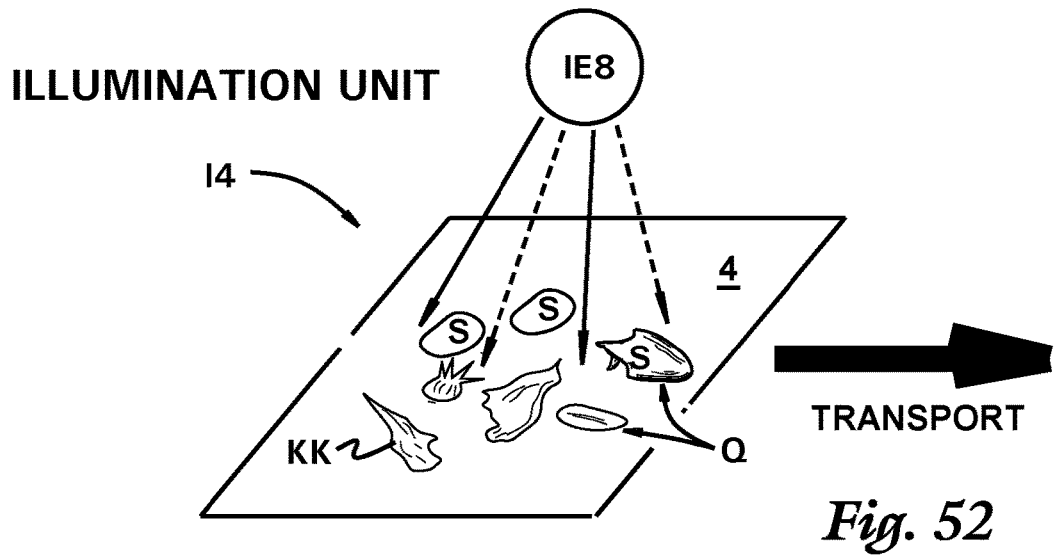
FIG. 52 shows a schematic of the elements of an illumination unit according to the invention.

Now referring to FIG. 52, a schematic of the elements of an illumination unit 14 according to the invention. Illumination unit 14 as shown comprises an illuminator IE8 and a processing theater 4 upon which are arrayed harvest Q or tailings which typically can comprise chaff KK and seed or seeds S.

Figure 53:
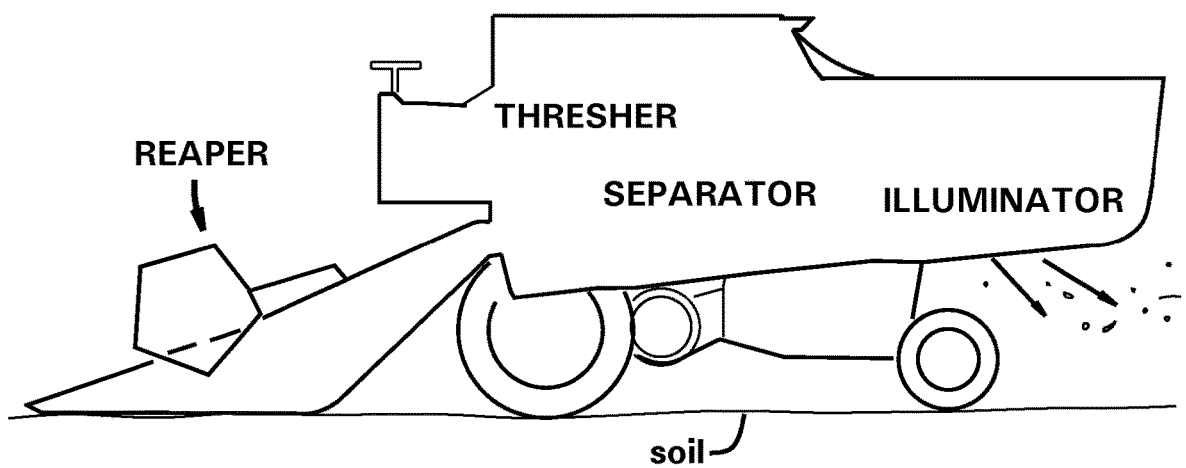
FIG. 53 shows an illustrative schematic silhouette of a combine harvester similar to that shown in FIG. 30, additionally comprising an illuminator or illumination unit, shown as functional block, according to the invention.

Now referring to FIG. 53, an illustrative schematic silhouette of a combine harvester similar to that shown in FIG. 30 is shown with functions of reaping, threshing, and separating, and now additionally comprising an illumination unit 14, shown as functional block (ILLUMINATOR), according to the invention. Those skilled in the art can contemplate specific additions to any combine to accomplish the illumination and processing theater action functions taught and claimed here, in the description for FIGS. 31-52 and 55-58.

Figure 54:
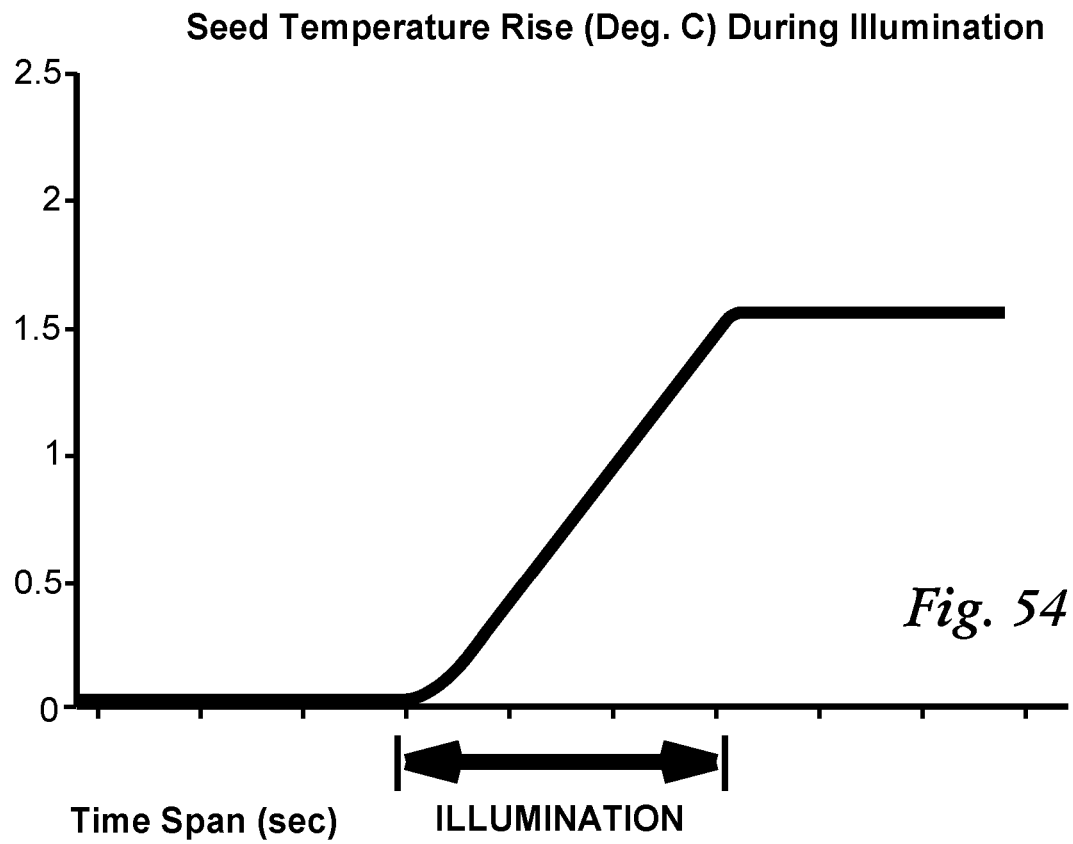
FIG. 54 shows a cartesian plot of an illustrative seed temperature rise versus seconds during illumination according to the invention.

Now referring to FIG. 54, a cartesian plot of an illustrative seed temperature rise versus seconds during illumination according to the invention is shown. As shown, a temperature rise of approximately 1.7 C is shown during illumination. Using the basic assumptions for use of the instant invention for use in a harvester combine as given above in the description for FIGS. 50 and 51, it becomes evident that the protocols taught and claimed are not cooking the weed seeds, and are using a low energy process. We estimate that the electrical requirements to power the lamps for the illuminators IE8 would draw only 6 percent of the power of the prime mover for a Class 6 combine machine. As for a temperature rise calculation, the active area of the processing theater 4 in the embodiments described in FIGS. 47-51 is 45 inches (114 cm) by 18 inches (46 cm), or 5244 cm$^2$ total. The higher, preferred energy deposition protocol calls for 2 J/cm$^2$ deposited illumination energy over a 5244 cm$^2$ area, or 10,488 Joules nominal. Even assuming that all this illumination energy goes into the 2.18 kg of tailings per second alluded to above, with no air and thermal losses inside the processing theater 4, which is not realistic, and assuming a 50% absorption of the Medium Wavelength Infrared and Indigo Region Illumination Distribution radiation or illumination energy by the tailings, a very rough calculation is as follows: Assuming that chaff and seeds constitute approximately 18% water content, we use an approximation a specific heat of 0.18 calories/gram for the tailings. Each second the combine generates 2180 grams of tailings. At 0.18 calories/gram, 2180 grams×0.18 calories/gram yields 392 calories of input energy that is required to raise the temperature of the tailings 1 C. Converting to Joules, 392 calories×4.18 Joules/calorie yields 1638 Joules to raise the temperature of the 2.18 kg of tailings by 1 C. Wth absorption of the 50% of the applied illumination radiation, one needs 2×1638 Joules=3276 Joules to raise the tailings temperature by 1 C. 10,488 Joules/3276 Joules/calorie yields a nominal temperature rise of 3.2 C, and this is for the full preferred energy protocol. Many losses are not accounted for during the illumination step. Testing done during 2 Joules/$cm^2$ cumulative illumination energy exposures were not able to record reliably any average discernible temperature of weed seeds upon immediate measurement of the weed seeds using optical equipment. During testing, there was little or no temperature rise discernible to the touch. This cartesian plot of an illustrative seed temperature rise is illustrative only and follows a sample exposure, and shall not considered limiting to the breadth of the manner in which the invention can be practiced as described, or to the appended claims.

Figure 55:
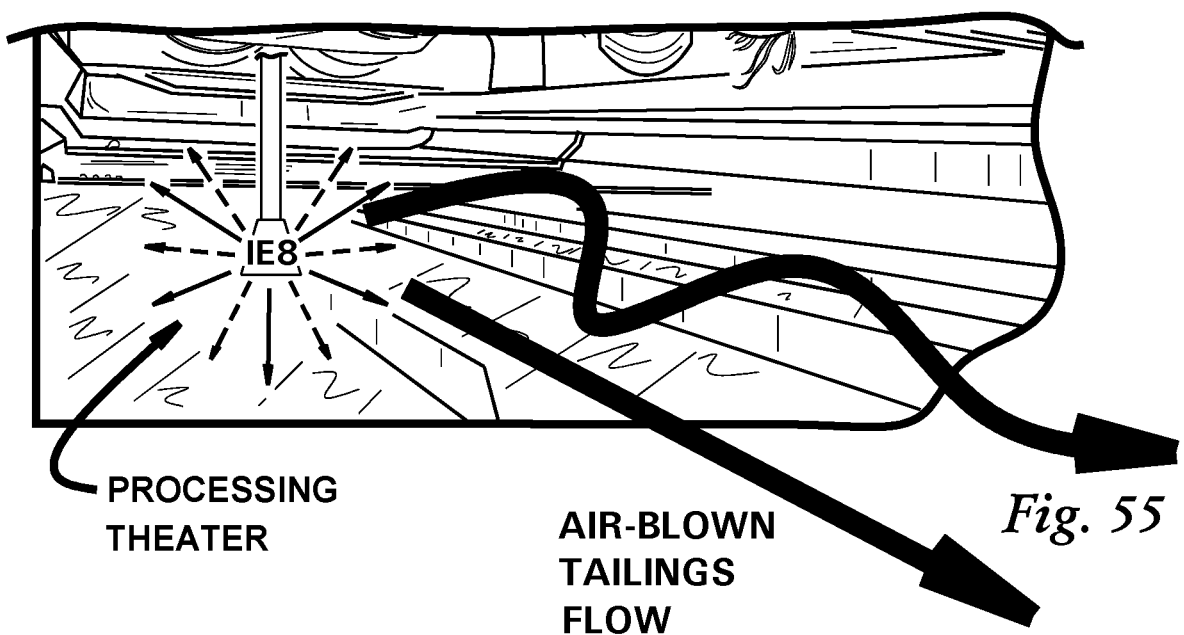
FIG. 55 shows a possible embodiment of the invention comprising an illuminator inside an open processing theater volume placed in the separation stage of a combine harvester as shown in FIG. 31.

Now referring to FIG. 55 shows a possible embodiment of the invention comprising an illuminator inside an open processing theater volume placed in the separation stage of a combine harvester as shown in FIG. 31. Though it is not at present preferred, it is possible to deploy illuminators IE8 as direct illuminators in the stream of air-blown tailings flow emerging from above the lower sieve of a typical combine, as depicted. Illuminator IE8 can be comprised of sources MWIR emitter E and IRID emitter 88 as disclosed above, and affixed using known techniques inside the processing theater. Accompanying dividers, panels, and structures that help arrange airborne tailings to assemble for illumination and to prevent optical blocking of the illuminator IE8 can also be provided as can be contemplated by those skilled in the mechanical arts.

Figure 56:
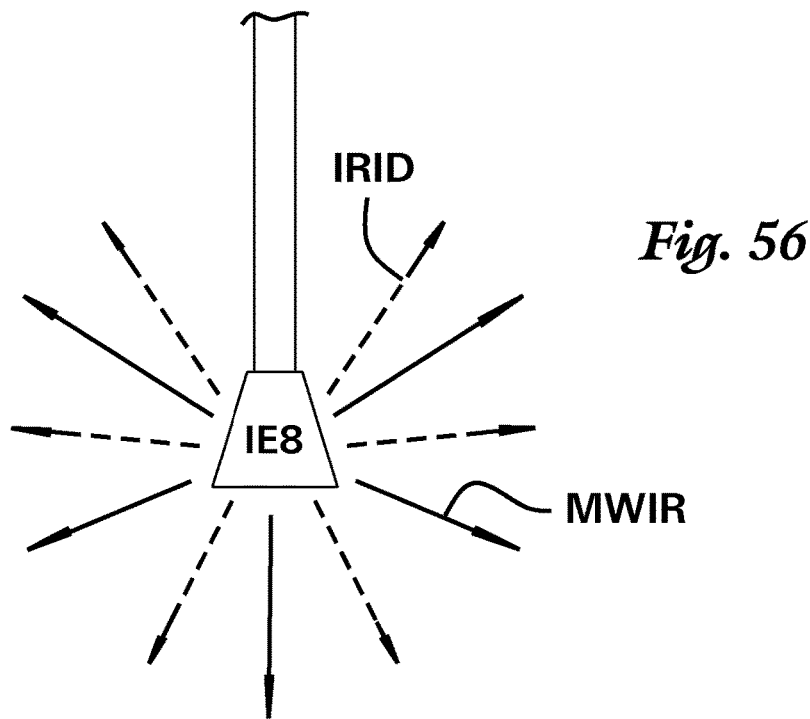
FIG. 56 shows the illuminator of FIG. 55, in close-up schematic cross-sectional view.

FIG. 56 shows the illuminator of FIG. 55, in close-up schematic cross-sectional view, and showing a dual output in the form of Medium Wavelength Infrared MWIR and Indigo Region Illumination Distribution IRID.

Figure 57:
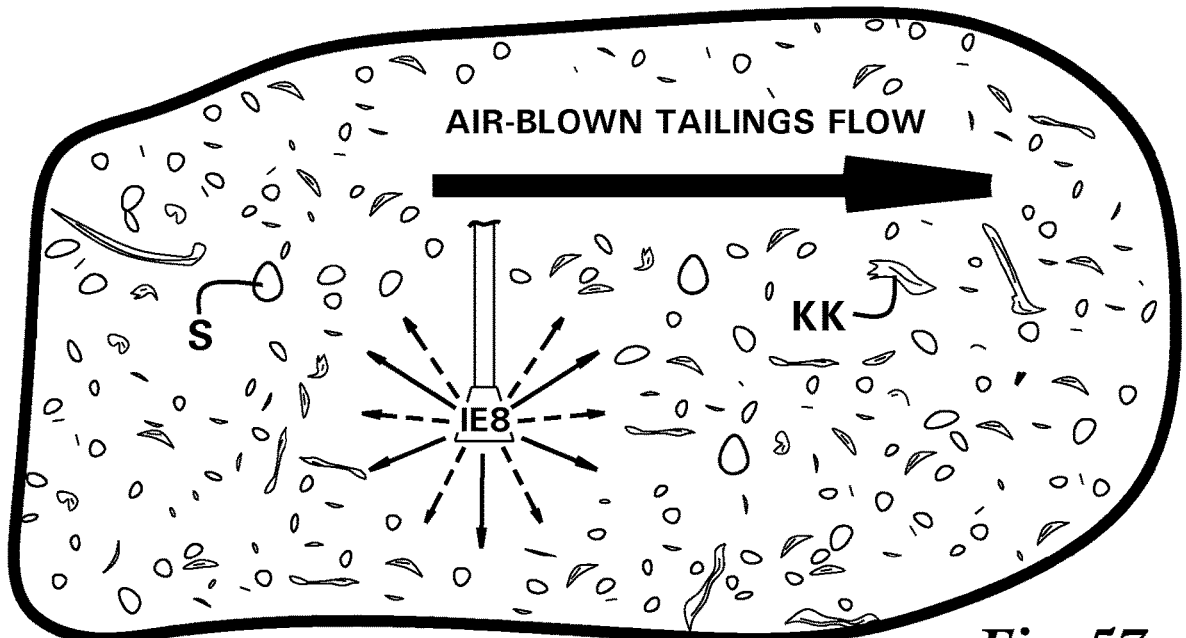
FIG. 57 shows an illustrative interior volume inside the open processing theater volume shown in FIG. 55, with air-blown tailings flow.

Now referring to FIG. 57, an illustrative interior volume is shown inside the open processing theater volume shown in FIG. 55, with air-blown tailings flow. Tailings flow (AIR-BLOWN TAILINGS FLOW) can comprise chaff KK and weed seeds S. The conversion sought, namely, change of state to having reduced germination viability for a seed S is due to participation in a statistical process, because it is by chance that a seed in such a flow gets a full exposure, although multiple illuminators IE8, including any MWIR emitters E that are radiating can increase the likelihood of full exposure for an individual seed. The teachings of the instant invention can operate in any cyclone separator process that is added to increase effectiveness, as those skilled in the art can devise.

Figure 58:
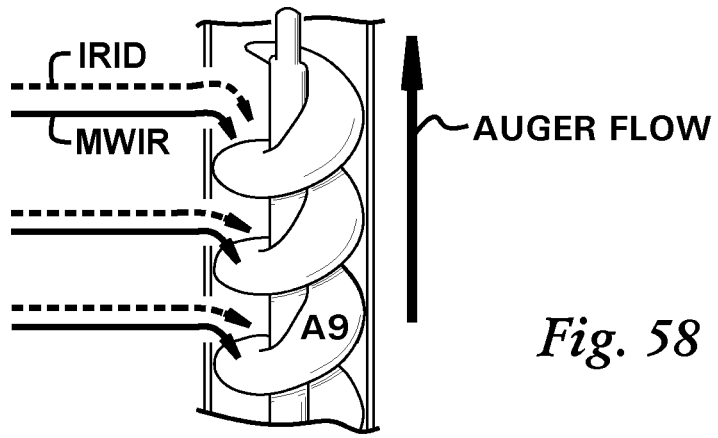
FIG. 58 shows an illuminated auger transport device to treat harvest according to one embodiment of the invention.

Now referring to FIG. 58, an illuminated auger transport device to treat harvest according to one embodiment of the invention is shown. There are natural points in a typical combine where there are opportunities to illuminate a tailings flow according to the invention, such as conveyors, and elevators that are sometimes used to recycle tailings for further processing. Some combine units have an active tailings return in the form of an active tailings return auger, for example. An illuminated auger is shown with a screw blade or flighting A9 inside a tube, with auger flow (AUGER FLOW) upward as indicated. It is also possible to illuminate outgoing tailings at discharge beaters, or later, at a vane tailboard or active spreader, such as the Active Power Cast Spreader of the John Deere S700, without departing the scope of the invention and appended claims. Similarly, one can illuminate tailings when using a "drop from cab" mode used in some combines.

Specifically, the auger glass lining or cylinder can be equipped, as those skilled in the art can devise, with a illuminator IE8 that emits Medium Wavelength Infrared MWIR and/or Indigo Region Illumination Distribution IRID, at a processing theater (4 not shown for clarity) inside the auger or flighting A9. In addition, auger or flighting A9 can be fabricated from, or comprise, borosilicate glass, Pyrex Glass Code 7740, soda lime glass, or aluminum oxide ceramic, and can also comprise a powder coat. This would allow heating the auger or flighting A9 to provide further Medium Wavelength Infrared radiation emissions as taught and claimed here.

Figure 59:
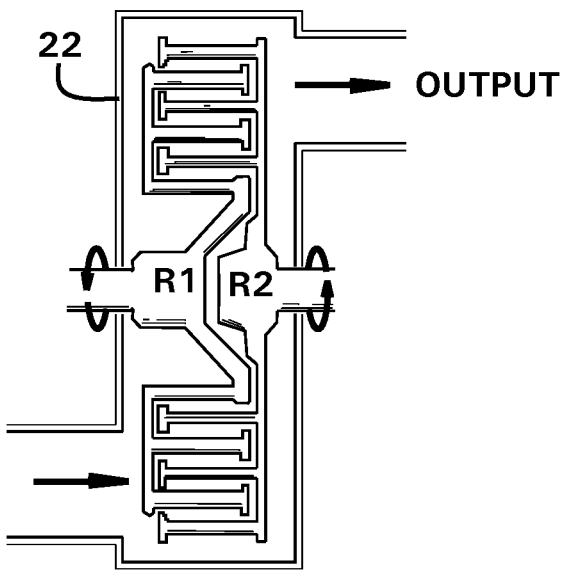
FIG. 59 shows a prior art seed destruction mill for treating harvest, including weed seeds.

Now referring to FIG. 59, a prior art seed destruction mill (SEED DESTRUCTION MILL) for treating harvest, including weed seeds, is shown. Such a unit could be, for example, the Harrington Seed Destructor, alluded to above, disclosed in U.S. Pat. No. 8,152,610 to Harrington; or the seed destruction mill disclosed in U.S. Pat. No. 10,004,176 to Mayerle. In such mills, flow of tailings into the mill (indicated by the inward pointing arrow) allow that tailings meet a destruction process. A typical arrangement is a housing 22 containing a rotor R1 and a counterrotating rotor R2, both driven at high rotational speed that subject weed seeds to destructive stresses that cause damage.

Figure 60:
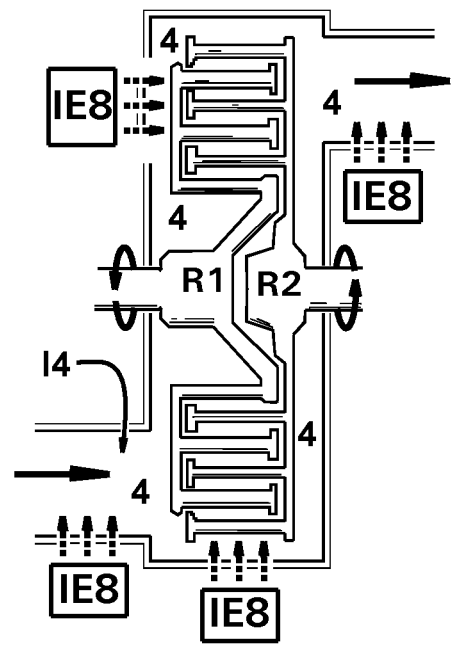
FIG. 60 shows the seed destruction mill of FIG. 59 comprising various possible illuminators and associated processing theaters, to treat harvest according to the invention.

Now referring to FIG. 60, the seed destruction mill of FIG. 59 comprising various possible illuminators and associated processing theaters, to treat a harvest according to the invention is shown. Inward tailings flow indicated by the inward arrow allows that tailings enter an illumination unit 14 that comprises multiple illuminators IE8 and associated processing theaters 4 at or inside the seed destruction mill as shown. Such illumination units 14 can be located at the entrance, output end, or at internal locations in the mill. This can increase the statistical success of the seed destruction mill advantageously by following the mechanical mill process with an optical one, as taught and claimed in this disclosure.

Generally, regarding exposures as taught and claimed herein, there are many possible factors which would require a practitioner of the method of the invention to change exposures, such as the varied effectiveness of the invention on many varied different plant species; plant environmental history, prior sun exposure, history of rain or water uptake, miscellaneous species factors; plant condition; soil factors; the presence of ground debris which might block MWIR radiation during the illumination process. So specific exposures within the scope of the appended claims can be adjusted to optimize results.

Multiple applications of the instant invention, such as lower dose applications can be contemplated whereby impaired germination viability increases upon multiple applications.

An illumination unit, comprising an illuminator and a processing theater can go in back of combine, on a trailer, or be integrated into another machine. One can add, without departing from the appended claims, more sieves or other sorting, threshing, cutting, straw walking, and detritus-eliminating steps without departing from the appended claims.

The invention can be set in motion using known means to accomplish the same objectives over a wide area, such as a wide processing theater, perhaps on the ground plane or on soil. Other harvest transport methods, such as pulsed shots of air, can be used to moved harvest to and from a processing theater using known techniques from the materials handling arts without departing from the scope of the appended claims. Autonomous, non-autonomous, powered, or nonpowered vehicles can be used to illuminate or treat a field, using illumination as taught and claimed, or using communication to other, external light sources. The invention can also be combined with other processes, including transport, cleaning and sorting processes not mentioned in this disclosure without departing from the appended claims.

Known imaging optics can be added to practice the protocol of the invention, including beam forming using parabolic curved sections, or sections that resemble a compound parabolic curve; and non-imaging optics can also be used. If desired, one can redirect all electromagnetic emissions as taught and claimed in the instant disclosure using mirrors, lenses, foil arrays, or light guides and pipes without departing from the scope of the invention. Similarly, those of ordinary skill can add light wavelengths to the exposure protocols without departing from the invention or the appended claims. Addition of red light was found to have no significant increase in effectiveness, but other objectives can be served if desired, namely, one can add illuminating power, or wavelengths or over-expose generally without departing from the scope of the invention or claims. After achieving illumination minimums as stipulated, further illumination can be used without departing from the scope of the appended claims.

Measurement units were chosen illustratively and in the appended claims include irradiance in $W/cm^2$ but radiance or other similar measures can be used and would by fair conversion read upon the appended claims if equivalent.

For clarity, the invention has been described in structural and functional terms. Those reading the appended claims will appreciate that those skilled in the art can formulate, based on the teachings herein, embodiments not specifically presented here.

Production, whether intentional or not, of irradiance levels that are under the magnitude of powers as given in the appended claims shall not be considered a departure from the claims if a power level as claimed is used at any time during treatment.

The illumination protocol disclosed and claimed can be supplemented with visible light, which can enhance user safety by increasing avoidance and can allow for pupil contraction of the eye of an operator; other radiations can be added with without departing from the appended claims.

The invention, in effecting a change of state to having reduced germination viability of a seed, can be performed on site, such as agricultural field, or remotely at a later time and place.

There is obviously much freedom to exercise the elements or steps of the invention.

The description is given here to enable those of ordinary skill in the art to practice the invention. Many configurations are possible using the instant teachings, and the configurations and arrangements given here are only illustrative.

Those with ordinary skill in the art will, based on these teachings, be able to modify the invention as shown.

The invention as disclosed using the above examples may be practiced using only some of the optional features mentioned above. Also, nothing as taught and claimed here shall preclude addition of other structures, functional elements, or systems.

Obviously, many modifications and variations of the present invention are possible in light of the above teaching. It is therefore to be understood that, within the scope of the appended claims, the invention may be practiced otherwise than as specifically described or suggested here.

We claim:

1. An illuminated harvester combine process associated with any of reaping, threshing, and separating a harvest to form a tailings flow, comprising:

illuminating, for a time under one minute, a seed within the tailings flow, as the tailings flow is being moved by a transport through a processing theater on a harvester combine, wherein the illumination is provided by at least one illumination source that is fixedly positioned within the processing theater such that illumination energy achieves:

a minimum of 2 $J/cm^2$ cumulative illumination energy, and 0.2 $W/cm^2$ to 7 $W/cm^2$ average irradiance, of a light wavelength distribution comprising at least one of an Indigo Region Illumination Distribution (IRID) and infrared radiation that is substantially Medium Wavelength Infrared (MWIR)), wherein the illumination energy is directed to induce a change of state of the seed to having reduced germination viability.

2. The process of claim 1 wherein the Medium Wavelength Infrared radiation includes substantially wavelengths ranging from 2 to 8 microns.

3. The process of claim 1 wherein the Indigo Region Illumination Distribution includes substantially wavelengths ranging from 400 to 500 nanometers.

4. The process of claim 1, wherein the light wavelength distribution is proportioned to be between 6 and 30 percent Indigo Region Illumination Distribution.

5. The process of claim 1, wherein the light wavelength distribution comprises both the Indigo Region Illumination Distribution and the infrared radiation that is substantially Medium Wavelength Infrared radiation.

6. The process of claim 1, wherein the Medium Wavelength Infrared radiation originates at least in part from any of borosilicate glass, soda lime glass, aluminum oxide ceramic, and a powder coat (E+).

7. The process of claim 1, wherein the processing theater that receives at least part of the tailings flow comprises at least a portion of an auger elevator.

8. The process of claim 1, wherein the seed within the tailings flow is moved by the transport within the processing theater by:

transporting the seed to and from a weed seed accumulator.

9. The process of claim 8, wherein transporting the seed to and from the weed seed accumulator comprises transporting the seed on a weed seed accumulator belt.

10. The process of claim 1, wherein:

the seed within the tailings flow is moved by the transport within the processing theater by transporting the seed to and from a transmissive belt; and illuminating, for a time under one minute, the seed further comprises illuminating the seed by passing at least some of the Indigo Region Illumination Distribution light through the transmissive belt.

11. The process of claim 10, wherein passing at least some of the Indigo Region Illumination Distribution light through the transmissive belt comprises passing at least some of the Indigo Region Illumination Distribution light through a plurality of links so formed, linked, positioned and optically composed to allow the Indigo Region Illumination Distribution to be transmitted link-to-link and also to be emitted from the plurality of links to impinge upon the seed.

12. The process of claim 1, wherein:
the seed within the tailings flow is moved by the transport within the processing theater by transporting the seed to and from a radiant belt;
further comprising:
heating the radiant belt, using the infrared radiation that is substantially Medium Wavelength Infrared, such that the seed receives thermal emission from the radiant belt itself.

13. The process of claim 1, wherein:
the seed within the tailings flow is moved by the transport within the processing theater by transporting the seed to and from a transmissive and radiant belt; and
illuminating, for a time under one minute, the seed further comprises illuminating the seed by passing at least some of the Indigo Region Illumination Distribution light through the transmissive and radiant belt;
further comprising:
heating the transmissive and radiant belt, using the infrared radiation that is substantially Medium Wavelength Infrared, such that the seed receives thermal emission from the transmissive and radiant belt itself.

14. The process of claim 13, wherein passing at least some of the Indigo Region Illumination Distribution light through the transmissive belt comprises passing at least some of the Indigo Region Illumination Distribution light through a plurality of links so formed, linked, positioned and optically composed to allow the Indigo Region Illumination Distribution to be transmitted link-to-link and also to be emitted from the plurality of links to impinge upon the seed.

15. The process of claim 1, wherein:
the seed within the tailings flow is moved by the transport within the processing theater by transporting the seed to and from a weed seed accumulator belt;
further comprising:
harvest handling by assembly and retention of the seed on a first portion of the weed seed accumulator belt, and expulsion of the seed from a second portion of the weed seed accumulator belt, by driving at least one of air flow and fluid flow through the weed seed accumulator belt, to create a vacuum to assist in the assembly and retention at the first portion, and a positive pressure to assist in the expulsion at the second portion.

16. The process of claim 1, wherein:
the seed within the tailings flow is moved by the transport within the processing theater by transporting the seed to and from a radiant weed seed accumulator belt;
further comprising:
positioning an MWIR emitter that emits the infrared radiation that is substantially Medium Wavelength Infrared so as to cause heating of, and thermal emission from, at least a portion of the radiant weed seed accumulator belt itself.

17. The process of claim 1 further comprising:
integrating at least one of a diffuser, a concentrator, and a reflector for illuminating the seed on at least two sides thereof.

18. An illuminated harvester combine comprising any of a reaper, a thresher, and a separator stage, so formed to produce a tailings flow, comprising:
an illumination unit having at least one of a Medium Wavelength Infrared (MWIR) emitter and an Indigo Region Illumination Distribution (IRID) emitter, the illumination unit configured to illuminate a seed within the tailings flow, as the tailings flow is being moved by a transport through a processing theater, so as to induce a change of state of the seed to having reduced germination viability in a time under one minute;
wherein:
the illumination unit is so formed, positioned and energized to illuminate the seed while in the processing theater to achieve a minimum of 2 $J/cm^2$ cumulative illumination energy, and 0.2 $W/cm^2$ to 7 $W/cm^2$ average irradiance, of a light wavelength distribution comprising at least one of an Indigo Region Illumination Distribution (IRID) and infrared radiation that is substantially Medium Wavelength Infrared (MWIR)) radiation.

19. The illuminated harvester combine of claim 18, wherein the illumination unit is so formed, positioned and energized such that the Medium Wavelength Infrared radiation includes substantially wavelengths ranging from 2 to 8 microns.

20. The illuminated harvester combine of claim 18, wherein the illumination unit is so formed, positioned and energized such that the Indigo Region Illumination Distribution includes substantially wavelengths ranging from 400 to 500 nanometers.

21. The illuminated harvester combine of claim 18, wherein the illumination unit is so formed, positioned and energized such that the light wavelength distribution is proportioned to be between 6 and 30 percent Indigo Region Illumination Distribution.

22. The illuminated harvester combine of claim 18, wherein the MWIR emitter and IRID emitter are each so further formed, sized, positioned, and assembled such that a substantial portion of the Indigo Region Illumination Distribution passes through the MWIR emitter itself to be directed at the seed.

23. The illuminated harvester combine of claim 18, wherein the illumination unit is so formed that the Medium Wavelength Infrared radiation originates at least in part from any of borosilicate glass, soda lime glass, aluminum oxide ceramic, and a powder coat (E+).

24. The illuminated harvester combine of claim 18, wherein the transport comprises a weed seed accumulator.

25. The illuminated harvester combine of claim 24, wherein the weed seed accumulator comprises a weed seed accumulator belt.

26. The illuminated harvester combine of claim 18, wherein:
the transport comprises a transmissive belt; and
at least some of the Indigo Region Illumination Distribution light passes through the transmissive belt to illuminate the seed.

27. The illuminated harvester combine of claim 26 wherein:
at least some of the Indigo Region Illumination Distribution light is passed through a plurality of links of the transmissive belt, the links so formed, linked, positioned and optically composed to allow the Indigo Region Illumination Distribution to be transmitted link-to-link and also to be emitted from the plurality of links to impinge upon the seed.

28. The illuminated harvester combine of claim 18, wherein:
the transport comprises a radiant belt; and
the infrared radiation that is substantially Medium Wavelength Infrared heats the radiant belt, such that the seed receives thermal emission from the radiant belt itself.

29. The illuminated harvester combine of claim 18, wherein:
- the transport comprises a transmissive and radiant belt;
- at least some of the Indigo Region Illumination Distribution light passes through the transmissive and radiant belt to illuminate the seed; and
- the transmissive and radiant belt is heated using the infrared radiation that is substantially Medium Wavelength Infrared, such that the seed receives thermal emission from the transmissive and radiant belt itself.

30. The illuminated harvester combine of claim 29, wherein at least some of the Indigo Region Illumination Distribution light is passed through a plurality of links of the transmissive belt, the links so formed, linked, positioned and optically composed to allow the Indigo Region Illumination Distribution to be transmitted link-to-link and also to be emitted from the plurality of links to impinge upon the seed.

31. The illuminated harvester combine of claim 18 further comprising:
- at least one of a diffuser, a concentrator, and a reflector that distributes illumination such that the seed is illuminated on at least two sides thereof.

32. A compact configuration agricultural illumination unit, comprising:
- an illumination unit having at least one of a Medium Wavelength Infrared (MWIR) emitter and an Indigo Region Illumination Distribution (IRID) emitter, the illumination unit configured to illuminate a seed within a tailings flow, as the tailings flow is being moved by a transport through a processing theater, so as to induce a change of state of the seed to having reduced germination viability in a time under one minute;
- wherein:
  - the illumination unit is so formed, positioned and energized to illuminate the seed while in the processing theater to achieve a minimum of 2 J/cm$^2$ cumulative illumination energy, and 0.2 W/cm$^2$ to 7 W/cm$^2$ average irradiance, of a light wavelength distribution comprising at least one of an Indigo Region Illumination Distribution (IRID) and infrared radiation that is substantially Medium Wavelength Infrared (MWIR)) radiation.

33. The compact configuration agricultural illumination unit of claim 32, wherein the illumination unit is so formed, positioned and energized such that the Medium Wavelength Infrared radiation includes substantially wavelengths ranging from 2 to 8 microns.

34. The compact configuration agricultural illumination unit of claim 32, wherein the illumination unit is so formed, positioned and energized such that that the Indigo Region Illumination Distribution includes substantially wavelengths ranging from 400 to 500 nanometers.

35. The compact configuration agricultural illumination unit of claim 32, wherein the illumination unit is so formed, positioned and energized to allow that the light wavelength distribution is proportioned to be between 6 and 30 percent Indigo Region Illumination Distribution.

36. The compact configuration agricultural illumination unit of claim 32, wherein the MWIR emitter and IRID emitter are each so further formed, sized, positioned, and assembled to allow that a substantial portion of the Indigo Region Illumination Distribution passes through the MWIR emitter E itself to be directed at the seed.

37. The compact configuration agricultural illumination unit of claim 32, wherein the illumination unit is so formed that the Medium Wavelength Infrared radiation originates at least in part from any of borosilicate glass, soda lime glass, aluminum oxide ceramic, and a powder coat (E+).

38. The compact configuration agricultural illumination unit of claim 32, wherein the transport comprises a weed seed accumulator.

39. The compact configuration agricultural illumination unit of claim 38, wherein the weed seed accumulator comprises a weed seed accumulator belt.

40. The compact configuration agricultural illumination unit of claim 32, wherein:
- the transport comprises a transmissive belt; and
- at least some of the Indigo Region Illumination Distribution light passes through the transmissive belt to illuminate the seed.

41. The compact configuration agricultural illumination unit of claim 40 wherein:
- at least some of the Indigo Region Illumination Distribution light is passed through a plurality of links of the transmissive belt, the links so formed, linked, positioned and optically composed to allow the Indigo Region Illumination Distribution to be transmitted link-to-link and also to be emitted from the plurality of links to impinge upon the seed.

42. The compact configuration agricultural illumination unit of claim 32, wherein:
- the transport comprises a radiant belt; and
- the infrared radiation that is substantially Medium Wavelength Infrared heats the radiant belt, such that the seed receives thermal emission from the radiant belt itself.

43. The compact configuration agricultural illumination unit of claim 32, wherein:
- the transport comprises a transmissive and radiant belt;
- at least some of the Indigo Region Illumination Distribution light passes through the transmissive and radiant belt to illuminate the seed; and
- the transmissive and radiant belt is heated using the infrared radiation that is substantially Medium Wavelength Infrared, such that the seed receives thermal emission from the transmissive and radiant belt itself.

44. The compact configuration agricultural illumination unit of claim 43, wherein at least some of the Indigo Region Illumination Distribution light is passed through a plurality of links of the transmissive belt, the links so formed, linked, positioned and optically composed to allow the Indigo Region Illumination Distribution to be transmitted link-to-link and also to be emitted from the plurality of links to impinge upon the seed.

45. The compact configuration agricultural illumination unit of claim 32 further comprising:
- at least one of a diffuser, a concentrator, and a reflector that distributes illumination such that the seed is illuminated on at least two sides thereof.

* * * * *